United States Patent [19]
Young et al.

[11] Patent Number: 5,513,320
[45] Date of Patent: Apr. 30, 1996

[54] TRANSMIT DATA DESCRIPTOR STRUCTURE IN A MEDIA ACCESS CONTROL/HOST SYSTEM INTERFACE THAT IMPLEMENTS FLEXIBLE TRANSMIT DATA DESCRIPTOR STRUCTURE UNIT

[75] Inventors: Desmond W. Young, Campbell, Calif.; James R. Hamstra, Shorewood, Minn.

[73] Assignee: National Semiconductor Corporation, Santa Clara, Calif.

[21] Appl. No.: 521,274

[22] Filed: Aug. 30, 1995

Related U.S. Application Data

[63] Continuation of Ser. No. 321,458, Oct. 11, 1994, abandoned, which is a continuation of Ser. No. 144,391, Oct. 27, 1993, abandoned, which is a division of Ser. No. 989,942, Dec. 10, 1992, abandoned, which is a continuation of Ser. No. 516,245, Apr. 27, 1990, abandoned.

[51] Int. Cl.$^6$ .......................... G06F 13/38; G06F 15/173
[52] U.S. Cl. ............................ 395/200.01; 395/200.08; 395/825; 364/242.94; 364/242.95; 364/239; 364/239.9; 364/DIG. 1
[58] Field of Search .................... 395/200.01, 200.02, 395/200.04, 200.08, 825, 650, 427, 800; 340/825.06; 370/85.1, 85.4

[56] References Cited

U.S. PATENT DOCUMENTS

| | | | |
|---|---|---|---|
| 4,319,323 | 4/1982 | Ermolovich et al. | 395/427 |
| 4,344,132 | 8/1982 | Dixon et al. | 364/200 |
| 4,404,557 | 9/1983 | Grow | 340/825.05 |
| 4,418,382 | 11/1983 | Larson et al. | 395/200 |
| 4,441,162 | 4/1984 | Lillie | 364/900 |
| 4,454,508 | 6/1984 | Grow | 340/825.05 |
| 4,459,588 | 7/1984 | Grow | 340/825.05 |
| 4,493,021 | 1/1985 | Agrawal et al. | 364/200 |
| 4,527,236 | 7/1985 | Ermolovich | 395/185.09 |
| 4,530,088 | 7/1985 | Hamstra et al. | 370/110.1 |
| 4,538,147 | 8/1985 | Grow | 340/825.05 |

(List continued on next page.)

OTHER PUBLICATIONS

Advanced Micro Devices, The SUPERNET Family for FDDI Databook, 1989.
FDDI Station Management (SMT), May 10, 1989, Rev. 5, pp. 227–372.
Floyd E. Ross, "FDDI—An Overview", IEEE, 1987, pp. 434–440.
Jim Hamstra, "FDDI Design Tradeoffs", IEEE, Proceedings of 13th Conf. on Local Computer Networks, Oct. 1988.
Advanced Micro Devices, "SUPERNET For Fiber Distributed Data Interface", Electronic Design, Sep. 17, 1987, pp. 1–34.
Advanced Micro Devices, "AM99C10 256×48 Content Addressable Memory", 1989, Rev. D.
Advanced Micro Devices, "AM7992B Serial Interface Adapter (SIA)", 1989, Rev. F.
Advanced Micro Devices, "AM7996 Cheapernet Transceiver", IEEE, 1989, Rev. C.
Advanced Micro Devices, "AM7968/AM7969, TAXI Transmitter/TAXI Receiver", Jan. 1986.

*Primary Examiner*—Gopal C. Ray
*Attorney, Agent, or Firm*—Limbach & Limbach

[57] ABSTRACT

An interface system for transferring information between a local area network and a system memory associated with a station attached to the network. The interface system includes a bus interface unit for implementing the transfer of information between the interface system and the memory system. An indicate module transfers information received by the interface system from the network to the memory system via the bus interface unit. A request module transfers information received by the interface system from the memory system via the bus interface unit to the network. A status generation/space management module connected to the indicate module and to the request module monitors the status thereof and generates corresponding status signals and manages the allocation of storage space in the memory system for information transferred between the network and the memory system via the interface system.

3 Claims, 40 Drawing Sheets

POOL SPACE DESCRIPTOR (PSP)

U.S. PATENT DOCUMENTS

| Patent No. | Date | Inventor | Class |
|---|---|---|---|
| 4,672,570 | 6/1987 | Benken | 364/900 |
| 4,710,868 | 12/1987 | Cocke et al. | 395/325 |
| 4,817,080 | 3/1989 | Soha | 370/17 |
| 4,866,609 | 9/1989 | Calta et al. | 395/250 |
| 4,942,515 | 7/1990 | Marzucco et al. | 364/200 |
| 4,949,301 | 8/1990 | Joshi et al. | 364/900 |
| 4,954,965 | 9/1990 | Johnson et al. | 364/514 |
| 4,964,113 | 10/1990 | Geyer et al. | 370/85.5 |
| 4,970,714 | 11/1990 | Chen et al. | 370/17 |
| 4,989,135 | 1/1991 | Miki | 364/200 |
| 5,007,017 | 4/1991 | Kobayshi | 364/900 |
| 5,041,963 | 8/1991 | Ebersole et al. | 364/200 |
| 5,043,938 | 8/1991 | Ebersole | 364/900 |
| 5,053,946 | 10/1991 | Jain | 395/275 |
| 5,086,426 | 2/1992 | Tsukakoshi et al. | 370/85.13 |
| 5,107,456 | 4/1992 | Schuur | 395/325 |
| 5,109,486 | 4/1992 | Seymour | 395/200 |
| 5,111,425 | 5/1992 | Takeuchi et al. | 395/842 |
| 5,117,486 | 5/1992 | Clark et al. | 395/250 |
| 5,291,491 | 3/1994 | Hutchison et al. | 370/85.5 |
| 5,307,345 | 4/1994 | Lozowick et al. | 370/61 |
| 5,317,719 | 5/1994 | Rozmovits | 395/200.17 |
| 5,388,219 | 2/1995 | Chan et al. | 395/825 |

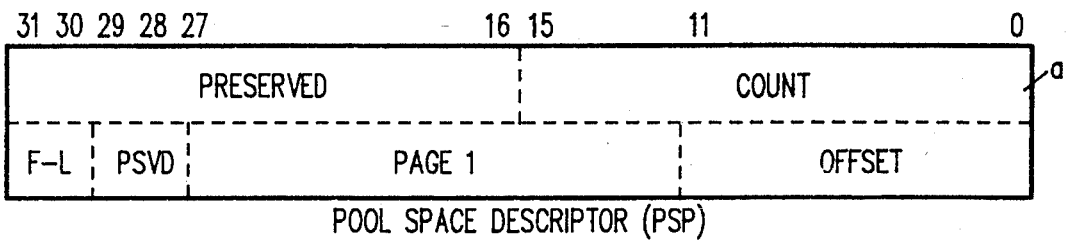
FIG. 11A — POOL SPACE DESCRIPTOR (PSP)
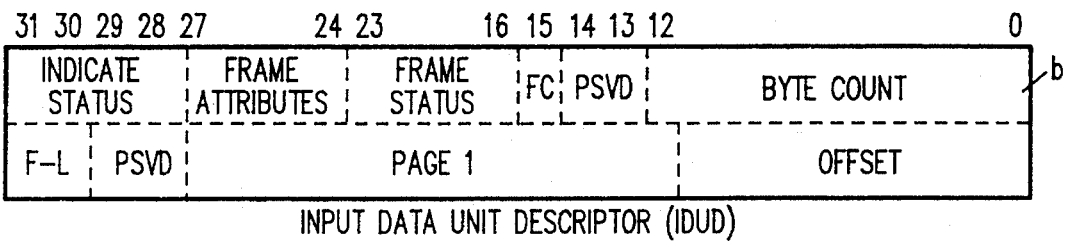
FIG. 11B — INPUT DATA UNIT DESCRIPTOR (IDUD)
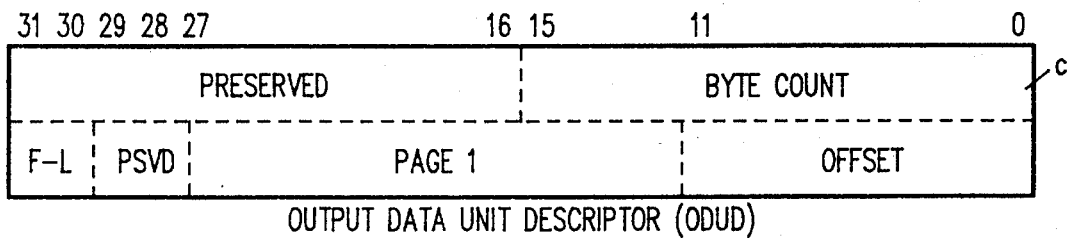
FIG. 11C — OUTPUT DATA UNIT DESCRIPTOR (ODUD)
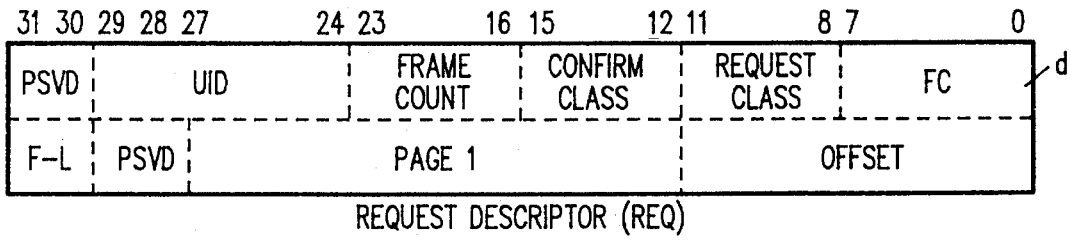
FIG. 11D — REQUEST DESCRIPTOR (REQ)
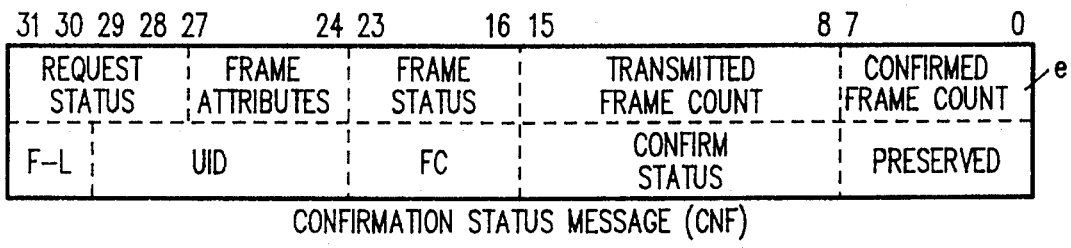
FIG. 11E — CONFIRMATION STATUS MESSAGE (CNF)

KEY TO FIG. 15B

| FIG. 15B-1 | FIG. 15B-2 |
| --- | --- |
| FIG. 15B-3 | FIG. 15B-4 |

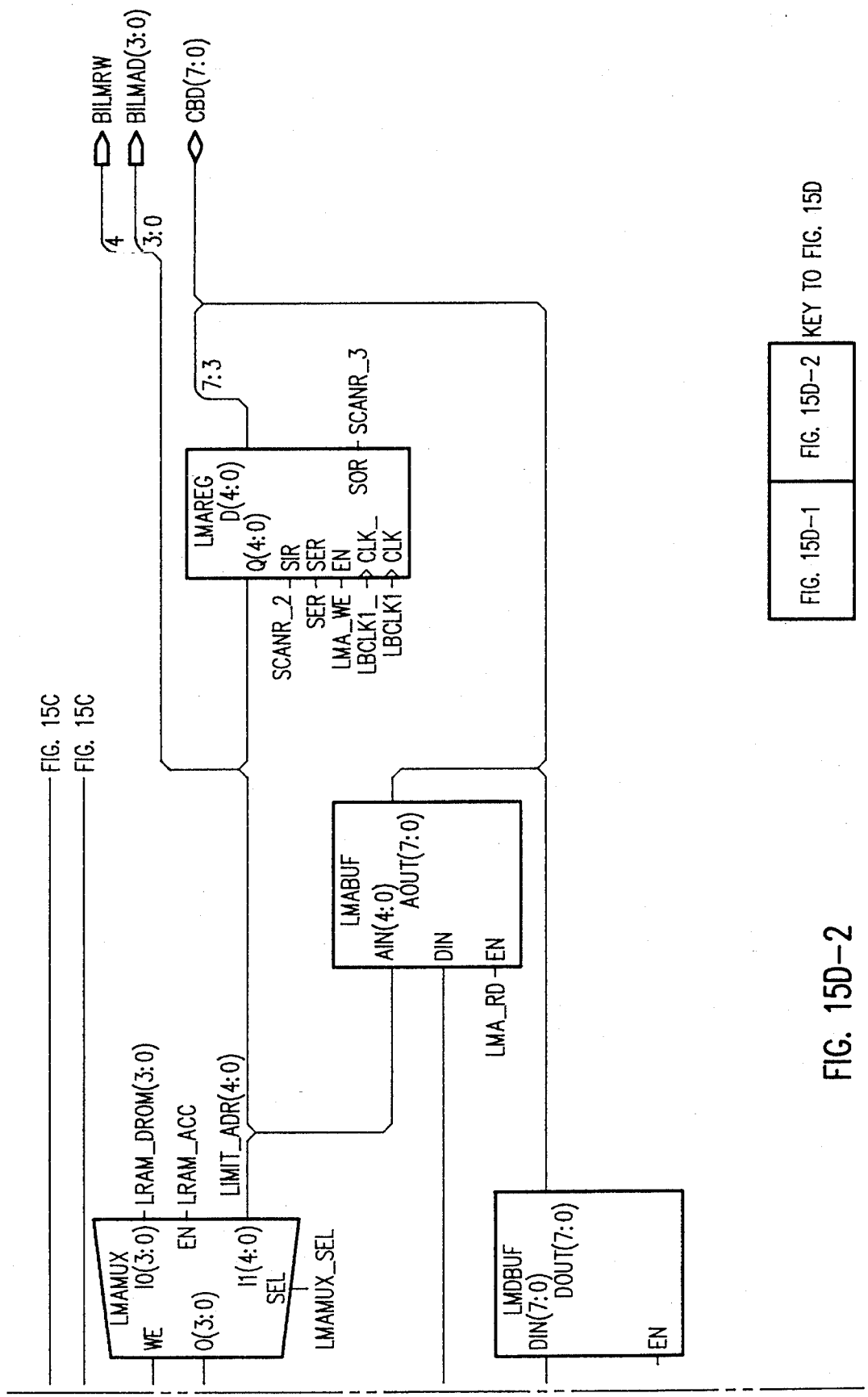

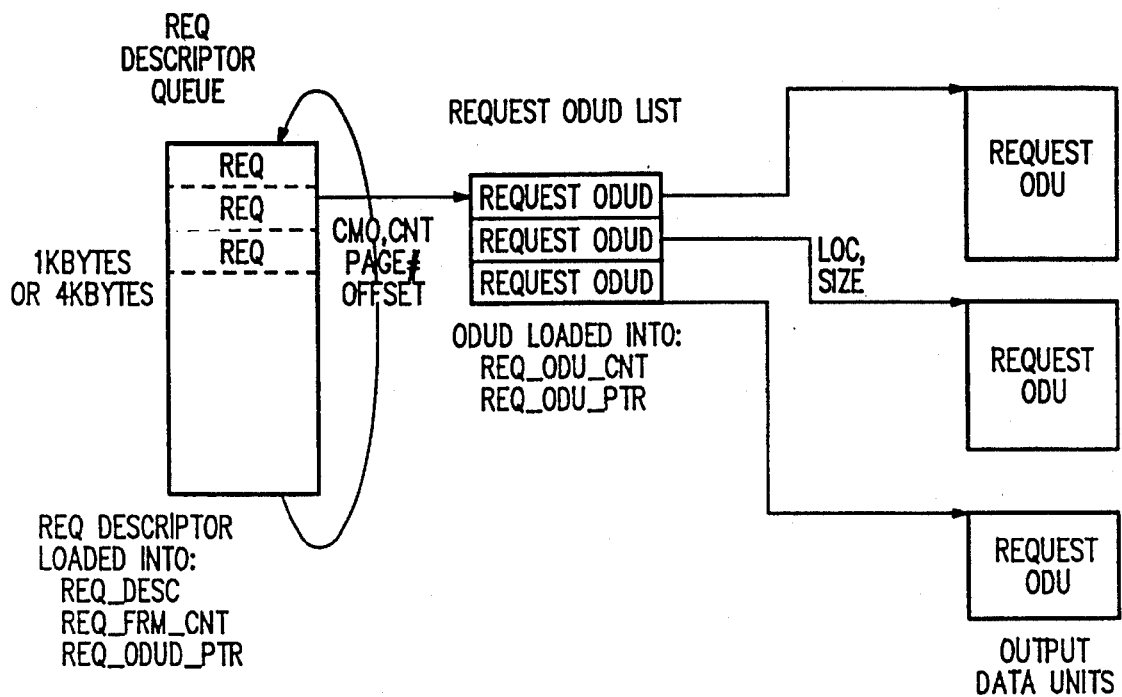
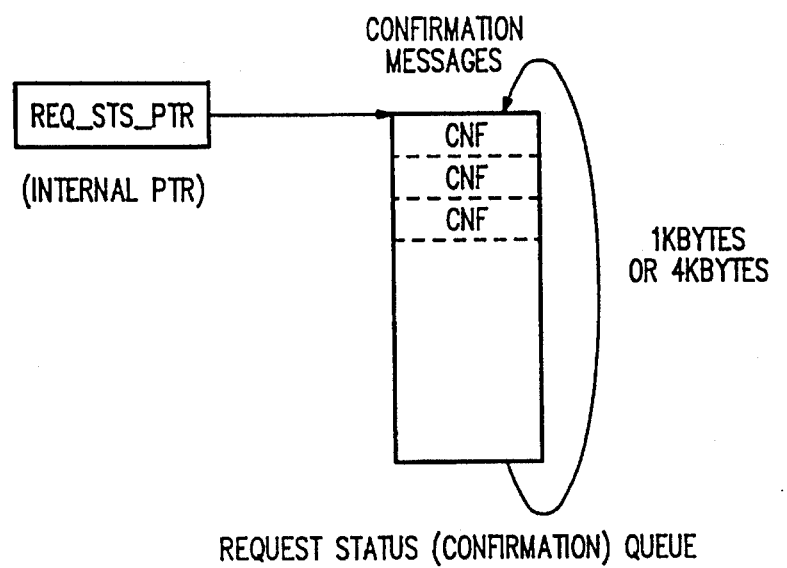
FIG. 16

| ADR | REGISTER | FUNCTION | RST | CW |
|---|---|---|---|---|
| 00 | MODE | CONFIGURATION AND INITIALIZATION | 00 | – |
| 01 | RESERVED | | | |
| 02 | PTR_INT_ADR | PTR REGISTER ADDRESS | | |
| 03 | PTR_MEM_ADR | MEMORY ADR FOR PTR READ/WRITE | * | |
| 04 | MASTER_ATTN | MASTER (COMBINED) ATTENTION (RO) | 00 | |
| 05 | MASTER_NOTIFY | MASTER (COMBINED) NOTIFY | 00 | – |
| 06 | STATE_ATTN | STATE MACHINE STATUS ATTENTION | 07 | CW |
| 07 | STATE_NOTIFY | STATE MACHINE STATUS NOTIFY | 00 | |
| 08 | SERVICE_ATTN | PTR AND LIMIT OPERATIONS | 0F | CW |
| 09 | SERVICE_NOTIFY | NOTIFY FOR SERVICES | 00 | |
| 0A | NO_SPACE_ATTN | NO STATUS OR DATA SPACE | FF | CW |
| 0B | NO_SPACE_NOTIFY | NOTIFY FOR NO SPACE | 00 | |
| 0C | LIMIT_ADR | LIMIT REGISTER+TO UPDATE | | |
| 0D | LIMIT_DATA | DATA TO WRITE TO LIMIT | | |
| 0E | REQ_ATTN | REQ EVENT->ATTENTION | 00 | CW |
| 0F | REQ_NOTIFY | REQ ATTENTION/NOTIFY MASK | 00 | |
| 10 | REQ0_CFG | SYNC REQ PARAMETER | | |
| 11 | REQ1_CFG | ASYNC REQ PARAMETERS | | |
| 12 | REQ0_EFS | REQ0 EXPECTED FRAME STATUS | | |
| 13 | REQ1_EFS | REQ1 EXPECTED FRAME STATUS | | |
| 14 | IND_ATTN | IND EVENT->ATTENTION | 00 | CW |
| 15 | IND_NOTIFY | IND ATTENTION/NOTIFY MASK | 00 | |
| 16 | IND_THRESHOLD | RXD FRAME COUNT THRESHOLD | | |
| 17 | IND_MODE | INDICATE PARAMETERS | | |
| 18 | IND_CFG | INDICATE PARAMETERS | | |
| 19 | IND_HDRLEN | INDICATE HEADER LENGTH | | |
| 1A | RESERVED | | | |
| 1B | RESERVED | | | |
| 1C | RESERVED | | | |
| 1D | RESERVED | | | |
| 1E | RESERVED | | | |
| 1F | COMPARE | CW COMPARISON REGISTER | | |

FIG. 21

| ADDR | REGISTER | FUNCTION |
|---|---|---|
| 00 | REQ1_ODU_PTR | START OF NEXT ODU |
| 01 | REQ1_DUD_PTR | WHERE TO GET NEXT ODUD |
| 02 | REQ1_STS_PTR | WHERE TO WRITE NEXT CNF |
| 03 | REQ1_REQ_PTR | WHERE TO FETCH RSAP_1 REQS |
| 04 | REQ0_ODU_PTR | START OF NEXT ODU |
| 05 | REQ0_DUD_PTR | WHERE TO GET NEXT ODUD |
| 06 | REQ0_STS_PTR | WHERE TO WRITE NEXT CNF |
| 07 | REQ0_REQ_PTR | WHERE TO FETCH RSAP_0 REQS |
| 08 | IND2_IDU_PTR | WHERE TO WRITE NEXT ISAP_2 IDU |
| 09 | IND2_STS_PTR | WHERE TO WRITE NEXT ISAP_2 IDUD |
| 0A | IND2_PSP_PTR | WHERE TO GET NEXT ISAP_2 PSP |
| 0B | IND2_NEXT_PSP | HOLDS THE NEXT (PREFETCHED) PSP |
| 0C | IND1_IDU_PTR | WHERE TO WRITE NEXT ISAP_1 IDU |
| 0D | IND1_STS_PTR | WHERE TO WRITE NEXT ISAP_1 IDUD |
| 0E | IND1_PSP_PTR | WHERE TO GET NEXT ISAP_1 PSP |
| 0F | IND1_NEXT_PSP | HOLDS THE NEXT (PREFETCHED) PSP |
| 10 | IND0_IDU_PTR | WHERE TO WRITE NEXT ISAP_0 IDU |
| 11 | IND0_STS_PTR | WHERE TO WRITE NEXT ISAP_0 IDUD |
| 12 | IND0_PSP_PTR | WHERE TO GET NEXT ISAP_0 PSP |
| 13 | IND0_NEXT_PSP | HOLDS THE NEXT (PREFETCHED) PSP |
| 14 | IND_SHADOW | HOLDS START ADDRESS OF LAST IDU |
| 15 | REQ_SHADOW | HOLDS ADDRESS OF CURRENT ODUD |

PTR RAM REGISTER SET

FIG. 22

| ADDR | REGISTER | FUNCTION |
|---|---|---|
| 0 | REQ1_REQ_LIMIT | HOST DEFINED LIMIT OF RSAP_1 REQ QUEUE |
| 1 | REQ1_STS_LIMIT | HOST DEFINED LIMIT OF RSAP_1 STATUS QUEUE |
| 2 | REQ0_REQ_LIMIT | HOST DEFINED LIMIT OF RSAP_0 REQ QUEUE |
| 3 | REQ0_STS_LIMIT | HOST DEFINED LIMIT OF RSAP_0 STATUS QUEUE |
| 4 | IND2_STS_LIMIT | HOST DEFINED LIMIT OF ISAP_2 STATUS QUEUE |
| 5 | IND2_PSP_LIMIT | HOST DEFINED LIMIT OF ISAP_2 PSP QUEUE |
| 6 | IND1_STS_LIMIT | HOST DEFINED LIMIT OF ISAP_1 STATUS QUEUE |
| 7 | IND1_PSP_LIMIT | HOST DEFINED LIMIT OF ISAP_1 PSP QUEUE |
| 8 | IND0_STS_LIMIT | HOST DEFINED LIMIT OF ISAP_0 STATUS QUEUE |
| 9 | IND0_PSP_LIMIT | HOST DEFINED LIMIT OF ISAP_0 PSP QUEUE |

LIMIT RAM REGISTER SET

FIG. 23

RSM REQUEST STATE MACHINE

ABUS BURST READ, PHYSICAL ADDRESSING, 16 BYTES, 1 W-S

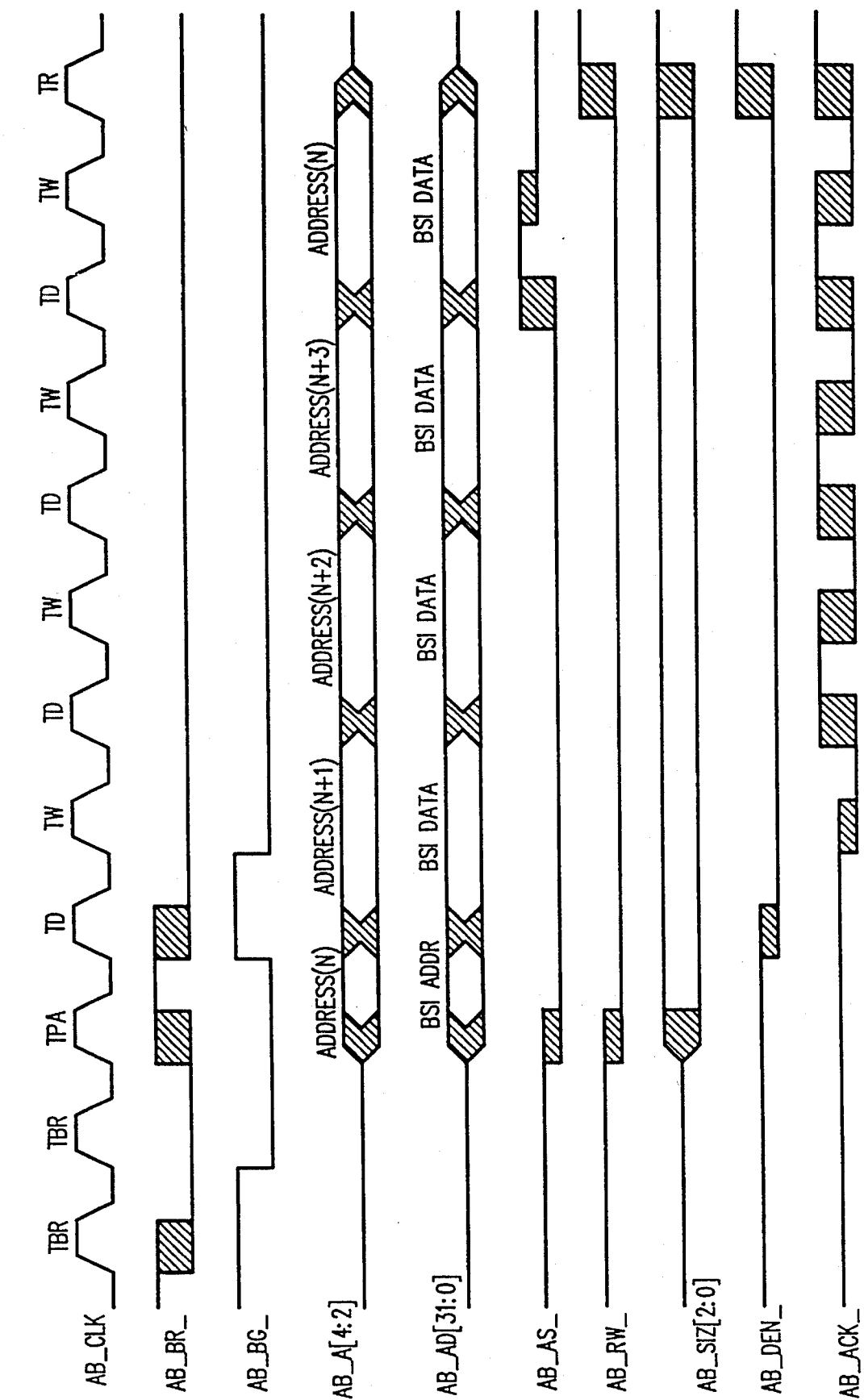
FIG. 29   ABUS BURST WRITE, PHYSICAL ADDRESSING, 16 BYTES, 1 W-S

PINOUT

| PIN GROUP | # PINS | OUTPUTS |
|---|---|---|
| BMAC | 65 | 25 |
| CBUS | 19 | 11 |
| ABUS | 50 | 46 |
| PWR | 26 | – |
| TOTAL | 160 | 82 |

TOTAL PIN COUNT

FIG. 30A-1

| MNEMONIC | NAME & FUNCTION | TYPE |
|---|---|---|
| CBA[4:0] | CBUS ADDRESS | I |
| CBD[7:0] | CBUS DATA | I/O |
| CBP | CBUS DATA PARITY | I/O |
| CE_ | CBUS ENABLE | I |
| CB_RW_ | READ/WRITE_ | I |
| CB_ACK_ | ACKNOWLEDGE | OD |
| INT_ | INTERRUPT | OD |
| RST_ | RESET | I |

CBUS INTERFACE

FIG. 30A-2

| MNEMONIC | NAME & FUNCTION | TYPE |
|---|---|---|
| AB_A[4:2] | ABUS ADDRESS | O |
| AB_AD[31:0] | ABUS ADDRESS/DATA | I/O |
| AB_BP[3:0] | ABUS AD BYTE PARITY | I/O |
| AB_AS_ | ABUS ADDRESS STROBE | O |
| AB_RW_ | ABUS READ_WRITE_ | O |
| AB_DEN_ | ABUS DATA ENABLE | O |
| AB_SIZ[2:0] | ABUS TRANSFER SIZE | O |
| AB_ACK_ | ABUS ACKNOWLEDGE | I |
| AB_ERR_ | ABUS ERROR | I |
| AB_BR_ | ABUS BUS REQUEST | O |
| AB_BG_ | ABUS BUS GRANT | I |
| AB_CLK | ABUS CLOCK | I |

ABUS INTERFACE

FIG. 30A-3

| MNEMONIC | NAME & FUNCTION | TYPE |
|---|---|---|
| MRD[7:0] | MAC REQUEST DATA | O |
| MRP | MAC REQUEST PARITY | O |
| RQRCLS[3:0] | REQUEST CLASS | O |
| RQBCN | REQUEST BEACON | O |
| RQCLM | REQUEST CLAIM | O |
| STRIP | VOID STRIP ON | O |
| SAT | SOURCE ADDRESS TRANSPARENCY | O |
| FCST | FCS TRANSPARENCY | O |
| RQRDY | REQUEST READY | O |
| TXRDY | TRANSMIT READY | I |
| RQSEND | REQUEST SEND | O |
| MRDS | MAC REQUEST DATA STROBE | I |
| RQEOF | REQUEST END OF FRAME | O |
| RQFINAL | REQUEST FINAL | O |
| RQABORT | REQUEST ABORT | O |
| TXPASS | TRANSMITTER PASSED TOKEN | I |
| TXABORT | TRANSMIT ABORT | I |
| TXED | TRANSMITTING ENDING DELIMITER | I |
| TXCLASS | TX TOKEN CLASS | I |
| TXRINGOP | TX RING OPERATIONAL | I |
| MID[7:0] | MAC INDICATE DATA | I |
| MIP | MAC INDICATE PARITY | I |
| FCRCVD | FC RECEIVED | I |
| INFORCVD | INFORMATION FIELD RXD | I |
| EDRCVD | ED RECEIVED | I |
| MIDS | FDDI-II IDS (FDDI-I=VCC) | I |
| AFLAG | MY ADDRESS RECOGNIZED | I |
| MFLAG | MY SA RECOGNIZED | I |
| SAMESA | SAME SA | I |
| SAMEINFO | SAME MAC INFO | I |
| VDL | VALID DATA LENGTH | I |
| VFCS | VALID FCS | I |
| TKRCVD | TOKEN RECEIVED | I |
| FRSTRP | FRAME STRIPPED | I |
| FOERROR | FORMAT ERROR | I |
| MACRST | MAC RESET | I/O |
| VCOPY | VALID COPY | O |
| ECIP | EXT COMPARE IN PROGRESS | I |
| EA | EXT DA MATCH | I |
| EM | EXT SA MATCH | I |
| LBC[5,3,1] | LOCAL BYTE CLOCK (3 @ 12.5 MHZ) | I |
| SER | SCAN ENABLE RING CLOCK | I |
| SEB | SCAN ENABLE BUS CLOCK | I |
| SIR | SCAN SERIAL INPUTS RING CLOCK | I |
| SIB[1:0] | SCAN SERIAL INPUT BUS CLOCK | I |

BMAC INTERFACE

Control Interface pin listing:

- 141 VCC(CORE)
- 142 GND(CORE)
- 143 RQBCN(O)
- 144 RQCLM(O)
- 145 FCST(O)
- 146 VCC
- 147 GND
- 148 STRIP(O)
- 149 SAT(O)
- 150 RST(I)
- 151 RW(I)
- 152 CE(I)
- 153 INT(OD)
- 154 ACK(OD)
- 155 CBA0(I)
- 156 CBA1(I)
- 157 CBA2(I)
- 158 CBA3(I)
- 159 CBA4(I)
- 160 CBD0(I/O)
- 1 CBD1(I/O)
- 2 CBD2(I/O)
- 3 CBD3(I/O)
- 4 VCC
- 5 GND
- 6 CBD4(I/O)
- 7 CBD5(I/O)
- 8 CBD6(I/O)
- 9 CBD7(I/O)
- 10 CBP(I/O)
- 11 AB_BP0(I/O)
- 12 AB_AD0(I/O)
- 13 AB_AD1(I/O)
- 14 VCC
- 15 GND
- 16 AB_AD2(I/O)
- 17 AB_AD3(I/O)
- 18 AB_AD4(I/O)
- 19 AB_AD5(I/O)
- 20 AB_AD6(I/O)
- 21 AB_AD7(I/O)
- 22 AB_BP1(I/O)
- 23 AB_AD8(I/O)
- 24 GND
- 25 VCC
- 26 AB_AD9(I/O)
- 27 AB_AD10(I/O)
- 28 AB_AD11(I/O)
- 29 AB_AD12(I/O)
- 30 AB_AD13(I/O)
- 31 AB_AD14(I/O)
- 32 AB_AD15(I/O)
- 33 AB_BP2(I/O)
- 34 GND
- 35 VCC
- 36 AB_AD16(I/O)
- 37 AB_AD17(I/O)
- 38 AB_AD18(I/O)
- 39 AB_AD19(I/O)

- 140 RQRCLS3(O)
- 139 RQRCLS2(O)
- 138 RQRCLS1(O)
- 137 RQRCLS0(O)
- 136 RQRDY(O)
- 135 GND
- 134 VCC
- 133 RQSEND(O)
- 132 RQEOF(O)
- 131 RQFINAL(O)
- 130 RQABORT(O)
- 129 TXPASS(I)
- 128 TXRDY(I)
- 127 MRDS(I)
- 126 TXED(I)
- 125 TXABORT(I)
- 124 TXCLASS(I)
- 123 TXRINGOP(I)
- 122 MRP(O)

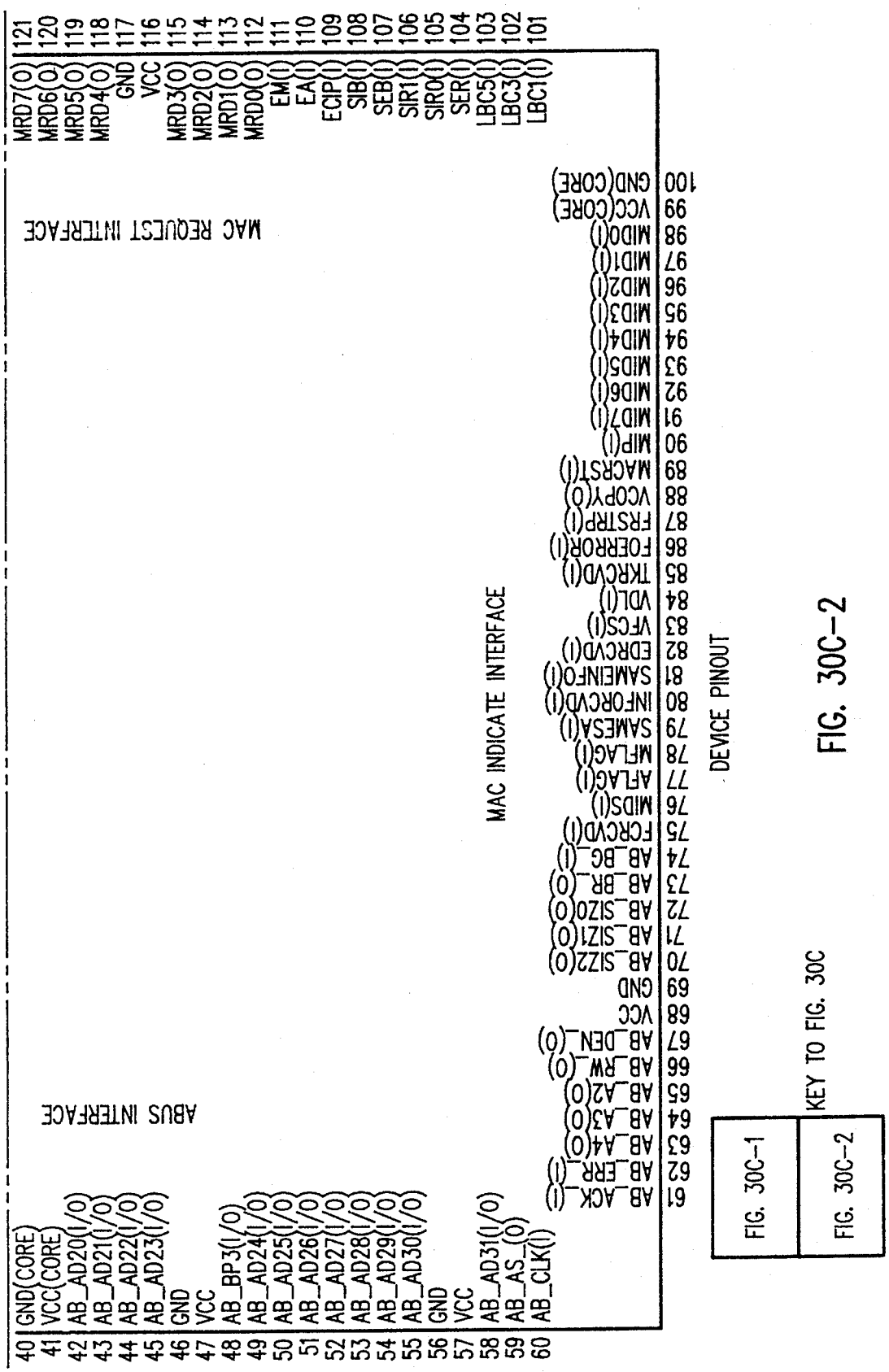

TRANSMIT DATA DESCRIPTOR STRUCTURE IN A MEDIA ACCESS CONTROL/HOST SYSTEM INTERFACE THAT IMPLEMENTS FLEXIBLE TRANSMIT DATA DESCRIPTOR STRUCTURE UNIT

This is a continuation of prior complete application Ser. No. 08/321,458 filed on Oct. 11, 1994, now abandoned, which is a continuation of Ser. No. 08/144,391 filed Oct. 27, 1993, now abandoned, which is a divisional of Ser. No. 07/989,942, filed Dec. 10, 1992 (ABN), which is a continuation of Ser. No. 07/516,245, filed Apr. 27, 1990, now abandoned, by DESMOND W. YOUNG ET AL. for TRANSMIT DATA DESCRIPTOR STRUCTURE IN A MEDIA ACCESS CONTROL/HOST SYSTEM INTERFACE THAT IMPLEMENTS FLEXIBLE TRANSMIT DATA DESCRIPTOR STURCTURE UNIT.

TECHNICAL FIELD

The present invention relates to data communications systems and, in particular, to methods and apparatus for implementing a mechanism for handling zero length descriptors in a descriptor structure utilized in an interface between a local area networks's media access control (MAC) function and a host station attached to the network wherein the interface permits zero length descriptors in the descriptor structure.

BACKGROUND

Communication between stations in a data transmission network occurs through the transmission of a series, or "frame" of information characters, with adjacent frames being separated by explicit or implicit start-stop patterns. The use of a unique start pattern ("start delimiter") and a unique stop pattern ("end delimiter") allows the receiving station to identify the exact beginning and the exact end of each frame.

One type of network that has been enjoying increasing popularity is the token ring. A basic token ring network consists of a number of repeater nodes, each of which is connected by unidirectional transmission links to form a closed-loop ring. Information frames are transferred serially, bit by bit, around the ring from one repeater to the next, with each repeater regenerating and retransmitting each bit.

In addition to functioning as a retransmission element, each repeater on the ring also serves as a host station attachment point for insertion and retrieval of information by the host station. As an information frame circulates on the ring past a repeater, the frame's destination address field is compared to that of the attached host. If the host recognizes the destination address as its own, then it copies the frame.

A particular type of token ring network is defined by the Fiber Distributed Data Interface (FDDI) protocol. The FDDI protocol is an American National Standard (ANS) data transmission format which applies to a 100 Mbit/sec. token ring network that utilizes an optical fiber transmission medium. The FDDI protocol is intended as a high performance interconnection between a number of host computer systems as well as between the computers and their associated mass storage subsystems and other peripheral equipment.

As described by William Stallings, *Handbook of Computer-Communication Standards*, Volume 2, Howard W. Sims & Company, 1987, pp. 177–179, the FDDI token ring technique is based on the use of a small token frame that circulates around the ring when all stations are idle. A station wishing to transmit must wait until it detects a token passing by. It then captures the token by aborting token transmission as soon as the usable token is identified. After the token has been captured, the station is granted control of the transmission medium for up to a specified maximum time period during which it may transmit one or more frames onto the ring.

Information is transmitted on an FDDI ring in frames that consist of a sequence of 5-bit characters or "symbols" each symbol representing 4 data bits or control code. Information is typically transmitted in symbol pairs or "bytes".

FIG. 1 shows the fields which are used within the FDDI frame and token formats. A preamble field (PA), which consists of a sequence of Idle line-state symbols, precedes every transmission. The Start Delimiter field (SD) consists of a two control symbol start delimiter pair which is uniquely recognizable independent of symbol boundaries. As stated above, the Start Delimiter byte establishes the boundaries for the information that follows. The Frame Control field (FC) defines the type of frame and its characteristics; it distinguishes synchronous from asynchronous transmission, specifies the length of the address and identifies the type of frame. The Frame Control field uniquely distinguishes a token. The Ending Delimiter field (ED) of a token consists of two end delimiter control symbols and completes a token. The Destination Address (DA) and Source Address (SA) fields contain the destination and source addresses of the transmitted frame. The Destination Address field and the Source Address field are both either two bytes long or six bytes long, as determined by the Frame Control field. The Destination Address may be either an individual address or a group address. The Frame Check Sequence field (FCS), which/s four bytes long, contains a cyclic redundancy check using the ANS standard polynomial. The INFORMATION field, as is the case for all fields covered by the Frame Check Sequence field, consists only of data symbols. The End Delimiter of a frame is one end delimiter symbol (T) which is followed by the Frame Status field (FS) which consists of three control indicator symbols which indicate whether the addressed station has recognized its address, whether the frame has been copied, or whether any station has detected an error in the frame. The "T" followed by three control indicators represents the minimum end delimiter required by the FDDI protocol for a non-token frame. The protocol allows for additional pairs of control symbols in the End Delimiter or an additional odd number of control symbols followed by one last "T" symbol. All conforming implementations must be able to process these extended end delimiters without truncating them. The end delimiter "T" and the two control symbols "R" and "S" are uniquely encoded and distinguishable from either normal data or Idle symbols.

FIG. 2 shows the component entities necessary for a station to be in compliance with the FDDI protocol. The required components include a Station Management function (SMT) which resides in each host station on the network to control the overall action of the station to ensure proper operation as a member of the ring. A Physical Layer Medium Dependent (PMD) function provides the fiber-optic links between adjacent stations on the ring. A Physical Layer Protocol function provides the encoding, decoding, (PHY) clocking and synchronization functions. A Media Access Control function (MAC) controls access to the transmission medium, transmitting frames to and receiving frames from the Media Access Control functions of other stations.

The PHY function simultaneously receives and transmits. The PHY function's transmit logic accepts symbols from the Media Access Control function, converts these symbols to 5-bit code groups and transmits the encoded serial stream, using the capabilities of the PMD, onto the medium. The PHY function's receive logic receives the encoded serial stream through the PMD from the medium, establishes symbol boundaries based on the recognition of a start delimiter symbol pair and forwards decoded symbols to its associated Media Access Control function.

Additional information regarding the FDDI protocol is presented by Floyd E. Ross, "FDDI—an Overview" Digest of Papers, Computer Soc. Intl. Conf., Compcon '87, pp. 434–444, which is hereby incorporated by reference to provide additional background information relating to the present invention.

FIG. 3 shows a set of elements which cooperate to provide an integrated interface between an FDDI token ring and the MAC function.

A clock recovery device 10 extracts a 125 MHz clock from an incoming serial bit stream placed on the FDDI fiber optic transmission medium by the upstream station on the ring.

From a 12.5 MHz crystal reference, a clock distribution device 12 synthesizes the various clocks required by a Physical Layer Controller (Player) 14 and a basic Media Access Controller (BMAC) 16.

The Player 14 converts the 12.5 Mbyte/sec. stream retrieved from the BMAC 16 and decodes the incoming 4 B/5 B data into the internal code.

The BMAC 16 controls the transmitting, receiving, repeating and stripping of FDDI tokens and frames.

As shown in FIG. 4, the BMAC 16 includes a ring engine 18, a control interface 20, a PHY interface 22 and a MAC interface 24.

The ring engine 18 is the "heart" of the BMAC 16, implementing the ANS X3T9.5 MAC protocol for transmitting, receiving, repeating and stripping frames on the FDDI ring.

The control interface 20 implements the interface to the Control Bus (see FIG. 3) by which to initialize, monitor and diagnose the operation of the BMAC 16.

The PHY interface 22 provides a byte stream to the Player 14 via the PHY Request bus and receives a byte stream from the Player 14 via the PHY Indicate bus.

The MAC interface 24 provides the interface to the station's external buffering and control logic. A byte stream is provided to the buffering and control logic with appropriate control signals via the MAC Indicate bus. A byte stream is provided to the MAC interface with appropriate handshake control signals via the MAC Request bus.

Referring to FIG. 5, the ring engine 18 includes two major blocks, a receiver 26 and a transmitter 28, which share timer/counter logic 30 and a MAC parameter RAM 32.

The receiver 26 validates information from the FDDI ring, detects errors and failures, and produces appropriate control signals and flags that are used by the transmitter 28 and presented to the MAC interface 24. In addition, the receiver 26 delineates frames, tokens and fragments from the byte stream received on the PHY Indicate bus based upon identification of start and end delimiters.

The MAC parameter RAM 32 is a dual-ported RAM that, as implied, contains parameters such as the address of the associated station. The receiver 26 uses the values stored in parameter RAM 32 to compare received addresses with its addresses. The transmitter 28 also uses the parameter RAM 32 for generating the source address (SA) for all frames generated by the host station.

The transmitter 28 repeats frames from other stations on the ring and inserts frames from its associated host station into the ring in accordance with the FDDI timed-token MAC protocol. The transmitter 28 uses information provided by the receiver 26 to decode whether to repeat, strip or generate a frame. The transmitter 28 continues to repeat frames until a transmission request is conveyed by the host station to the ring engine 18.

A transmission request includes the requested service class (i.e., synchronous or asynchronous) and the type of token to capture and or issue. As stated above, a station gains the right to transmit by capturing the token. Once a token has been captured, the ring engine 18 waits until the data is ready to be transmitted by the station. As a frame is transmitted, it passes along the ring, with each sequential station inspecting it a byte at a time. The frame is repeated at every station and is eventually stripped by the station that originally transmitted the frame.

As further shown in FIG. 5, the transmitter 28 includes a transmitter state machine (TSM) 34, an FCS generator 36, a ROM 38 and multiplexing logic 40 for controlling the sourcing of data to the ring.

The transmitter state machine 34 provides sequencing through the fields of a frame that is to be transmitted to the ring.

The FCS generator 36 calculates the 32-bit CRC and appends it to the information from the data stream.

The ROM 38 is used to generate control symbol pairs that are transmitted with the frame as the End Delimiter and Frame Status fields.

The output multiplexer 40 is used to select the source of information to be placed on the PHY Request bus. As stated above, this information is either repeated from the PHY Indicate bus or independently generated by the associated station. Information can be generated either from the data stream, the ROM 38, the FCS generator 36 or from the parameter RAM 32.

The timer/counter block 30 includes all of the timers required to implement the ANS X3T9.5 MAC standard as well as several event counters. It also includes the token timing logic required for implementation of the FDDI timed-token protocol.

Referring to FIG. 6, the token timing logic 42 is controlled by the transmitter 28.

A token rotation timer (TRT) 44 is used to time token rotations on the ring from arrival to arrival. The longer the rotation time, the greater the amount of load on the ring. The timers in the token timing logic shown in FIG. 6 are implemented as up-counters that increment every 80 ns. The counters are reset by loading the twos complement of the threshold. This allows a simple carry to denote timer expiration.

A token holding timer (THT) 46 is used to limit the amount of ring bandwidth used by the station for asynchronous transmission after the token is captured by the station. Before each frame is transmitted, the value of THT is used to determine if the captured token is still usable for transmission. A token is usable for asynchronous traffic if THT has not reached the selected threshold.

Four asynchronous thresholds are supported by the BMAC 16; three are programmable and one is fixed at a negotiated target token rotation time (TTRT). Requests to transmit frames at one of the priority thresholds are serviced when the token holding timer 46 has not reached the selected threshold. When TRT reaches zero, a Late Flag is set indicating that the token is late. While the Late Flag is set, no asynchronous frames may be transmitted, but the token is available for synchronous transmission.

On an early token arrival, that is, the token arrives and the Late Flag is not set, TRT is loaded with a negotiated target token rotation time TTRT and counts up. On a late token arrival, i.e., the token arrives and the Late Flag is set, the Late Flag is cleared and TRT continues to count. When TRT expires then the Late Flag is not set, the Late Flag is set and TRT is loaded with TTRT. Accumulated lateness is implemented precisely as defined in the ANSI X3T9.5 MAC standard.

THT follows the value of TRT until a token is captured. When the token is captured, TRT may be reloaded with TTRT, while THT continues to count from its previous value (THT does not wraparound). THT increments when enabled. The incrementing of THT is disabled during synchronous transmission, for example. THT is used to determine if the token is usable for asynchronous requests. For these purposes, the token is considered as late 1-byte before it is actually late (to promote interoperability with less careful implementations).

Asynchronous threshold comparisons are pipelined, so a threshold crossing may not be detected immediately. However, the possible error is a fraction of the precision of the threshold values.

Should TRT expire while the Late Flag is set, TRT is loaded with TMAX and the recovery process is invoked, unless the inhibit recovery required option is set. The recovery required condition becomes true one byte time after TRT expires, also to promote interoperability with less careful implementations. When TRT expires and the ring is not operational, TRT is loaded with TMAX. TRT is also loaded with TMAX on a reset.

Additional information regarding the BMAC 16 is provided in the following co-pending U.S. patent applications, each of which is commonly-assigned with the present application to National Semiconductor Corporation:

1. Ser. No. 436,212, filed Nov. 14, 1989 by Hamstra for RAM-based Events Counter Apparatus and Method, now U.S. Pat. No. 5,089,957;
2. Ser. No. 445,964, filed Dec. 4, 1989 by Perloff for Apparatus and Method for Accessing a Cyclic Redundancy Error Check Code Generated in Parallel, now abandoned;
3. Ser. No. 444,628, filed Dec. 1, 1989 by Grow et al. for Asynchronous Priority Select Logic, now U.S. Pat. No. 5,051,986; and
4. Co-Pending Ser. No. 444,537, filed Dec. 1, 1989 by Grow for Ring Latency Timer.

The four above-mentioned applications are hereby incorporated by reference to provide additional background information relating to the subject invention.

In accordance with the present invention, the interface scans the byte count field on each newly fetched data unit descriptor. If the byte count field is zero, then the descriptor is never validated, no data fetches are requested and descriptor processing continues. Without this check, the interface must wait until the described data is fetched before processing continues. However, no fetch can occur with zero byte count. Therefore, the limitation that all data units must have data would be imposed. An interface in accordance with the present invention, thus, allows zero-length descriptors in a descriptor structure and does not force host software to waste time eliminating them and packing all non-zero length descriptors together.

The interface recognizes that the first descriptor of a request object that describes zero frames is a token capture request. Subsequent descriptors of the same object describe the frame data. Also, if the last descriptor of the object contains zero frames, it is a token release request. These descriptors can be queued independent of frame data availability. This mechanism allows the host to request token capture of any service class without necessarily having any data ready and to allow token issue after all data has been transmitted, all through the descriptor stream interface.

A better understanding of the features and advantage of the present invention will be obtained by reference to the following detailed description and accompanying drawings which set forth an illustrative embodiment in which the principles of the invention are utilized.

DESCRIPTION OF THE DRAWINGS

FIG. 11 is a schematic representation illustrating five descriptor types recognized and/or generated by the BSI.

FIG. 16 is a schematic representation illustrating Request Data Structures.

FIG. 21 is a table that provides a listing of the control and configuration register set.

FIG. 22 is a table that provides a listing of the PTR RAM register set.

FIG. 23 is a table that provides a listing of the LIMIT RAM register set.

FIG. 29 is a timing diagram illustrating waveforms for a ABus burst write.

FIGS. 30A–30C provide pinout arrangement for an interface system in accordance with the present invention.

DETAILED DESCRIPTION OF THE INVENTION

Conventions

The present invention provides an interface between the basic Media Access Control (BMAC) function described above and a host system attached to an FDDI token ring; this interface will be referred to herein as the BMAC System Interface, or BSI.

The following conventions will be used in describing the BSI:

Byte and Bit Ordering Conventions

1. The BSI may be operated in a "little-endian" or "big-endian" system. All descriptors handled by the BSI are two, 32-bit words at consecutive word-aligned addresses. This means descriptors are viewed in the same manner regardless of the "endian-ness" of the system. Byte streams are viewed differently however. The description below defines how the BSI addresses memory.

A word is 32 bits. Bit 31 is the most significant bit (msb) and Bit 0 is the least significant bit (lsb). A word comprises four bytes. The bytes are addressed in an incrementing fashion from byte address 0 to byte address 3 within a word. Little and big-endian systems differ in which word bits correspond to which byte address, as shown in Table I below.

All information which is not network data bytes (i.e., descriptors) is viewed as words, not bytes. Network data is a stream of bytes, ordered with respect to their relative time displacement on the ring. Table I shows the time ordering in little and big-endian systems. The bytes are sent to the FDDI ring, or received from the FDDI ring in alphabetical order, starting with byte A.

TABLE I

| Bit 31 | | | Bit 0 | Bit 31 | | | Bit 0 |
|---|---|---|---|---|---|---|---|
| Byte 0 | Byte 1 | Byte 2 | Byte 3 | Byte 3 | Byte 3 | Byte 1 | Byte 0 |
| A | B | C | D | D | C | B | A |
| Big-Endian Format | | | | Little-Endian Format | | | |

2. All Control Bus (CBus) registers are accessed 8 bits at a time. The registers use the following bit-order convention:

Bit 7→MS byte, low byte address→Bit 0

Bit 7→LS byte, high byte address→Bit 0

INTRODUCTION

BSI Overview

Figure 1:
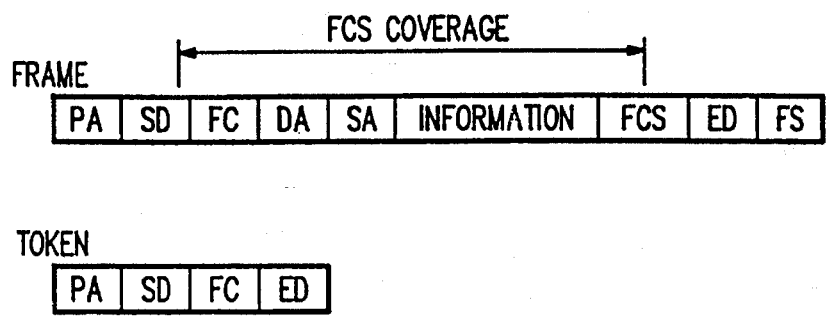
FIG. 1 illustrates the FDDI frame and token formats.
Figure 2:
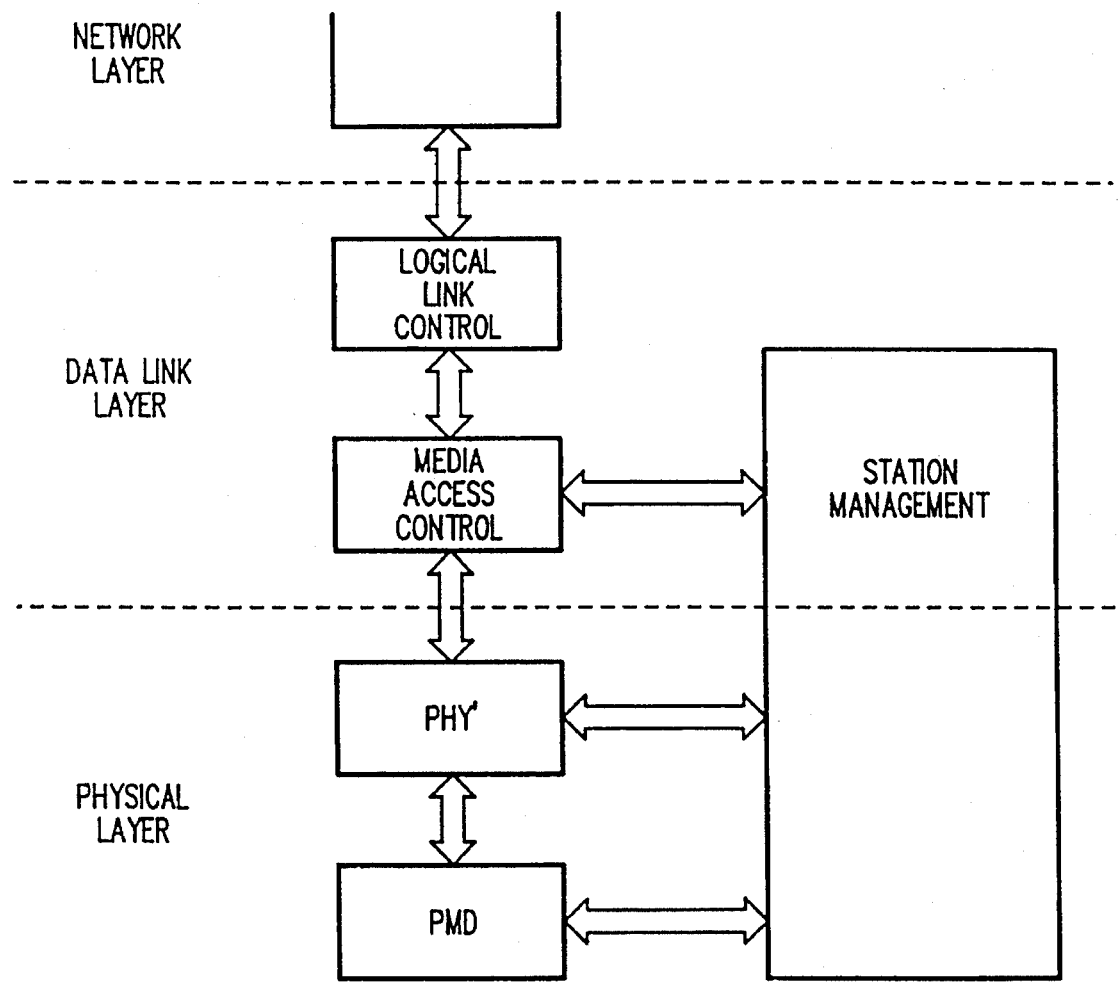
FIG. 2 is a block diagram illustrating the components necessary for a station to be in compliance with the FDDI protocol.
Figure 3:
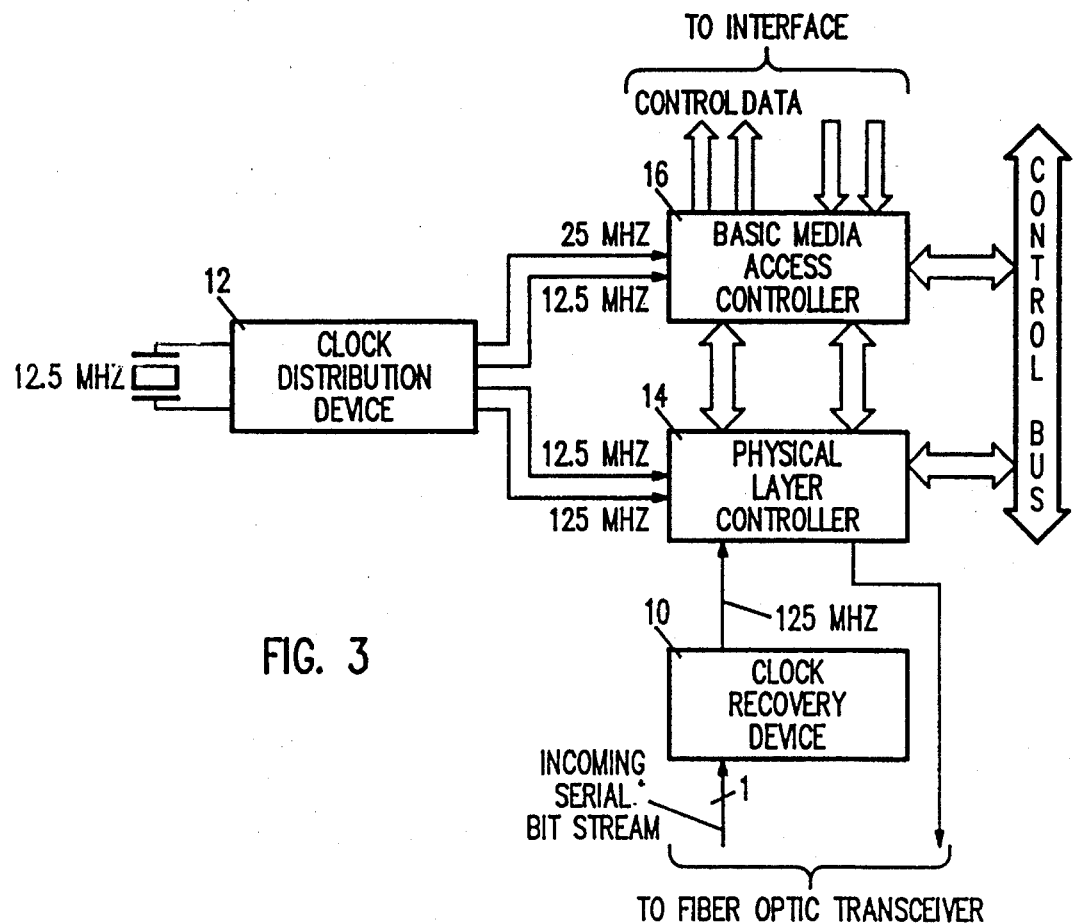
FIG. 3 is a block diagram illustrating elements which cooperate to provide an integrated interface between a host station and an FDDI token ring.
Figure 4:
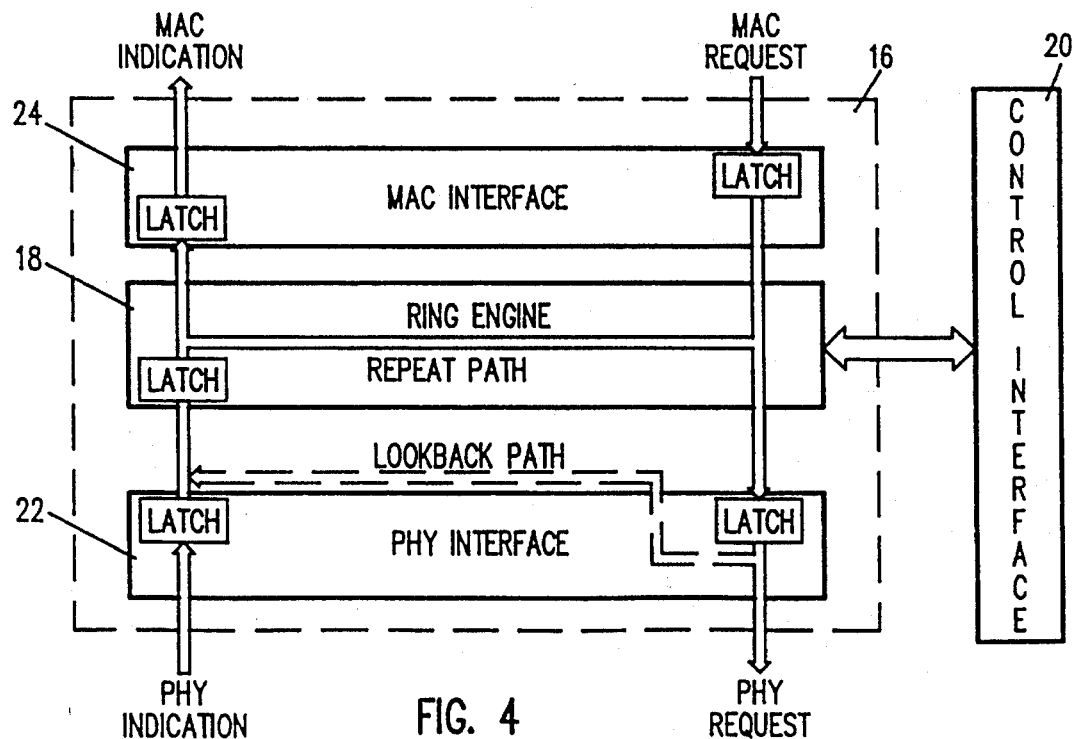
FIG. 4 is a block diagram illustrating the components of an embodiment of a FDDI basic Media Access Control (MAC) function.
Figure 5:
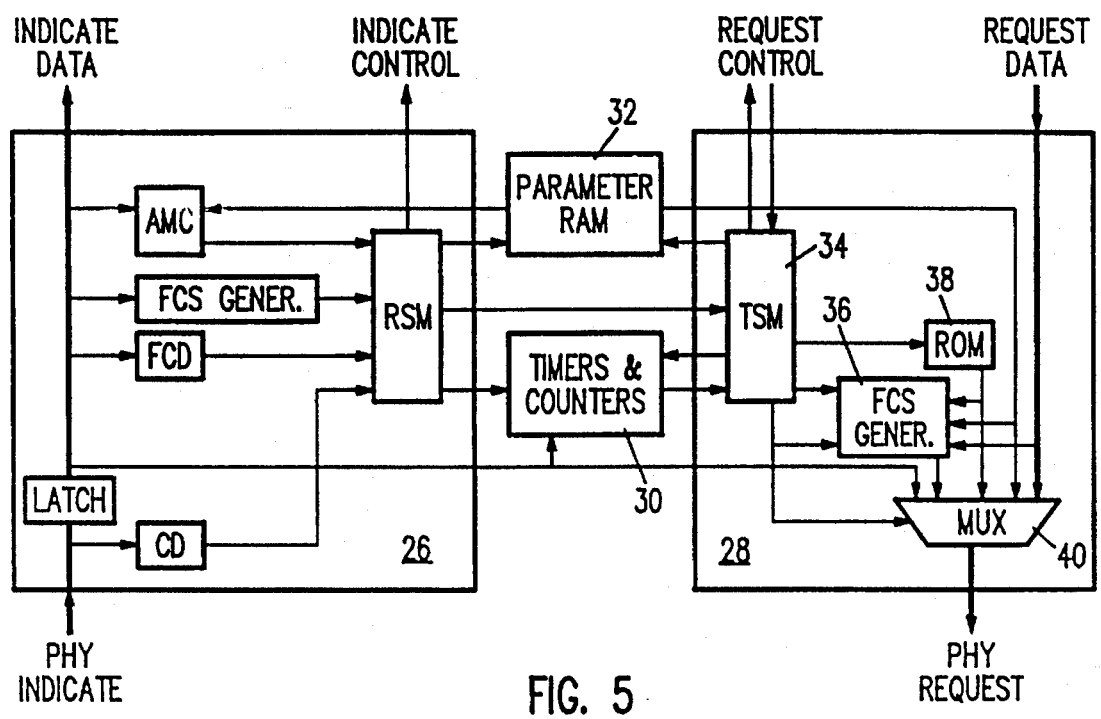
FIG. 5 is a block diagram illustrating an embodiment of a BMAC ring engine.
Figure 6:
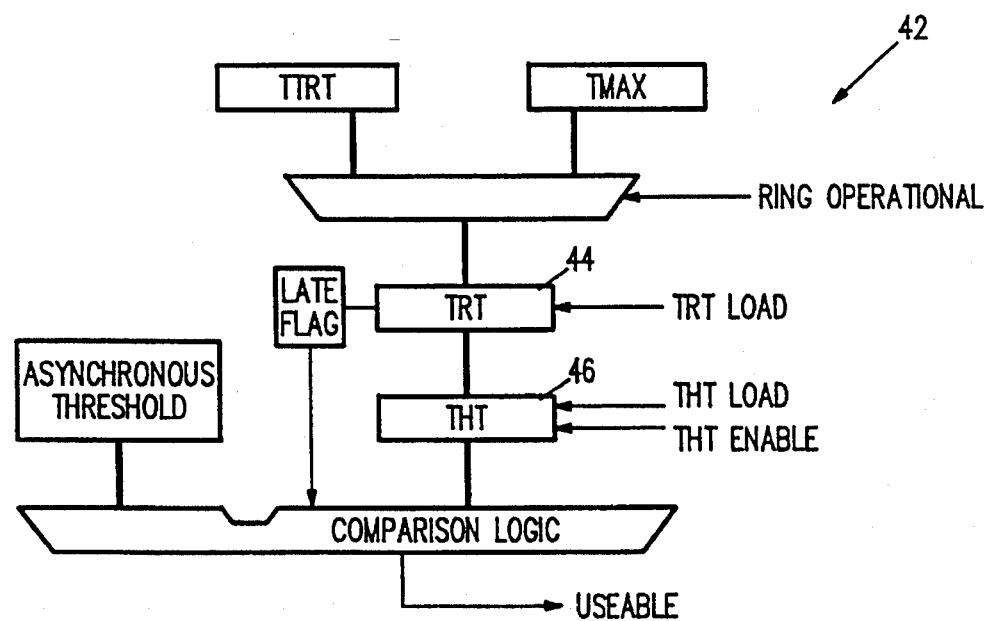
FIG. 6 is a block diagram illustrating an embodiment of BMAC asynchronous priority select logic.
Figure 7:
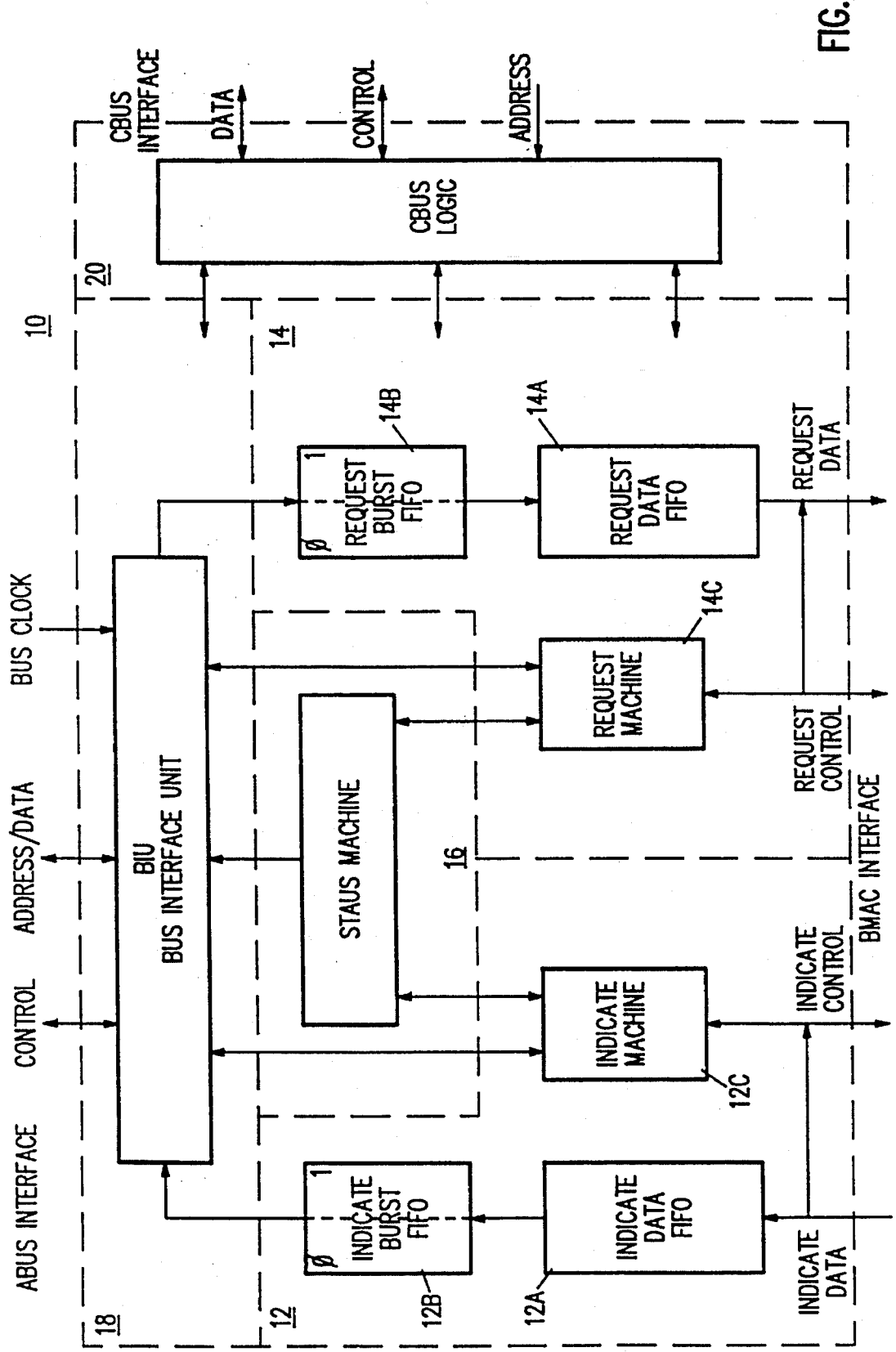
FIG. 7 is a block diagram illustrating an embodiment of a BMAC System Interface (BSI) in accordance with the present invention.

An FDDI BMAC System Interface (BSI) 10 in accordance with the present invention, shown in block diagram form in FIG. 7, implements an interface between the BMAC (described above) and a host system. It is designed to efficiently provide a high performance, low cost interface for a variety of hosts, but particularly for high-performance virtual memory systems. The BSI 10 is capable of operating directly on the system bus to main memory or connected to external shared memory. As described in greater detail below, the BSI 10 incorporates transmit and receive state machines and multiple DMA channels for moving data and descriptors.

The BSI 10 can operate within any combination of cached/non-cached, paged or non-paged memory environments. When operated within a paged environment, the BSI 10 utilizes a 4K byte page size. To provide this capability, all data structures are contained within a page and bus transactions never cross a page. These extra capabilities are not required in non-paged environments. The BSI 10 performs all bus transactions within aligned blocks to ease interface to a cached environment.

The BSI 10 has two bus interfaces: a datapath bus and a control bus.

The main datapath bus is a 32-bit multiplexed address/ data memory interface called ABus. The BSI architecture supports up to a 30-bit physical address, but the implementation provides a 28-bit physical address.

ABus supports burst mode transfers to allow the use of nibble-mode/static column/page mode DRAMs, or static RAMs. ABus can operate with virtual or physical address generation by the BSI 10. When operating with virtual addressing, the BSI 10 emits a virtual address, which is translated and driven onto the address bus by an external memory management unit (or simpler mapping logic). With either addressing mode, the BSI 10 can operate in a multi-master environment.

The control bus is an 8-bit non-multiplexed bus called CBus. It uses a simple asynchronous strobe and acknowledge protocol.

To provide maximum performance and system flexibility, the BSI 10 utilizes two independent clocks, one for the MAC interface (i.e the ring) and one for the system/memory bus (i.e. ABus). The BSI 10 implements and provides a fully synchronized interface between these two timing domains.

Figure 8:
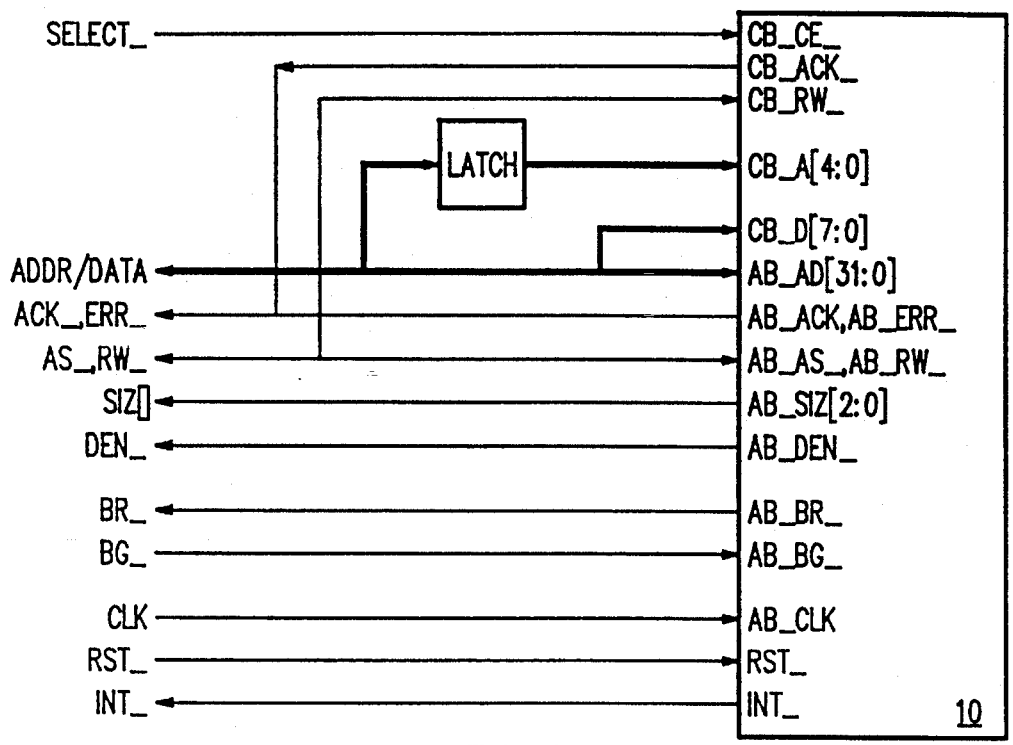
FIG. 8 is a block diagram illustrating a BSI connected directly to the host's system bus.
Figure 9:
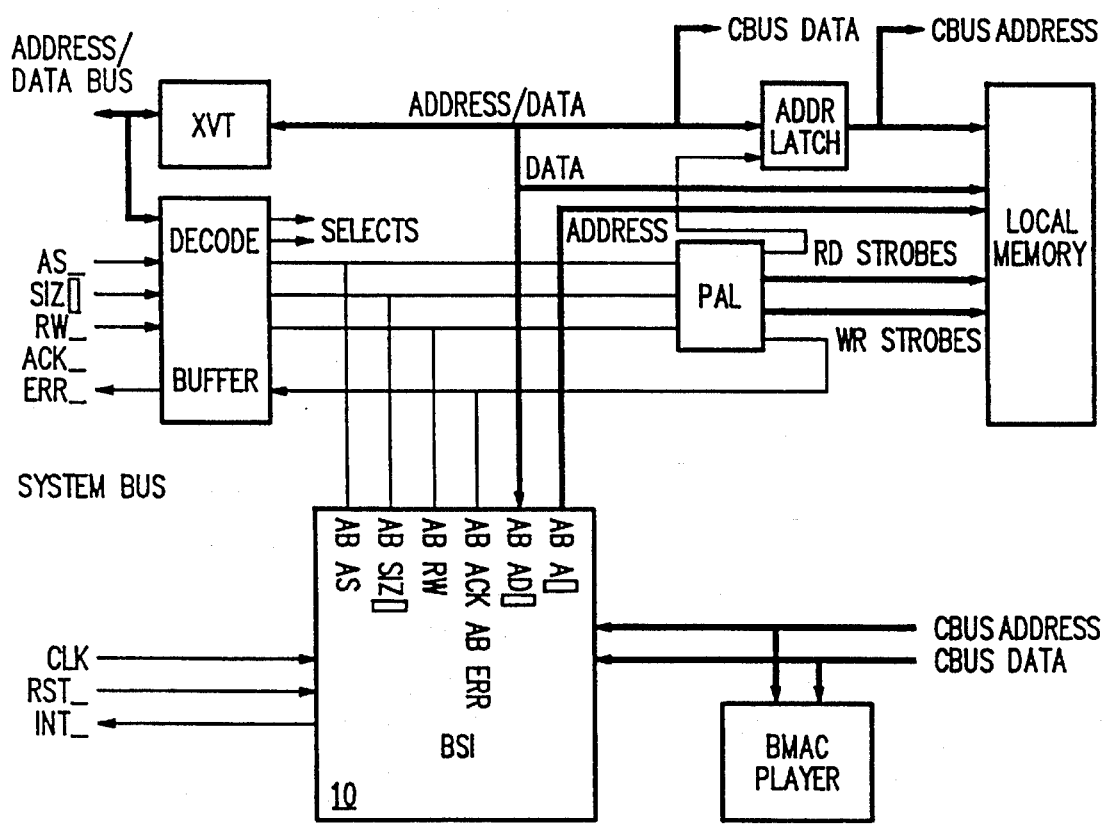
FIG. 9 is a block diagram illustrating a BSI utilizing shared memory.

FIG. 8 shows the BSI 10 connected directly to the host's system bus for highest performance. FIG. 9 shows the BSI 10 utilizing shared memory for local buffering.

The BSI 10 provides an interface to MAC data services that utilizes external memory for data structures and most of the communication. The BMAC decodes the symbol stream provided by the PLAYER and signals frame boundaries and event conditions. The BSI 10 maps the BMAC data streams into external memory.

The BSI 10 accepts requests from the associated host to transmit multiple frames (SDUs, defined below) from system memory to the network. On transmission, it unpacks the 32-bit wide memory data and sends it a byte at a time to the BMAC. On reception it receives the byte stream from the BMAC, packs it into 32-bit words and writes it to system memory. The host software and the BSI 10 communicate via external memory-based queues, which may be synchronized by interrupts.

Definitions

The following terms will be used in this detailed description of the invention:

Signal States

A signal has two logical and three physical states. The three physical states are high, low and high impedance. The high state is the more positive voltage level. The low state is the more negative voltage level. The high impedance condition exists when the output is not actively driven to either the high or low state.

There are two logical conditions, true and false. To avoid confusion, the terms "assertion" and "negation" are used to represent a signal's logical state. The term assertion is used to indicate a signal in its true state. The term negation is used to indicate a signal in its false state.

Since there are both positive and negative logic, a signal may be true (active) high or true (active) low. The terms assertion and negation are irrespective of whether the signal is active-high, or active-low. An active-low signal is indicated by an underscore at the end of the signal name, e.g. low_signal_.

The term "reset" is generally used to refer to the initialization of the BSI 10 (or logic part thereof) as a result of asserting the external RST_pin, or asserting the software Master Reset bit.

Storage Allocation

The BSI 10 interfaces to byte-addressable memory, but always transfers information in words. The BSI uses a word width of 32 data bits plus 4 byte-parity bits. Parity may be ignored.

To maximize bus efficiency, the BSI always transfers bursts of information. Transfers are always aligned to burst-size boundaries. The BSI 10 uses a burst-size of 1 word for control information transfers, and dynamically continues the interface to 1, 4 or 8-word bursts for data transfers.

The maximum unit of contiguous storage allocation in external memory is a "page". The BSI 10 uses a page size of 1K or 4K bytes (256 or 1K words, host-selectable) for control information space, and a page size of 4K bytes (1K words, fixed size) for data space. Data objects (i.e. SDUs/frames) may span multiple disjoint or contiguous pages.

To address memory, a "pointer" comprising a 1-bit page number and a 12-bit "offset" is used. This provides a virtual physical addressing capability of 28 bits. When transferring data units, this pointer is incremented until it hits the page boundary, when a new page is used. When transferring control units, the pointer is incremented to the page bounds, then wraps around to the start of the page again. This special structure is known as a "Queue".

Information Hierarchy

The BSI 10 and host system interact by exchanging two kinds of "objects":

1. control objects are interpreted by the BSI 10 and may alter its behavior.
2. data objects are not interpreted by the BSI 10 and are passed to/from the BMAC.

Control and data objects are kept separate in external memory. Each object has a single owner at any time, facilitating reliable synchronization across the ABus interface.

An object may comprise one or more "Parts" in external memory. Each Part of an object must be contiguous and wholly contained within a memory page.

A "single-part" object comprises:

1. one Only Part

A multi-part object comprises:

1. one First Part,
2. zero or more Middle Parts
3. one Last Part.

The object parts are identified by a two-bit tag field which uses a First bit (in bit[31]) and a Last bit (in bit[30]). The result is shown below in Table II.

TABLE II

| First | Last | Descriptor Type & Use |
|---|---|---|
| 1 | 0 | First in an object |
| 0 | 0 | Middle in an object |
| 0 | 1 | Last in an object |
| 1 | 1 | Only, i.e. is First & Last |

Each part of an object is described by a "Descriptor". In accordance with an aspect of the present invention, descriptors contain a "first" flag and a "last" flag to delimit objects. Descriptors with neither flag set are "middle"; those with both set are "only". "First" or "only" must follow "last" or "only" and "first" or "middle" must precede "last". Otherwise, a consistency failure is detected. This mechanism allows descriptor consistency checking so that frames described by bad descriptors are not transmitted to the ring.

A "Stream" is a flow of logically related information in one direction. Objects are transferred between the BSI 10 and the host in streams. There is a separate kind of stream for each kind of object.

A descriptor that points to a part of a data object or control stream contains a location field and a "size" field. The location is the address of the first byte of the part in memory. The size is the length of the part in memory (in bytes for data unit parts, in words for control stream parts).

A "Message" is a control object comprising a set of command or status parameters. A message does not have location and size fields since it contains the information, rather than pointing to it.

A frame, or "Service Data Unit (SDU)" is the unit of data transfer between a service user and a service provider. The BSI 10 transfers MAC SDUs, i.e. MAC frames, between the BMAC and external memory. A frame may be contiguous in external memory, or it may comprise multiple separate Parts. Each frame part is called a "Data Unit". For each Data Unit there is a "Data Unit Descriptor (DUD)". There are First, Middle, Last and Only DUDs, according to which part of the SDU it describes. There are Data Units and Descriptors for input and output, where each kind of part is termed: Input Data Unit (IDU), Output Data Unit (ODU), Input Data Unit Descriptor (IDUD), and Output Data Unit Descriptor (ODUD).

Figure 10:
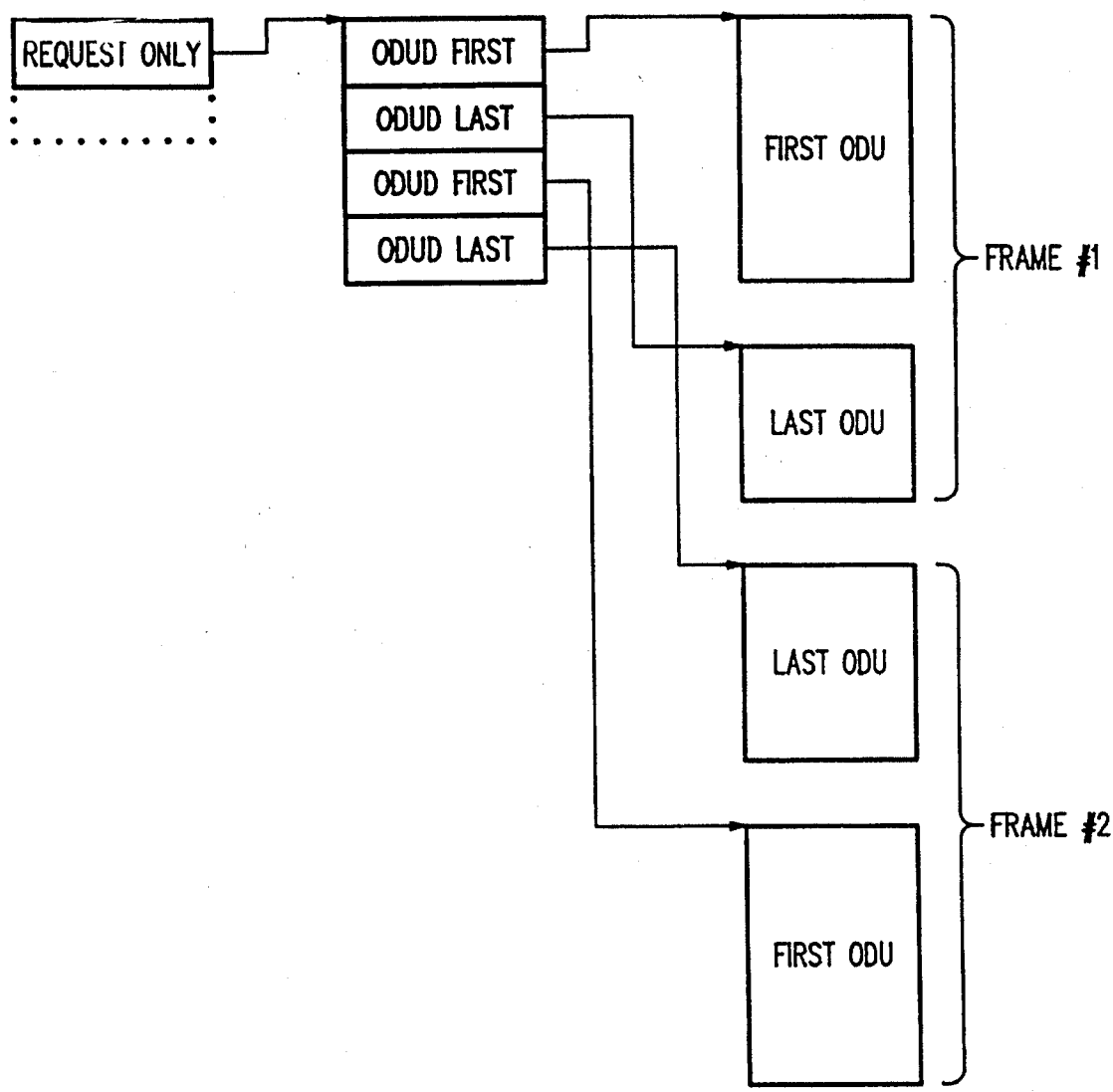
FIG. 10 is a schematic representation illustrating an output request of two frames.

For example, FIG. 10 shows an example of an output (to ring) request of two frames, where each frame comprises two parts. This will have the following structure:

1. a REQ descriptor pointing to two ODU Descriptor objects (one for each frame);
2. where each ODU Descriptor object comprises an ODUD.First, and an ODUD.Last;
3. where each ODUD points to an ODU part;
4. where each of the four ODU (parts) contain a part of a frame.

There are five descriptor types recognized and/or generated by the BSI 10. These are shown in FIG. 11 and listed below.

1. DUD: a Data Unit Descriptor describes the location and size of Data Units. ODUDs are fetched on output channels so that frame parts may be assembled for transmission. IDUDs are generated on input channels to describe where the BSI 10 wrote each frame part.

2. REQ: a Request descriptor conveys operational parameters and commands to the BSI.

3. CNF: a Confirmation status message (descriptor) describes the result of a Request operation.

4. PSP: a Pool Space Descriptor describes the location and size of a region of free memory space.

The receive interface generates input data unit descriptors (IDUDs) pointing to the FC byte immediately preceding the frame DA for IDUD.Fs (and directly to the data unit start for IDUD.noFs) with byte count, data pointer and F/L flags in the same two word format that the transmit interface accepts (ODUDs). This transmit and receive data descriptor format capability allows the host to retransmit frames simply by pointing the transmitter at the descriptor list, moving/altering neither data nor descriptors. This reduces host processing overhead when retransmitting received information.

SAPs & Channels

The BSI 10 provides an interface to MAC data services for one or more BMAC users, e.g.

1. A SMT entity is a MAC user (in every station).
2. A LLC entity is a MAC user (in end stations).
3. A Relay entity is a MAC user (in bridges).

Each MAC user accesses MAC data services via one or more "Service Access Points (SAPs)". A MAC user may use one or more SAPs, but a SAP is never shared by more than one MAC user. The BIS 10 provides five SAPs: two Request (output, toward the ring) RSAPs, and three Indicate (input, toward host) ISAPs. These SAPs may be assigned as follows:

1. RSAP_0 and RSAP_1 on output for synchronous and asynchronous transmission, respectively.
2. ISAP_0, ISAP_1 and ISAP_2 on input for MAC-SMT, synchronous and asynchronous transmission respectively.

The BIS 10 provides four different options for SAP assignment to provide tailored support for different applications. The four options are basically: Sync/Async, High/Low priority Async, Internal/External Address (for bridging applications), and Header/Remainder (for high-speed protocol processing).

The BIS 10 provides five "Channels". A channel controls the transfer of related objects between the BIS 10 and external memory. The channels are used to implement the SAPs. There is one channel for each SAP. The use of multiple channels allows each SAP to appear independent and concurrent (with some limitations).

Each channel has Direct Memory Access (DMA) capability via Subchannels that control the transfer of a single type of related object within a channel.

A request channel has four subchannels: output data stream, ODU descriptor stream, CNF message stream and REQ descriptor stream.

An indicate channel has three subchannels: Input data stream, IDU descriptor stream, and PSP descriptor stream.

Attention/Notify

The BIS 10 is capable of operation in a polled or interrupt-driven environment. The interrupt scheme is designed to minimize the number of interrupts given to the host. The BIS 10 generates an interrupt, called an "attention", by setting the appropriate event's attention bit in an event register. The host may have this attention generate an interrupt by setting the corresponding "notify" bit (i.e. disabling the mask).

Certain attention bits are signals when both set and reset. The BIS 10 sets the bit to signal an attention to the host. The host resets the bit to signal completion/recognition to the BIS 10. This may cause the BIS 10 to take some processing action (for example, read a mailbox).

DETAILED DESCRIPTION

Referring back to FIG. 7, the BSI 10 generally comprises the following five modules: an Indicate (receive) module 12, a Request (transmit) module 14, a Status Generation/Space Management module 16, a Bus Interface Unit module 18, and a Control Bus (CBUS) interface module 20. The Indicate and Request modules 12,14 are independent, pipelined machines. Each pipeline includes a BMAC interface, a data FIFO (12A,14A), a burst FIFO (12B,14B) and state machines (12C,14C).

Each data FIFO (12A,14A) is 64 bytes deep, arranged as 16 words. Each word is 42 bits wide. In the Indicate data FIFO 12A, a word comprises 32 data bits, 4 parity bits (one per byte), a 4 bit tag that identifies the receive channel (ISAP) on which the word is to be transformed to system memory and the "type" of word (i.e. uncommitted, commital, status), and 2 unused bits; in the Request data FIFO 14A, a word comprises 32 data bits, 4 parity bits, and a 6 bit tag (described below). The data FIFOs (12A,14A) are designed to cover bus latency.

At End-of-Frame (EOF) the MAC interface tags one final word as frame status and places the status word into the Indicate data FIFO 12A behind the data. The system interface reads the data out before processing the status and writes an EOF status descriptor. The EOF status descriptor identifies the EOF conditions, includes EOF indicators (e.g. error, copy) and establishes breakpoints (described below). Data/status synchronization is automatic and no other communication between the MAC interface and the system interface is necessary. This allows any number of frames to be placed into the Indicate data FIFO 12A without complex data/status synchronization. It also allows full FIFO utilization when receiving many small frames, thereby reducing the chance of dropped frames due to long bus latency. It also permits design flexibility in that the Indicate data FIFO 12A may be any depth.

The Indicate data FIFO 12A can reset its write pointer to flush unwanted data.

Each burst FIFO (12B,14B) must hold a complete bus burst and is arranged as 16 words of 32 bits. Since a burst is a maximum 8 words, the burst FIFOs (12B,14B) are used in a "ping-pong" fashion to provide two banks (0,1), each holding one burst. As described below, the BIU module 18 always reads or writes a complete burst into one bank. The Indicate state machine 12C or Request state machine 14C reads out the appropriate number of bytes from the bank.

That is, and as described in greater detail below, a data pointer and count are used to calculate the most efficient bus transaction(s) to perform when fetching/storing the required data. Longer bursts are more efficient, but only if "enough" of the bytes are required. By updating the pointer and counter with each bus transaction, the most efficient transaction is dynamically computed. Thus, the fewest burst cycles possible are used to transfer the required data, minimizing the bus bandwidth requirements of the system interface.

For example, on the last write of a frame into memory, only five bytes of the burst may be valid. In this case, the Indicate state machine 12C only writes five valid bytes into the bank, but the BIU module 18 writes out the complete bank. This is acceptable since, as stated above, all received frames are aligned to a burst-size boundary and the DUD written will contain a count of the actual number of valid bytes in the frame.

The burst FIFOs (12B,14B) are also used as the asynchronous boundary between the lower level logic operations at the ring clock and the BIU logic operating at system bus clock.

The state machines (12C,14C) will be described in greater detail below.

The status generation/space management module 16 is shared between Request and Indicate pipelines.

The BIU 18 handles all ABus traffic, while the CBus interface 20 provides access to event/attention control.

The BIU interface 18 is a 32-bit memory bus port which is used to transfer all datapath information to/from the BSI 10. This includes data, descriptors and status. The bus uses 32-bit multiplexed address and data and provides burst transfer capability for maximum bandwidth.

The host uses the CBus 20 to access the BSI's internal registers and to manage the attention/notify logic.

Figure 12:
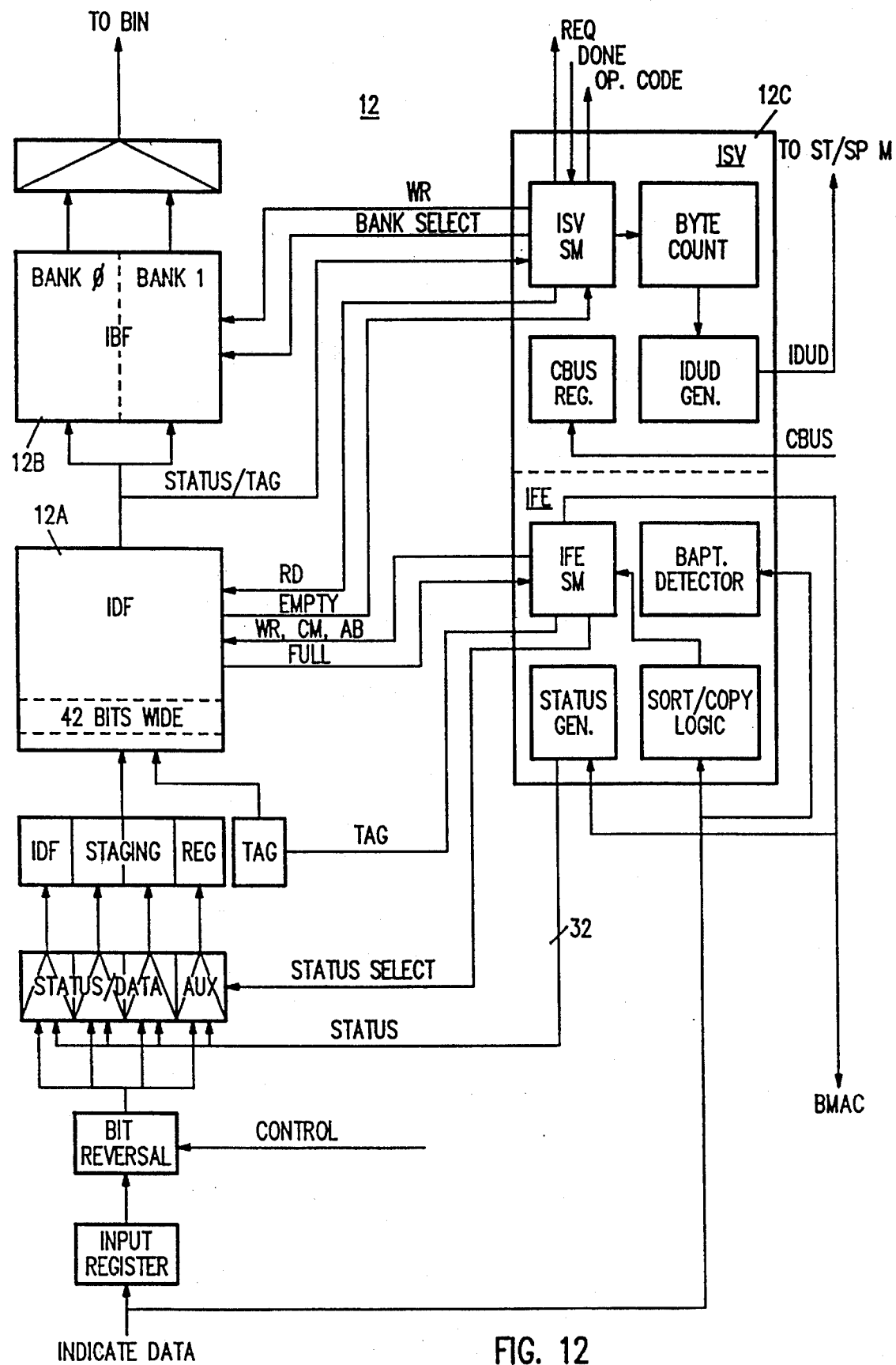
FIG. 12 is a block diagram illustrating the architecture of the Indicate module.

A more detailed illustration of the Indicate module 12 is provided in FIG. 12.

A more detailed illustration of the Request module 14 is provided in FIGS. 13A–13F.

Figure 14:
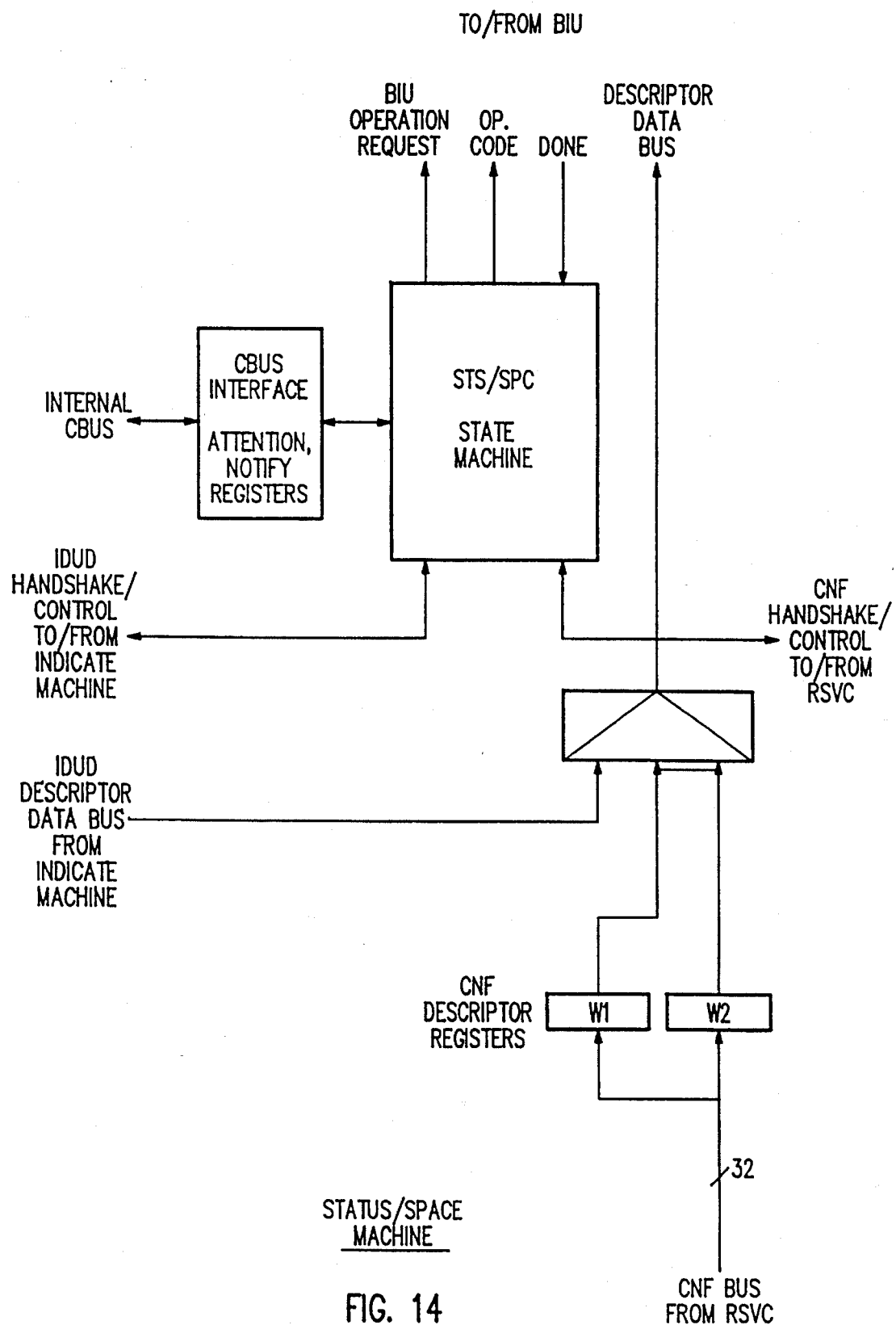
FIG. 14 is a block diagram illustrating the architecture of the status generation/space management module.
Figures 1, 15A:
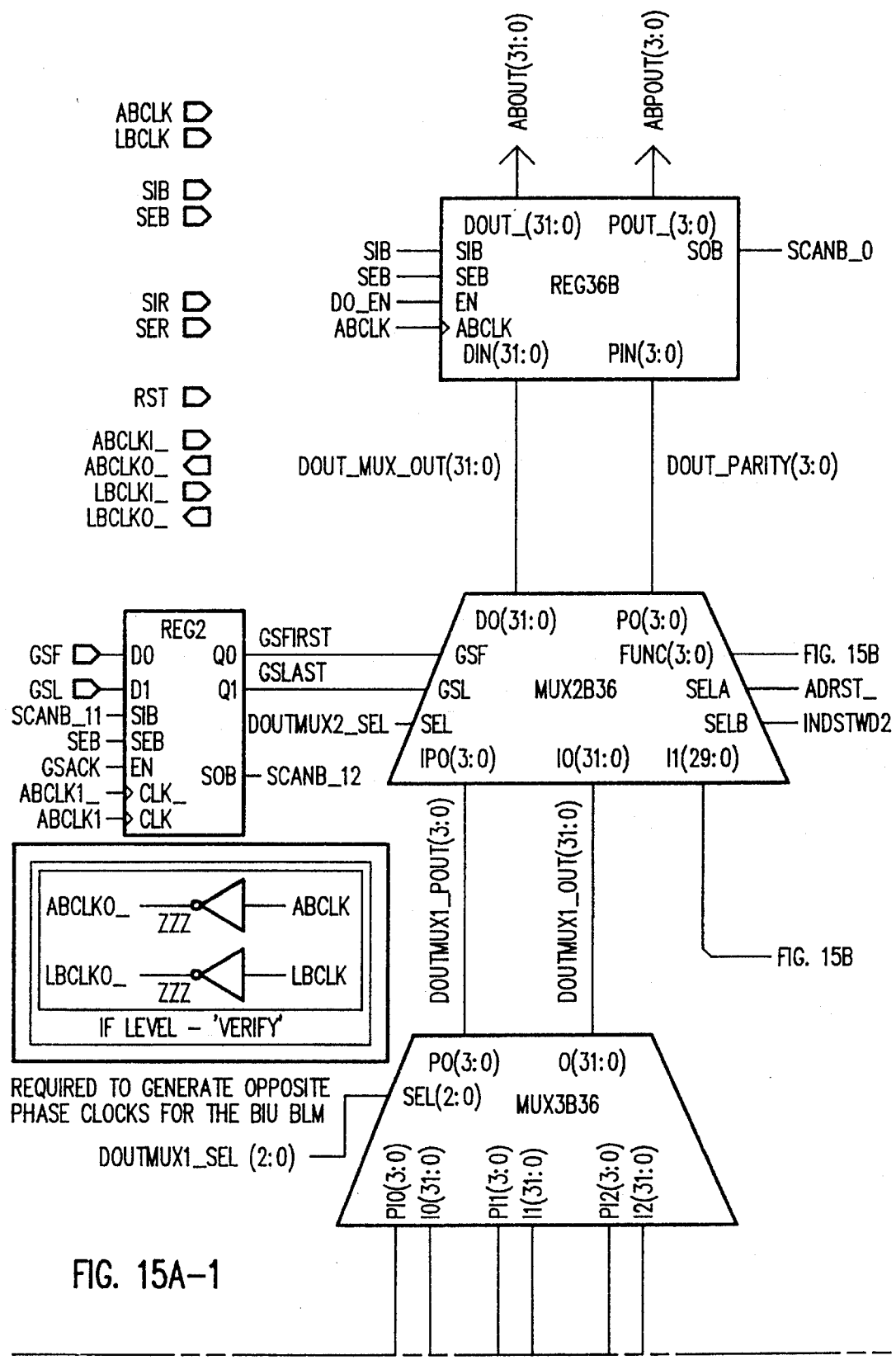
FIGS. 15A, 15B, 15C and 15D combine to provide a block diagram illustrating the architecture of the bus interface unit module.
Figures 2, 15A:
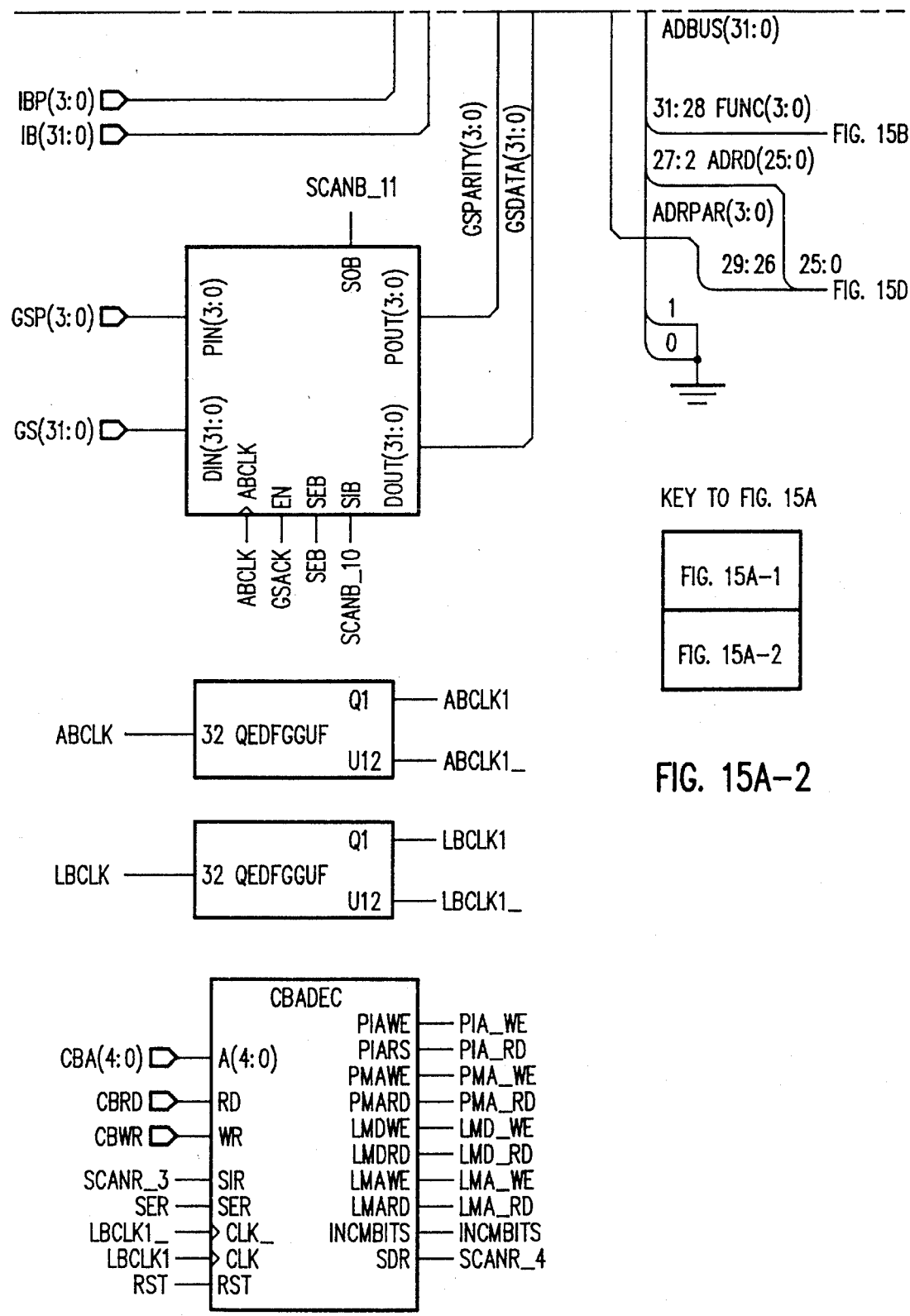
Figures 1, 15B:
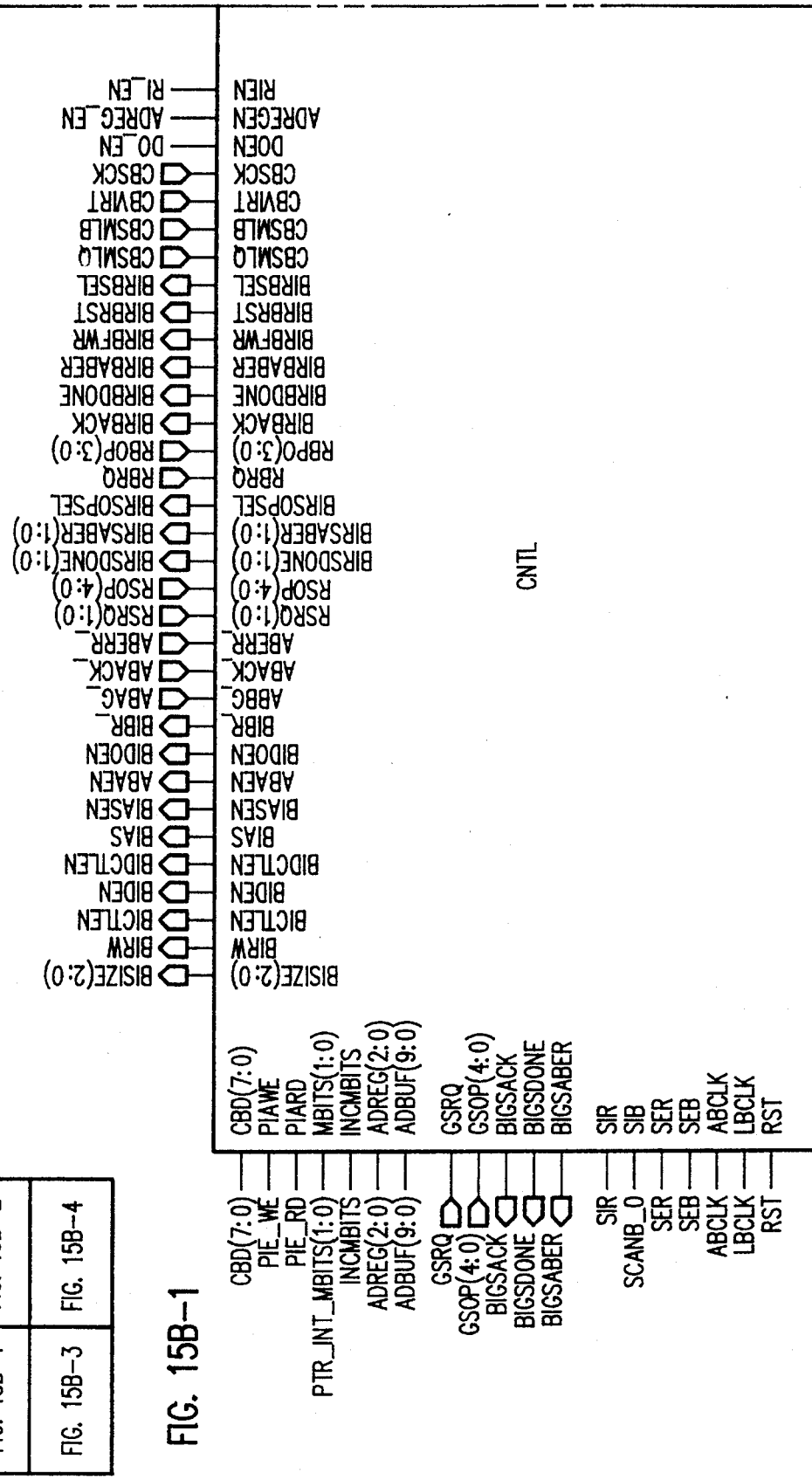
Figures 2, 15B:
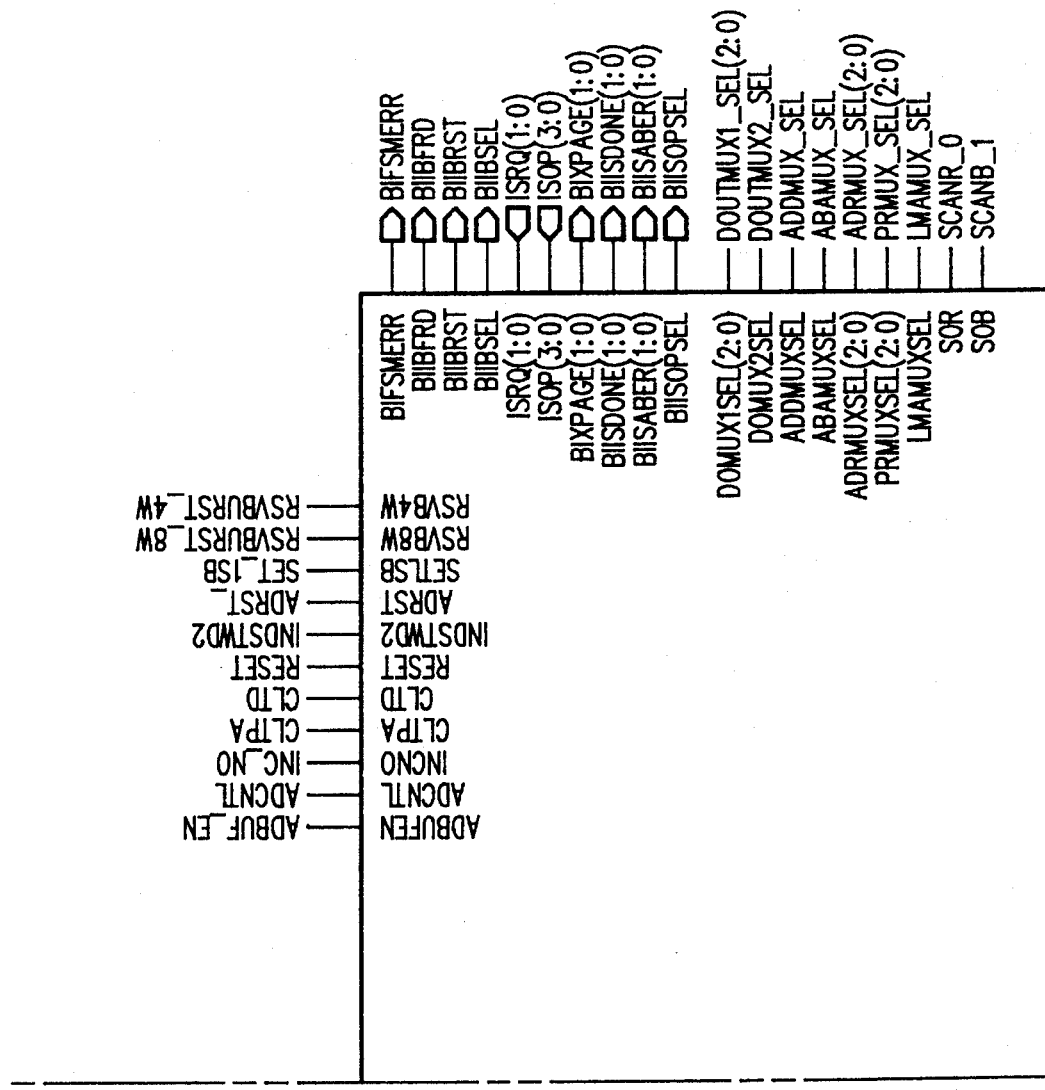
Figures 3, 15B:
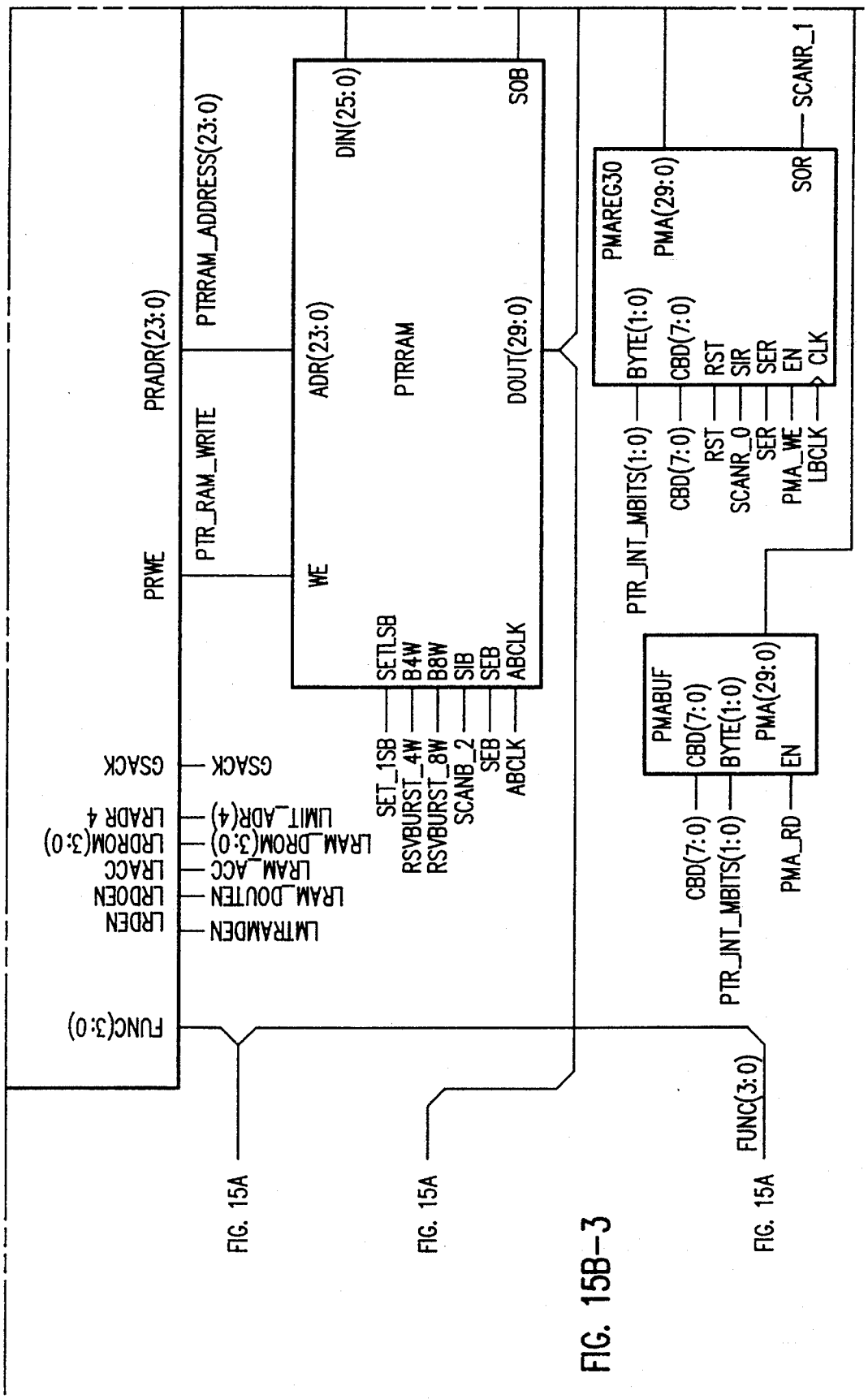
Figures 4, 15B:
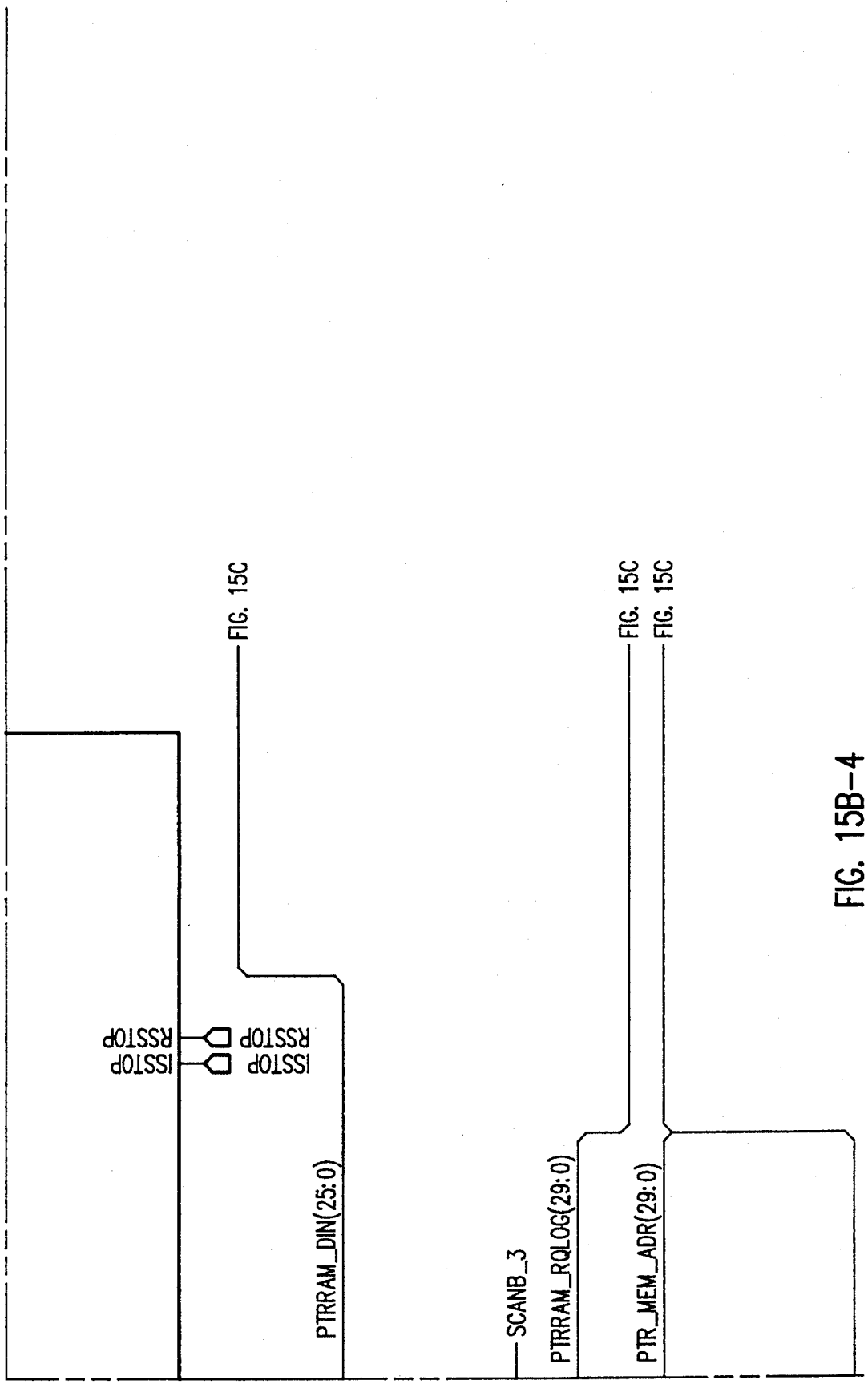
Figures 1, 15C:
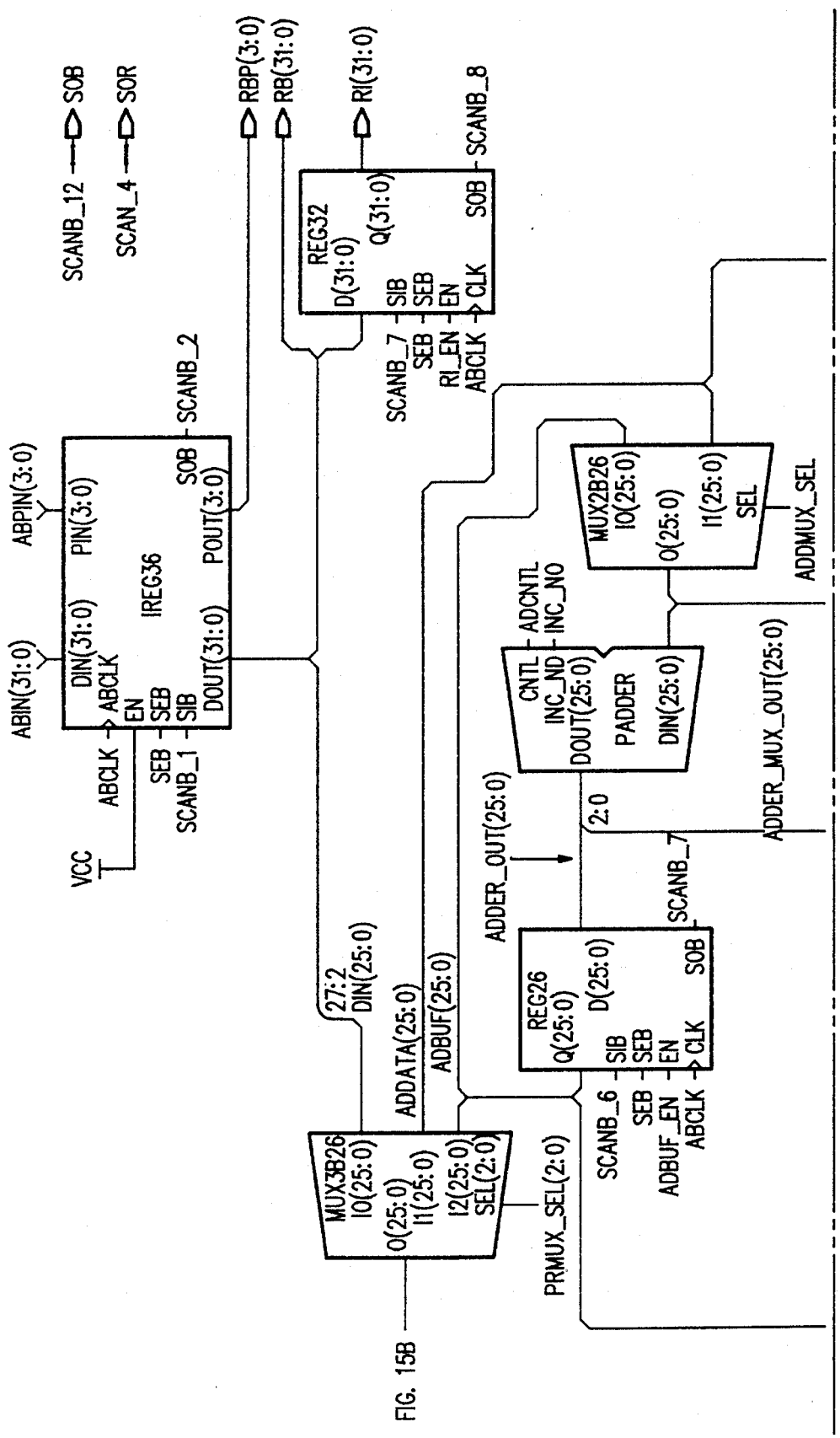
Figures 2, 15C:
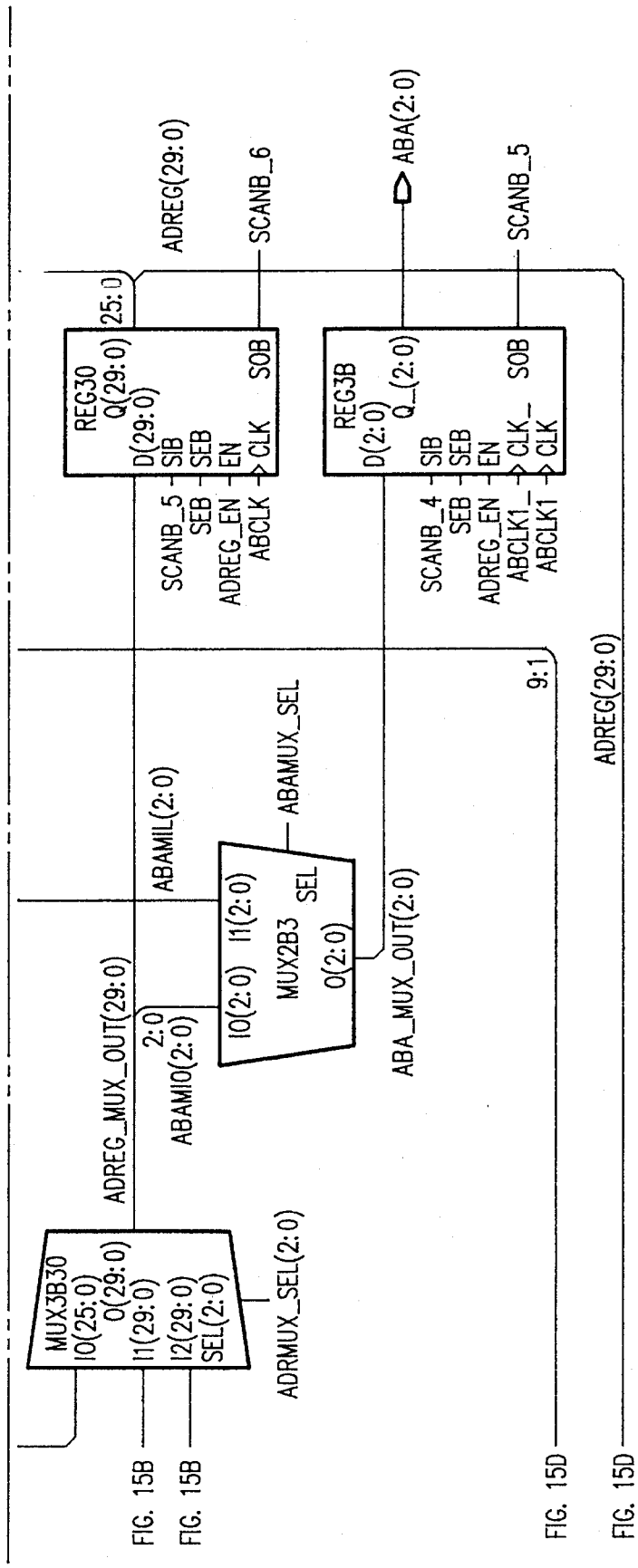
Figures 1, 15D:
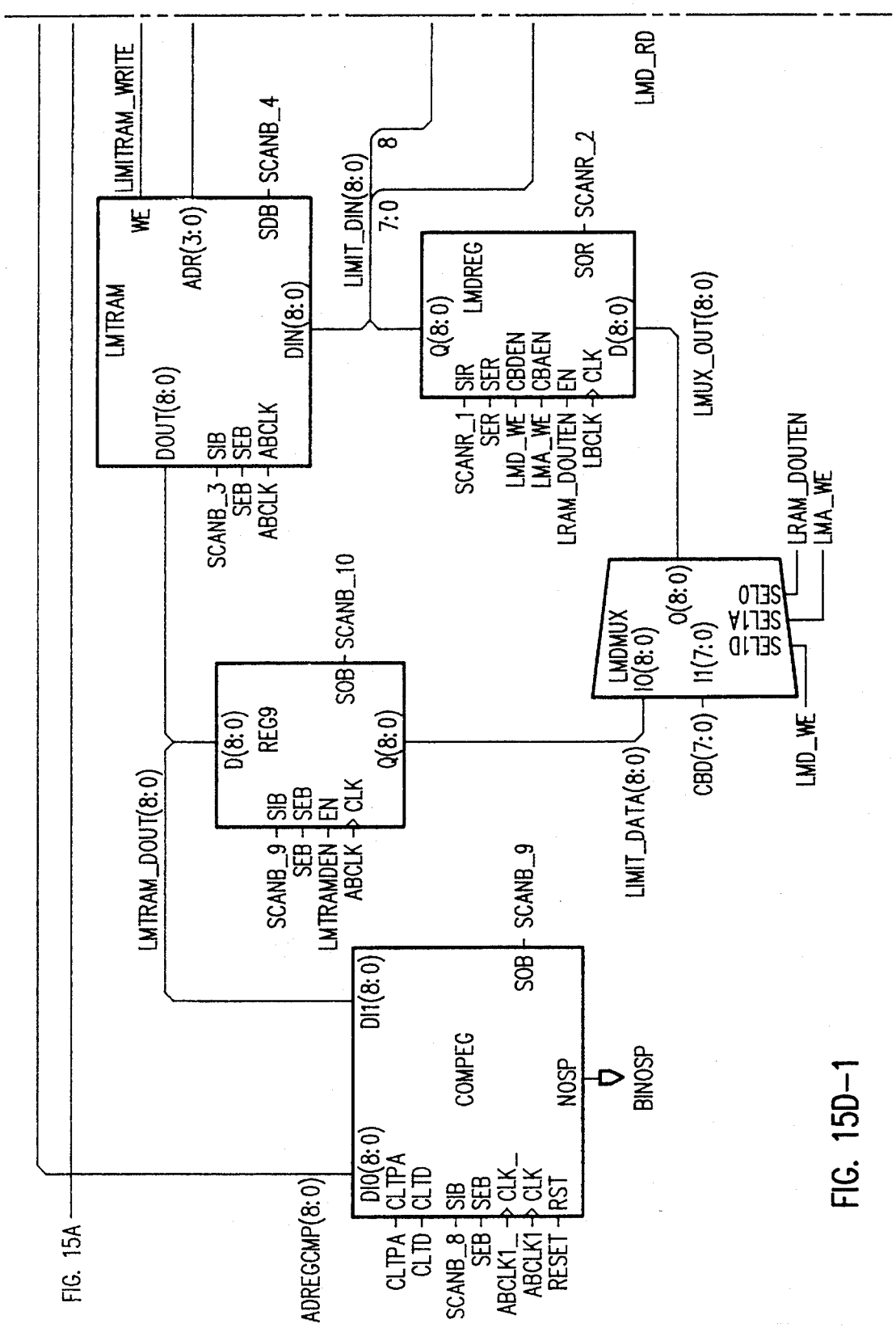

A more detailed illustration of the status generation/space management module 16 is provided in FIG. 14.

A more detailed illustration of the Bus Interface Unit module 18 is provided in FIGS. 15A–15D.

Reference will be made to these various figures, as appropriate, throughout the remainder of this Detailed Description of the Invention.

DATA STRUCTURES

The BSI 10 uses simple data structures which can be easily mapped to any higher level interface via a software driver. As discussed in greater detail below, the data unit structures are basically symmetric on input and output.

The BSI 10 divides memory into fixed size pages. This provides ideal support for a virtual memory environment and reduces the amount of logic used for DMA management (pointers).
Data Types The BSI 10 deals with Data Units, Data Unit Descriptors (DUDs), Request Descriptors (REQs), Confirmation Messages (CNFs), and Pool Space Descriptors (PSPs). As stated above, descriptors may be a multi-part object, where each part is identified by First-Last tags.
IDU.ODU (Input/Output Data Units)

An IDU/ODU is a group of contiguous bytes which form all or part of a Service Data Unit (SDU). Each IDU/ODU may be a whole page, or only part of a page, but always fits within the page. There are Data Units for input and output, i.e. IDUs and ODUs, respectively. A (request) ODU is stored in a memory area defined by the host. The BSI writes (indicate) IDUs into memory areas delimited by Pool Space descriptors (PSPs). Each ISAP fetches PSPs when required from its own PSP Queue.
DUDs (Data Unit Descriptors)

DUDs (IDU/ODU descriptors) are two-word entities describing an IDU or ODU. They include location and size fields. The location field includes a page number and an offset within the page. The size field defines the number of bytes in the Data Unit. A page may contain one or more Data Units (dependent upon the frame size) on that SAP. DUDs are written to Status Queues, 1 or 4K byte queues located anywhere in memory (aligned to a 1 or 4K byte boundary). There are input and output DUDs, i.e. IDUDs and ODUDs, the formats for which are shown in FIGS. 11b and 11c, respectively.

IDUDs also contain status for the frame they describe. For multi-part IDUDs, the IDUD.Last descriptor contains the valid final status for the frame. IDUDs are written to a Indicate Status Queue.
REQs (REQ Descriptors)

REQ descriptors are two-word entities that point to part of a stream of ODUD objects. They comprise a location and size field also. The location field points to the (word-aligned) start address of the part of the ODUD stream. The count field defines the number of frames represented by the ODUD stream part (i.e. ODUD descriptors with the Last bit set). REQs are fetched from a 1 or 4K byte queue. The Request Descriptor format is shown in FIG. 11d.
CNF (Confirmation Status Messages)

CNFs are two-word confirmation status descriptors stored in a Request Status Queue. For Indicate, the IDUDs are a combined descriptor and status message. The Confirm descriptor format is shown in FIG. 11e.
PSPs (Pool Space Descriptors)

PSPs are two-word descriptors for areas of free-space available for writing Indicate data. They comprise a location and an implied size. Since there is a fixed 4K byte data page size, PSPs have an implied count of up to 4K bytes. The location field comprises a page number and offset. Normally the offset will be zero (the low-order (burst) bits must be zero) so that space management deals only with whole, aligned 4K memory pages. PSPs are fetched from a 1 or 4K byte queue. The PSP descriptor format is shown in FIG. 11a.
Request Structures Referring to FIG. 12, the Request SAPs (RSAPs) use a three-level structure to define output SDUs.

Each SDU is described by an ODU Descriptor (ODUD) object. Each ODUD delimits an ODU, which is wholly within one memory page. Multiple ODUD objects (multiple SDUs) may be grouped contiguously to be described by a single REQ descriptor part. Multiple REQ descriptors (parts) may be grouped as one Request descriptor object by the host software. Each REQ part is fetched by the BSI 10 from the REQ queue, using the Req?_req_ptr subchannel of the RSAP channel. Each RSAP processes one Request descriptor object per RSAP, per service opportunity, i.e. up to the REQ descriptor with the Last tag bit set.

Figure 17:
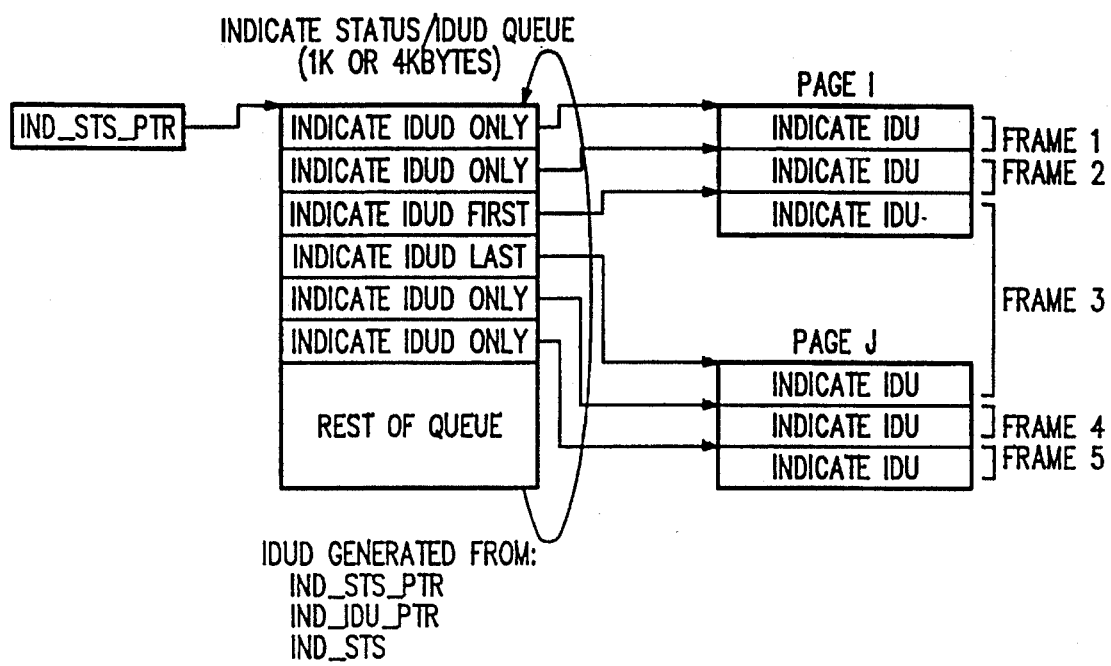
FIG. 17 is a schematic representation illustrating Indicate Data Structures.

Request status (confirmation) is generated as a single confirmation object per Request object. Each confirmation object comprises one or more CNF messages. Each RSAP has a 1 or 4K byte Confirmation Status Queue to which CNFs are written.
Indicate Structures Referring to FIG. 17, Indicate SAPs (ISAPs) generate a two-level structure (compatible with the RSAPs' structures).

Each SDU is stored in the current IDU page. If it fits wholly within the page, an IDUD.Only descriptor is written to delimit the SDU. If it spans more than one page, a multi-part IDU Descriptor object is written. Intermediate status is written in each IDUD, and when a status event occurs, definitive status is written in the last IDUD and an attention is generated. Status events are host-defined.

The three ISAPs each have their own status and data PSP queues. The queues may all be either 1K or 4K bytes. Each queue may be located anywhere in memory (aligned to a (1) or 4K byte boundary). Each ISAP writes data into its own memory pages, obtained from its own PSP queue.

Pool Space Structures

Figure 18:
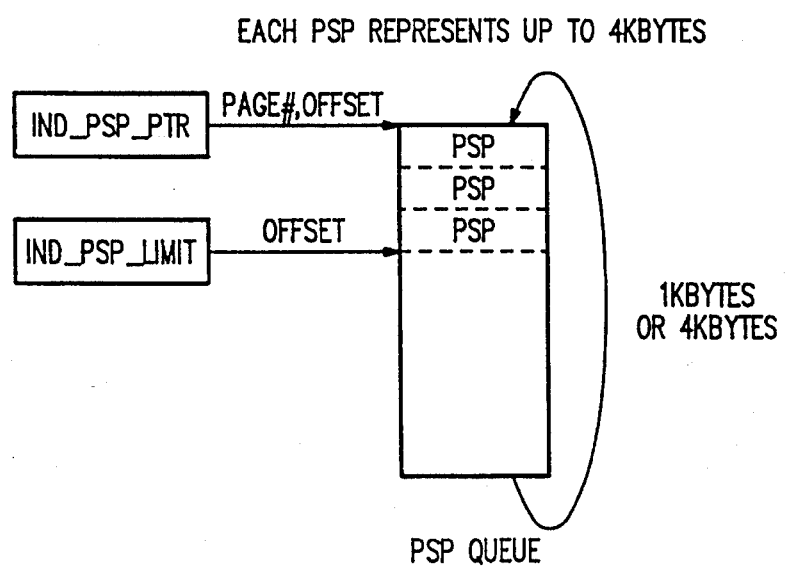
FIG. 18 is a schematic representation illustrating Space Data Structures.

FIG. 18 shows the structure of an ISAP PSP queue. The queue describes a pool of available space for writing the incoming data on that ISAP. The queue is either 1K or 4K bytes. With 8 bytes per PSP, a queue therefore holds either 128 or 512 PSPs (up to a maximum of 0.5 to 2 Mbytes of free space per ISAP).

Control Memory Allocation

The BSI 10 allows each queue to be anywhere in memory as long as it is aligned to a queue size boundary. As indicated above, the host has two choices for queue sizes, 1K or 4K. A mode register bit sets all queue sizes to the selected value. There are a total of ten queues. To occupy the minimum amount of control memory, a 1K queue size is selected and the 1K byte status, REQ and PSP queues are grouped into pages (consuming 10K). Other space is then required for ODUDs.

Figure 19:
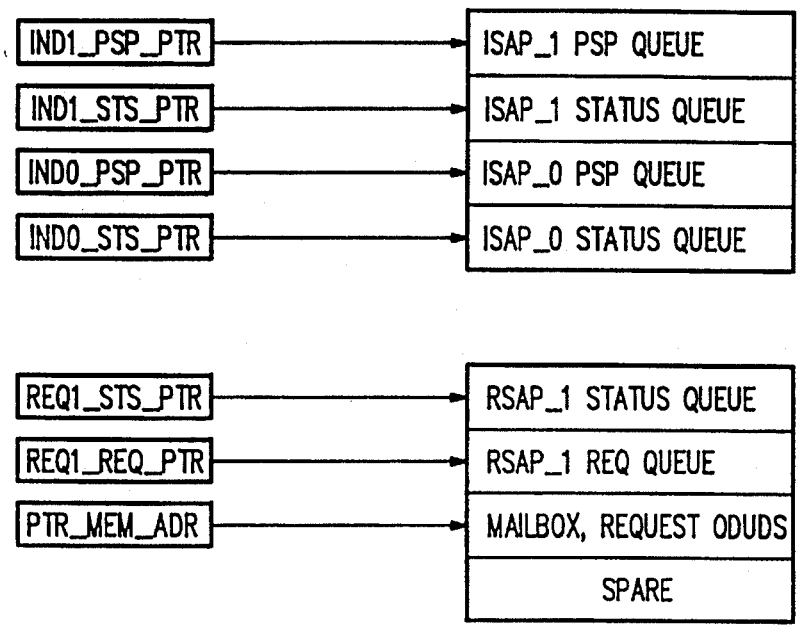
FIG. 19 is a schematic representation illustrating a minimum memory layout.

FIG. 19 shows how the control memory requirements for a minimum system can be fitted within just two 4K pages. In this case, only two ISAPs are used, ISAP_0 and ISAP_1. The BSI 10 is placed into the Internal/External sorting mode and external addressing is not used. This means ISAP_0 copies MAC-SMT frames and ISAP-1 copies all others.

BMAC SUPPORT

Errors & Exceptions

An "exception" is a recoverable abnormal condition that may optionally generate status and/or alter processing and does not require special host intervention An "error" on the other hand, is a non-recoverable abnormal condition for which the BSI 10 cannot be guaranteed to generate status; thus, errors require special host processing. An example error is an ABus transaction error while writing status.

Request

As stated above, the BSI 10 provides two Request SAPs: RSAP_0 and RSAP_1, high and low priority, respectively. Typically, the high priority is used for synchronous traffic and the low priority for asynchronous traffic, but nothing in the BSI 10 binds this association. However, RSAP_0 will never be serviced after RSAP_1 within one service opportunity.

Each RSAP has virtually the same facilities. At each service opportunity, only one (multi-part) Request object per RSAP is serviced. However, a Request object may span multiple service opportunities. Of course, this facility must meet with the standard usage. For example, if the THT is disabled (synchronous traffic), then a Request must only span one service opportunity or it is an error due to exceeding the synchronous bandwidth allocation.

Prestaging, Staging and Preemption

The Request state machine 14C (FIG. 7) handles prestaging, staging and preemption. "Staging" is when a RSAP starts fetching data for the next frame into the Request burst FIFO 14B once the current frame has been committed to transmission and its end byte is in the FIFO.

"Prestaging" is when the next frame is staged before the token arrives. For requests with an immediate request/ release class, (i.e. a token does not exist) prestaging is not applicable.

"Preemption" is when a higher priority RSAP preempts a (non-committed) frame of a lower priority RSAP already in the FIFO (the BSI allows RSAP_0 to optionally preempt RSAP). The effect this has is to cause the BSI-MAC to issue the token, then reprioritize between the service opportunities.

The BSI 10 saves the address of the first ODUD for each frame transmitted on the pre-emptable channel. If preemption occurs, then the BSI 10 switches Request channels to service the higher priority request. When the higher priority request has been completed, the BSI 10 switches back and restores request processing at the saved descriptor address.

The BSI 10 always stages SDUs. Prestaging is a user-programmable option for RSAP_1 and always enabled for RSAP_0. Preemption is programmable for RSAP_0 only.

The BSI 10 prioritizes the active Requests in a start state (normally between service opportunities). An active RSAP_0 request always gets serviced first. Normally, RSAP_0 will be serviced first during the service opportunity, then RSAP_1. RSAP_1 may be preempted, if preemption is enabled and its request has been (pre)staged. This will occur if RSAP_0 becomes active. Uncommitted RSAP_1 SDUs already in the Request FIFO will be purged and refetched after servicing RSAP_0. A frame is committed to transmission once, the FIFO threshold is reached, or the end of the frame is in the FIFO and the BMAC is ready to transmit.

Confirmation

There are three alternatives for confirmation: none, transmitter confirm, or full confirm.

When confirmation is desired, the BSI 10 normally writes confirmation status only at the end of the Request object. If the Request spans multiple service opportunities, then a multi-part confirmation status object may be written, a part at each service opportunity. For transmitter confirm, the Request state machine 14C verifies that the SDUs were transmitted correctly. For full confirmation, the Request machine 14C verifies that the SDUs were transmitted correctly and that the number of "correct" confirmed SDUs equals the number of transmitted SDUs. A "correct" frame is roughly one with: matching FC; the local source address (unless SA transparency is selected); matching expected E, A and C indicators; valid data length; and valid FCS.

Indicate

The BSI 10 provides three indicate SAPs: ISAP_0, ISAP-1 and ISAP_2, all of equal priority. In accordance with an aspect of the invention, the incoming data is sorted onto the three ISAPs according to several Indicate configuration bits. Greater detail regarding the sorting logic is given in the Service Interface discussion provided below. There are two bits which determine the major sorting mode: Sort_Mode(1:0). Table III below shows the effects of these two bits.

TABLE III

| SM1,SM0 | ISAP_2 | ISAP_1 | ISAP_0 |
|---------|----------|-----------|---------|
| 00 | Async | Sync | MAC-SMT |
| 01 | External | Internal | MAC-SMT |
| 10 | Info | Header | MAC-SMT |
| 11 | LoP-Async | HiP-Async | MAC-SMT |

ISAP_0 always receives SMT and MAC SDUs. The other two SAPs receive SDUs according to the sort mode of the BSI 10.

In mode 0, ISAP_1 receives synchronous frames and ISAP_2 receives asynchronous frames. This mode is intended for use in end stations supporting synchronous traffic.

In mode 1, ISAP_1 receives frames matching the internal address (in the BMAC), while ISAP_2 receives frames matching an external address (when the EA input is asserted). This mode is intended for bridges or ring monitors which would utilize the ECIP/EA/EM pins with external address matching circuitry.

In mode 2, one or more points within a frame are determined where separation of preceding and succeeding bytes can occur. This mechanism may be a counter(s) or it may incorporate a state machine that responds to external stimuli and/or to data values within the information stream. At the separation point, successive information bytes are copied to a separate memory area in system memory. A buffer management scheme provides separate management for each memory area. Status may be written to one combined memory area so that it is grouped for easier processing and management by the host.

Thus, in mode 2, ISAP_1 and ISAP_2 receive all non-MAC/SMT frames that are to be copied, but between them split the header and information (remainder) portions. ISAP_1 copies the initial bytes until the host-defined "header length" is reached. The remainder of the frame's bytes are copied onto ISAP_2. Only one IDUD stream is produced (on ISAP_1), but both PSP queues are used to determine where the IDUs will be written. This mode is intended for high-performance protocol processing applications.

Mode 3 sorts High-priority async frames onto ISAP_1 and Low-priority async frames onto ISAP_2. The most significant bit of the three-bit priority field determines High/Low priority.

The ISAPs each write indicate data to separate memory pages and each has its own PSP Queue. This allows a variety of pool space management schemes, including three ordered rings. Each ISAP writes status (IDUDs) into its own status queue.

EXTERNAL MEMORY INTERFACE (ABUS)

The BSI 10 uses a multiplexed address and data bus (ABUS). It performs 32-bit wide data transfers and provides a 28-bit address.

The BSI 10 operates in one of two ABus modes: virtual or physical addressing. With virtual addressing, an external memory management unit (MMU) provides address translation for the BSI 10. The BSI outputs channel information on the upper 4 address bits so that more elaborate external addressing schemes may be supported. For example, control information could be directed to one memory and data to another (e.g. an external FIFO). The BSI 10 also outputs 3 demultiplexed address bits during a burst. These indicate which word within a burst is being accessed.

The external memory accessed via ABus may be static or dynamic. To support DRAMs effectively, the BSI 10 utilizes burst mode transfers, four or eight words to a burst (yielding 16 or 32-byte bursts). The actual DRAM address multiplexing, refresh etc. must be handled by an external DRAM controller, e.g., a DP8420 DRAM controller available from National Semiconductor Corp.

The BSI 10 operates in a multi-master environment since it uses a simple bus-request/bus-grant signal pair for arbitration.

The bus supports several types of transaction. Simple reads and writes involve a single address and data transfer. Burst reads and writes involve a single address transfer followed by multiple data transfers. The BSI 10 provides the incrementing address bits during the burst transaction. Bursts are always 16 or 32 bytes aligned to a modulo 16/32 byte address boundary. Additionally, to coexist in a system that assumes implicit wrap-around for the addresses within a burst, the BSI 10 never emits a burst that will wrap.

The basic addressable quantum is a byte so that, for instance, request data may be arbitrarily aligned in memory. All information is accessed in 32-bit words, however, so the BSI 10 ignores unused bytes when reading. The BSI 10 always writes all bytes of a word and so aligns all indicate data. Burst read/write data must be modulo burst-size aligned. When reading/writing data, single word, 16-byte and 32-byte burst transactions are utilized, as required for maximum efficiency.

Parity

The BSI 10 provides two options for parity: one for systems using parity, the other for systems not using parity. When parity is utilized, it operates in flow-through mode on the main datapath. All parity interfaces use odd parity and have their own attentions.

The BSI 10 always generates parity on each of its three output busses: ABus Interface, CBus Interface, and BMAC Interface.

With (flow-through) parity enabled, the BSI 10 does not check or generate parity on the data at the ABus interface. Rather, it flows between ABus and the BMAC interface. The BSI 10 does generate parity on addresses emitted, since parity is generated on addresses as they are stored within the BSI 10. CBus and BMAC databus parity is checked and generated.

When parity checking is not enabled, the BSI 10 does not check parity on ABus, CBus, or on information from the MAC interface.

QUEUE MANAGEMENT

The BSI utilizes 10 queues, six on Indicate (two per ISAP) and four on Request (two per RSA). Each ISAP has a status and a PSP queue. Each RSAP has a CNF and a REQ queue.

As stated above, the host programs all queues to be either 1K or 4K bytes. The BSI 10 manages all queues by maintaining a pointer to the next free entry in the queue, which is compared to a register holding the limit of the queue. The queue pointers are incremented after each read/write. When a pointer reaches the upper queue bound (the page end), it wraps back to the lower bound (the page start). The queue limit registers hold the queue's limit as an offset value in units of 1 descriptor (8 bytes).

The host may provide flow control on an ISAP by limiting either its data or status space, although data space flow control is more accurate.

Status Queues

The BSI 10 stores two-word descriptors (messages) to the status queues. A limit register defines the penultimate (next-to-last) location to which status may be written. Each word is written to the address in the queue pointer register, which is post-incremented. When the BSI 10 writes to the queue entry just before the host-defined limit, it generates a "No_status_space" attention. The BSI 10 may write up to two more descriptors due to pipelining. More complete details are given in the Service Interface discussion provided below. When there is no status space, RSAPs do not process any more Requests and ISAPs do not copy any more frames.

Data Space Queue

The BSI 10 loads two-word PSP descriptors from the PSP queues. The limit register defines the last valid PSP written by the host. Each ISAP has a DMA subchannel that operates its own PSP queue. A PSP is fetched from the location referenced by the PSP pointer, which is post-incremented. If the PSP was (pre)fetched from the queue's limit (as defined in the limit register), a "Low_Data_Space" attention is generated for that ISAP. This will occur on the second last PSP in the queue, unless the queue only has one PSP, when the attention will be generated when that PSP is prefetched. The host adds more PSPs to the tail of the queue, then updates the limit register. As long as the host maintains sufficient PSP entries, adequate space will be available for the ISAP to copy continuously.

REQUEST OPERATION

The BSI 10 loads REQ descriptors from the REQ queues. A limit register (described below) defines the last valid REQ written by the host. For transmission, all SDUs with common service type, frame control and expected-status are gathered together into one Request object. The host programs the Req?_cfg (request configuration) register, adds the REQ descriptor to the REQ queue, then updates the queue's limit register.

The BSI 10 will read REQ descriptors as long as the REQ queue pointer has not reached the queue's limit, the RQSTOP bit is reset in the State_attn register, and there is space in the RSAP's status queue. Each REQ descriptor defines the frame control and service class for a number of SDUs. It contains location and size fields. The BSI 10 loads the size field into an internal frame counter and the location into the ODUD pointer register. The BSI will continue to process REQ descriptors (across multiple service opportunities if required), until the whole Request object is processed (i.e. an Only or Last descriptor is detected).

The BSI 10 processes the Requests objects, placing confirmation status in the current page being used for the Request Status Queue. The Req?sts_ptr register holds the current page number and offset into the status queue.

Each of the two RSAPs has four DMA subchannels, each transferring a different data type: 0=ODUs, 1=ODUDs, 2=CNFs, and 3=REQs.

INDICATE OPERATION

When an ISAP has data and status space, it writes incoming frames as series of IDUs (each in a memory page). An IDU is constrained to be wholly within a single page, so multi-part IDU objects may need to be written for a single frame (up to three IDUs worst case for a max length frame with the 4K data page size). Each IDU may be stored in any memory page. For each IDU, the ISAP writes an IDUD which contains status, size (byte count) and location. IDUDs are written to consecutive locations in the Indicate Status Queue. Each ISAP has its own Status Queue.

Each frame is aligned to the start of a currently-defined burst-size memory block (16 or 32 bytes). The first word contains the FC only, copied into all bytes of the first word written, with the DA, SA and INFO fields aligned to the first byte of the next word.

The BSI 10 stores frame IDUs in memory pages according to the PSPs read from the PSP queue. Each ISAP gets a page from its own PSP queue as required. This allow frames to be processed in an arbitrary order, because space may be returned to the PSP queues in a different order to the order in which they were used by the BSI. Each PSP is loaded into the ISA's Ind?_idu_ptr register. Both the page number and offset are loaded from the PSP. Normally the host would zero the offset field, thereby passing whole 4K byte pages.

As each frame is received, the BSI 10 writes a sequence of IDUDs, each delimiting an IDU, and at each status breakpoint sets the breakpoint bit in the next IDUD status field. Since a frame can potentially occupy portions of multiple pages, the BSI 10 writes First, Middle and Last IDUDs. When a frame crosses a page boundary, the BSI 10 writes an IDID.First. If another page is crossed, then an IDUD.Middle will be written. At the frame end, an IDUD.Last is written. The BSI 10 writes IDUDs up to the host-defined limit for the status queue. Separate IDUD/status queues are maintained for each ISAP.

The BSI 10 provides the ability to group incoming frames and generate attentions at group or burst boundaries. This significantly reduces the number of host attentions (interrupts), reducing host overhead.

To group incoming frames into bursts, the BSI 10 defines status breakpoints. Breakpoints identify the end of a burst of related data. An attention condition may be generated by the BSI for status breakpoints. Status breakpoints include SA change, Token, SA change, DA change, MAC Info change, errors, and a SA copied_frame_counter threshold.

Each ISAP has three DMA subchannels. Subchannel 0 is used for IDUs, subchannel 1 for IDUDs, and subchannel 2 for PSPs. Indicate commands/configuration are written directly by the host to the Indicate configuration registers (Ind_mode and Ind_cfg).

REGISTER SET

As stated above, the BSI 10 has two access ports, the ABus interface and the CBus interface. The CBus interface allows the host asynchronous access to most of the registers at any time. The ABus interface is used by the BSI 10 to access memory-based control structures, including queues and a mailbox.

The BSI 10 has three register sets. The first set contains control and configuration registers and is accessed directly by the host via the CBus interface. The second set contains pointers which must be accessed by passing a memory address to the BSI 10 via the CBus interface and asking the BSI to transfer data between the memory address (a mailbox) and the pointer location. The third set contains queue limit registers. The queue limit registers are accessed by placing an address (and data for a write) into CBus registers, then asking the BSI 10 to perform the data transfer as an atomic operation.

PROGRAMMING INTERFACE

Overview

The following discussion describes the programmer's view of the BSI 10. It describes what registers there are, what they do, and how to access them. It is a functional specification for all of the registers. More detailed information on how to actually operate the BSI 10 using these registers is provided in a later discussion of the Service Interface.

The discussion begins by providing an overview of the programming interface, followed by a detailed specification.
Basic Structure The BSI 10 appears to the programmer as three register sets, one mailbox, and an attention/notify mechanism. As stated above, the first (and main) register set (CBus Registers) comprises control and configuration registers accessed via the CBus interface; the second register set (PTR Registers) comprises pointers (manipulated by the BSI) host-accessed indirectly via an external memory-based mailbox, and the third register set (Limit Registers) comprises queue limits accessed via the CBus interface. All three register sets are host-writable and readable. There are other BSI-internal working registers, but they are only accessible via the scan chain.

At initialization, the configuration registers, some pointer registers, and the queue limits must be loaded.

The initialization of the configuration registers establishes operating conditions for the Indicate state machine 12C, Request state machine 14C, and status/space machine 16 (see FIG. 14). The initial pointer register values define data structure locations. The initial queue limits define boundaries for the status queues.

Global Control

As stated above, the host controls the BSI 10 via the CBus registers. The most important registers in this set are: Master_attn and Master_notify, State_attn and State_notify, Service_attn and Service_notify, and Mode.

Master_attn and Master_notify are the upper level attention registers, providing grouped information about all the lower level attention and notify registers. Bits in the lower level registers synchronize host-BSI mailbox traffic, queue limit updates, pointer register updates and internal state machine reporting.

State_attn and State_notify contain error attentions and a RUN/STOP bit for each BSI state machine.

Service_attn and Service_notify are used to request pointer or limit register services.

The Mode register establishes major operating parameters and is normally only programmed at power-on or after a software Master Reset.

Register Access

Each of the three register sets is accessed in its own way. The CBus register set uses the CBus interface for access while the other two sets use the Service_attn register to synchronize transfers between host and the BSI 10.

CBus (Control) Registers

The CBus register set is utilized for the control and configuration of the BSI 10. By performing normal CBus reads or writes, the host may asynchronously access any register. The BSI CBus address space covers 32 locations, although not all are used. Access to undefined locations causes no actions.

PTR RAM

The pointer (PTR) register set comprises 22, 28-bit memory pointers, and the set is called the PTR (pointer) RAM (see FIG. 15). The host may only access these registers indirectly, using the PTOP function in the Service attn register. The PTOP service function allows both reading and writing a PTR RAM location.

The host loads a 32-bit read/write Ptr_mem_adr register with the mailbox (memory) address where PTR RAM data will be written to or read from. The 32-bit Ptr_mem_adr register is mapped into one 8-bit CBus address, so the host loads a 2-bit byte pointer, then performs four consecutive reads or writes to the same CBus address. The 8-bit Ptr_int_adr register is loaded with the PTR RAM location to be accessed (5 bits), the type of PTOP function (read or write, 1 bit) and the initial Ptr_mem_adr byte to be accessed. The BSI will load/store the PTR RAM from/to the mailbox.

The PTR RAM address space is 32 locations, but only 22 are defined. Accessing the undefined locations produces undefined results.

LIMIT RAM

The third set of registers comprises 10, 9-bit queue limits and the set is called the LIMIT RAM (see FIG. 15). The host may only access these indirectly, using the LMOP service function in the Service_attn register. The LMOP service function allows both reading and writing any of the ten LIMIT RAM locations.

The host loads the 8-bit Limit_data register with the LS 8 bits of the new data value for the LIMIT RAM location accessed. The Limit_adr register is loaded with the LIMIT RAM location to be accessed (4 bits), the type of LMOP function (read or write, 1 bit), and the MS data bit. The BSI 10 will load/store the LIMIT RAM location from/to the Limit adr register.

The LIMIT RAM address space is 16 locations, but only 9 are defined. Accessing undefined locations produces undefined results.

State Machine Control

As indicated above, there are three state machines under control of the host: the Indicate machine 12C, the Request machine 14C and the Status/Space machine 16. Each machine has a RUN/STOP bit in the State_attn register. Both the host and the BSI 10 place a machine in STOP or RUN mode via the State_attn register bits.

The Indicate and Request machines are either in RUN or STOP mode. At Reset, or while its STOP bit is set, the machine is in STOP mode. When the STOP bit is cleared, it is in RUN mode. The host may set the STOP bit to halt all Indicate/Request activity, or the BSI 10 may set the STOP bit upon a fatal error.

The Status machine 16 is initialized at reset and then enters the Idle state. A limited number of operations can be performed from this state while the STOP bit is set. When the STOP bit is cleared, all operations may be performed. The host may set the STOP bit to place the machine into its restricted functions mode or the BSI 10 may set the STOP bit upon a fatal error. Examples of fatal errors are: when an ABus transaction error occurs while writing status, or when a machine detects an invalid state.

Upon any STOP attention, the host must service the appropriate machine, then clear the STOP bit again to reinitiate services.

DMA

DMA is handled automatically by the BSI 10. All data structure pointers are kept in the PTR RAM and are, therefore, only accessible via the mailboxes.

Channel Operation

Detailed explanation and specification of the channel operations is given in the Service Interface discussion below. This section provides a quick overview.

BSI Initialization

The BSI is initialized in the following order:

1. the control and configuration registers are loaded via the CBus interface;
2. the PTR RAM is loaded with the Status/Space machine in "STOP" mode;
3. the LIMIT RAM is loaded with the Status/Space machine in "STOP" mode;
4. initial space is loaded by running the Status/Space machine in RUN mode;
5. the Indicate machine 12C is enabled to receive incoming data;
6. the Request machine 14C is enabled to service outgoing data.

The control and configuration registers may be programmed while all the internal state machines are stopped.

The PTR RAM is initialized by running the Status/Space machine 16 while the STOP bit is set. In this mode, the Status/Space machine 16 only responds to PTOP or LMOP commands.

Once the PTR RAM is initialized, the LIMIT RAM must be initialized. This is also performed with the Status/Space machine 16 in "STOP" mode. Finally, the Status/Space machine 16 can be run with full functionality by clearing the SPSTOP bit. The Status/Space machine 16 will prompt the host (via attentions) for initial space on all queues.

Once all the space is initialized, the Indicate machine 12C and Request machine 14C may run.

Indicate Operation (FIG. 12)

To initiate input, the host sets up the two ISAP configuration registers, then clears the INSTOP bit in State_attn. The Indicate machine 12C will request space, then start reception.

The Indicate machine 12C tries to batch its reception. Although status is written with each IDUD, as stated above, attentions to the host are only generated at status breakpoints. These breakpoints are intended to identify the end of a burst of related data. Thus, the host is only invoked when there is enough work to do.

Figure 13A:
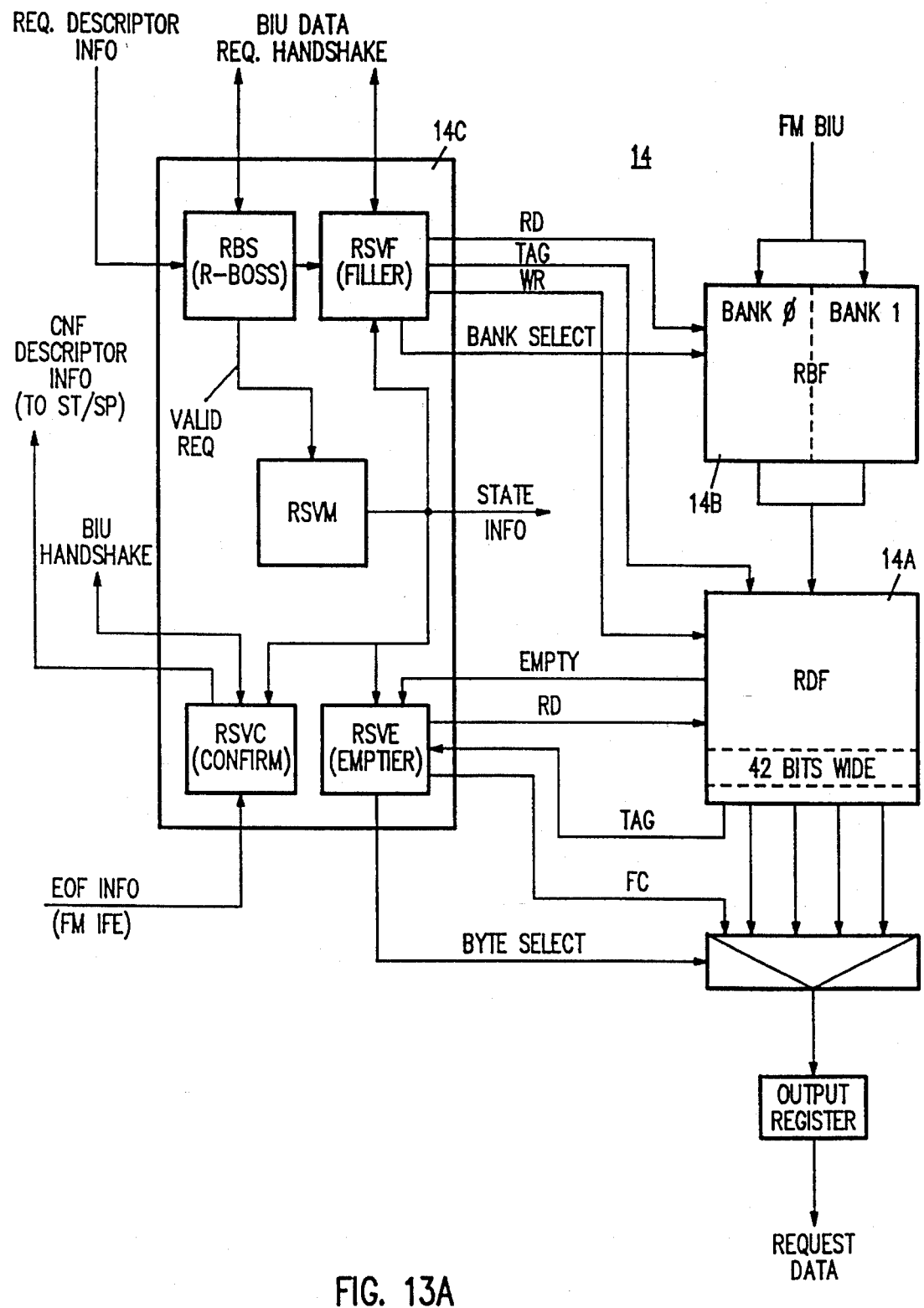
FIG. 13A is a block diagram illustrating the general architecture of the Request module.
Figure 13B:
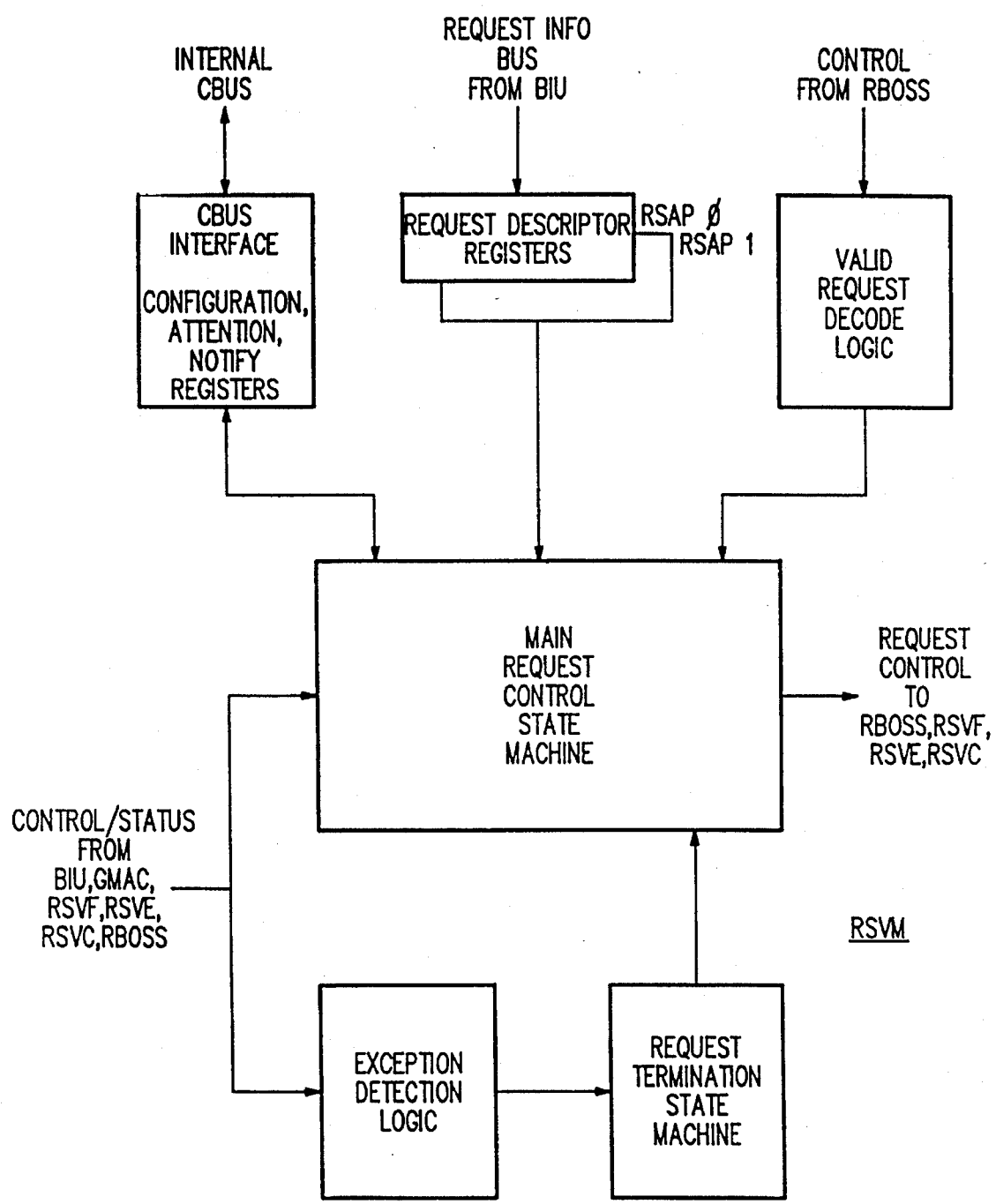
FIGS. 13B–F are block diagrams illustrating the architecture of various components of the Request module.
Figure 13C:
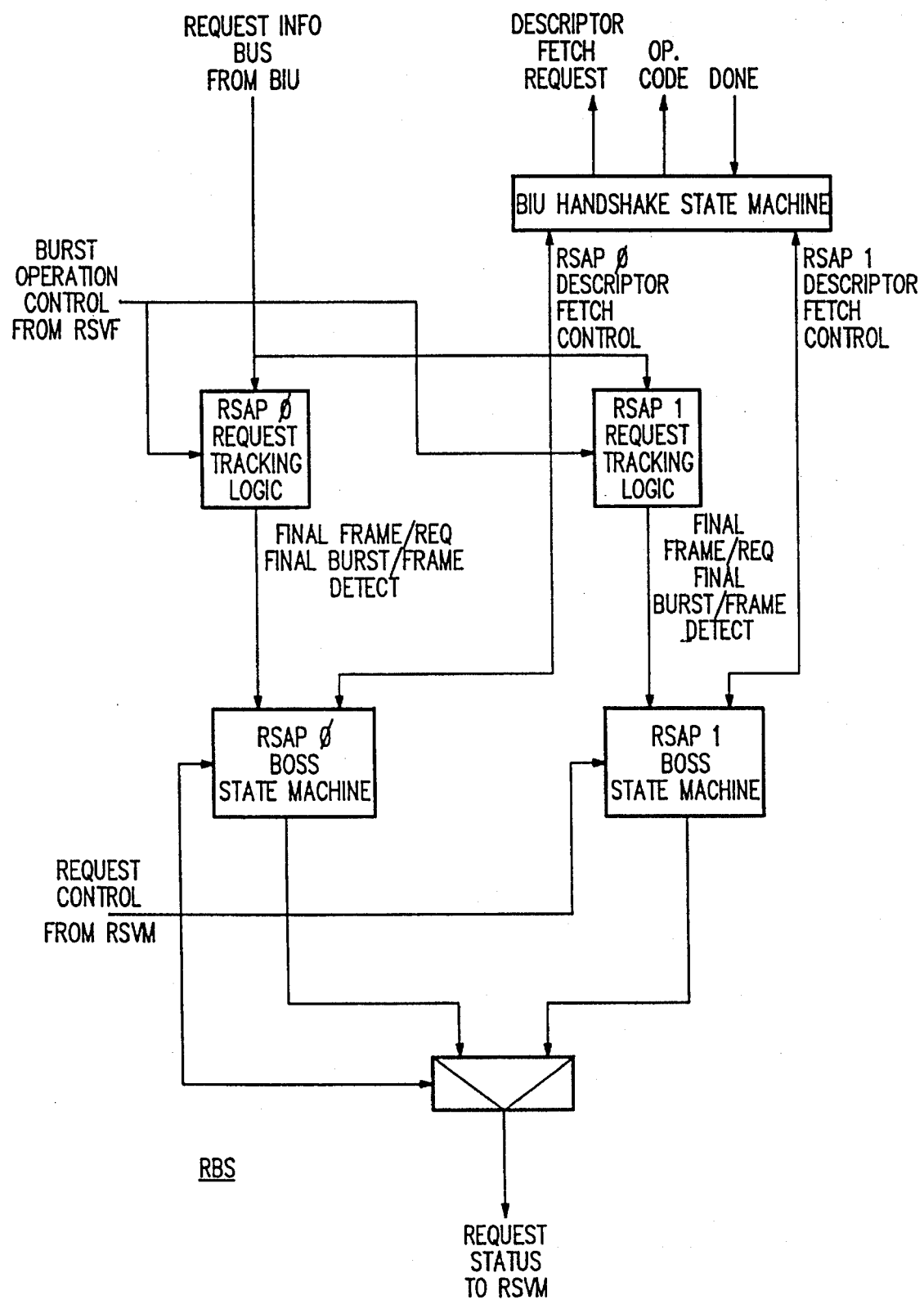
Figure 13D:
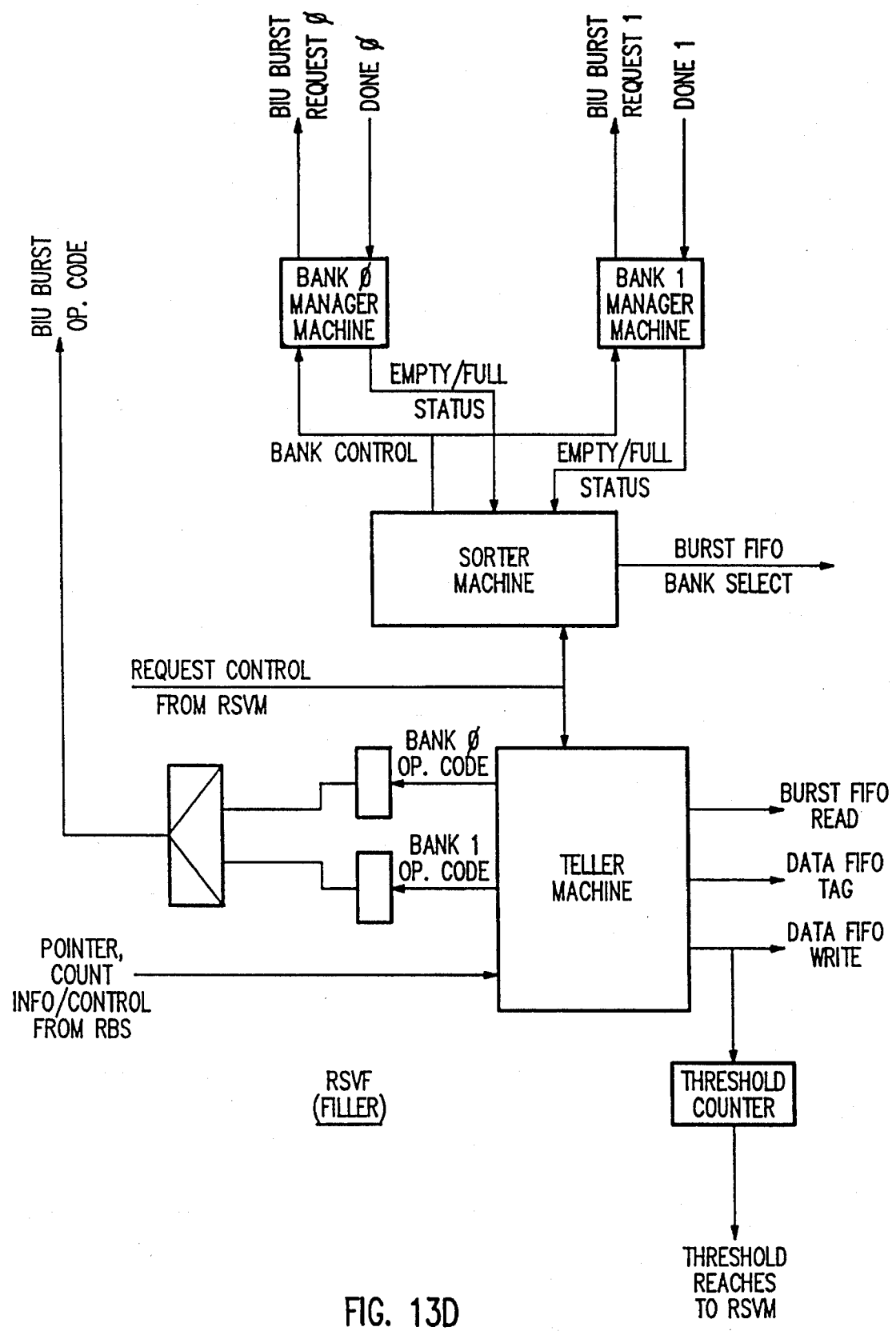
Figure 13E:
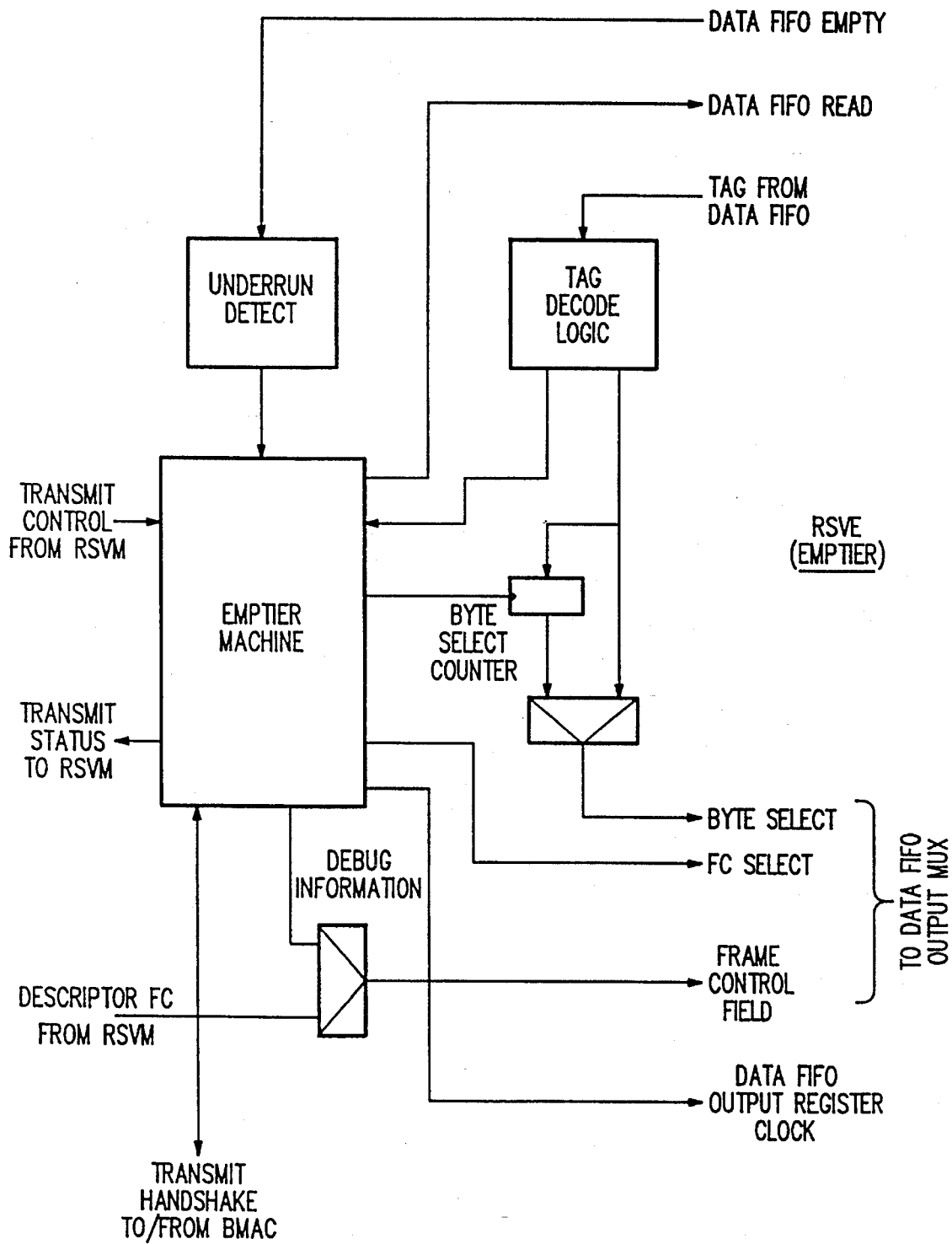
Figure 13F:
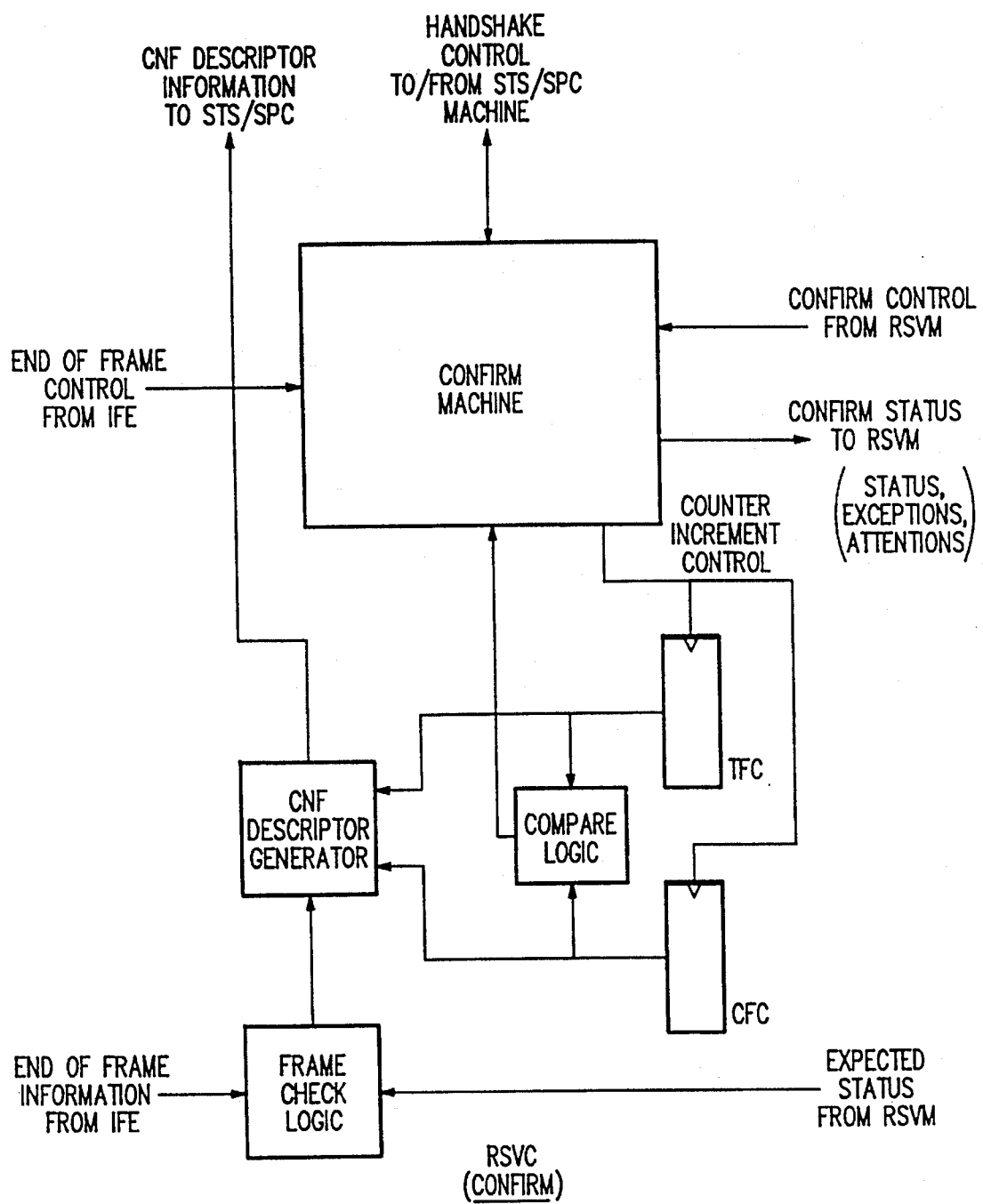

Request Operation (FIG. 13A)

The Request machine 14C generates attentions after status is written. Normally this is following the completion of a whole Request object or after an exception. The host may operate the Request machine 14C with attentions or without. If attentions are not used, then the host simply queues each new Request (or REQ) and checks the CNFs written to determine which frames have been sent.

Data Space Subchannels

The data space subchannels are managed by the Indicate machine 12C and Status/Space machine 16 within the BSI 10. A subchannel is initialized by allocating memory to the PSP queue, initializing the queue with sufficient valid entries, loading the BSI's PSP queue pointer, loading the queue's limit register, then clearing the SPSTOP (SPace/ status STOP) bit in State_attn. All this must be done before enabling any other machines.

Once initialized, the host and BSI 10 independently access the PSP queue. If the BSI 10 prefetches a PSP from the limit location, then it generates a Low_Data_Space attention on that ISAP. The host should read the PSP pointer and, if/when more PSPs have been added, update the LIMIT RAM, then clear the attention. PSP prefetching Will then resume on that ISAP once the LIMIT RAM has been updated.

Status Subchannels

The BSI 10 writes two-word descriptors on Request and Indicate. These are written to the status queues. Status is written to a queue up to the host-defined limit (plus one more potentially). A No_Status_Space attention is generated when the status queue entry before the host-defined limit is written by the BSI 10. The host updates the queue limit when more status space is available. With PSPs, updating the limit restarts SAP operation. With Status queues, writing the limit register does not automatically restart SAP operation. The No_Status_Space attention must be cleared to restart the SAP.

REGISTER ACCESS

CBus Registers

The CBus register set is accessed asynchronously via the CBus interface. Single reads and writes are performed. Each host access is synchronized internally, the transfer made, then CB_ACK_asserted. The attention registers (only) are conditional write registers. The conditional write mechanism is specified in the Events section below.

PTR RAM (FIG. 15)

The PTR RAM operations exchange PTR contents with an external memory-based mailbox. The address of the mailbox is programmed by the host into the Ptr_mem_adr register. Normally, the host uses a dedicated memory location for the mailbox so the mailbox address need only be loaded once (at initialization). Thus, a mailbox-address write to the BSI 10 is not required for each PTR RAM access.

The mailbox address is loaded into the Ptr_mem_adr register by performing four consecutive writes to the appropriate CBus address, loading each byte of the memory address in turn. The bytes are written MS byte First, after clearing bits [7:6] in the Ptr_int_adr to zero.

Reading from the PTR RAM

The PTR RAM is read as follows. First, the host checks that the PTOP bit is set in the Service_attn register. Second, the host loads the Ptr_int_adr register with: the PTR RAM location to be read (bits [4:0]) and a 1 in the PTRW bit for a read (bit [5]). Third, the host sets the PTOP service bit, which causes the BSI 10 to read the PTR RAM and write the data into the external mailbox. When this operation is complete, the BSI 10 sets the PTOP attention bit again. When the PTOP attention is set, the host may read the mailbox.

Writing into the PTR RAM

The PTR RAM is written as follows. First, the host checks that the PTOP bit is set in the Service_attn register. Second, it loads the Ptr_int_adr register with: the PTR RAM location to be written (bits [4:0]) and a 0 in the PTRW bit for a write (bit [5]). Third, the host loads the external mailbox with the new PTR RAM data. Fourth, the host sets the PTOP service bit, which causes the BSI to read the specified memory location, write the data into the PTR RAM, then set the PTOP attention bit.

LIMIT RAM (FIG. 15)

The LIMIT RAM is accessed via two CBus registers. One is used to hold the LIMIT address to be accessed, while the other is used to exchange data with the LIMIT RAM.

Reading from the LIMIT RAM

The LIMIT RAM is read as follows. First, the host checks that the LMOP bit is set in the Service_attn register. Second, the host loads the Limit_register with: the LIMIT RAM location to be read (bits [7:4]) and a 1 in the LMRW bit for a read (bit [3]) and zeros in the remaining bits. Third, the host clears the LMOP service bit, which causes the BSI to read the LIMIT RAM, write the LS 8 data bits into the Limit data register, the MS data bit into bit [0] of the Limit_adr register, then set the LMOP attention bit. When the LMOP attention has been set, the host may read the Limit_adr/data registers.

Writing into the LIMIT RAM

The LIMIT RAM is written as follows. First, the host checks that the LMOP bit is set in the Service_attn register. Second, the host loads the Limit_adr register with: the LIMIT RAM location to be written (bits [7:4]), a 0 in the LMRW bit for a write (bit [3]), the MS data bit into bit [0] and zeros in the remaining bits. Third, the host loads the Limit_data register with the 8 LS bits of the new limit data. Fourth, the host clears the LMOP service bit, which causes the BSI to write the new 9-bit data value into the LIMIT RAM then set the LMOP attention bit.

EVENTS

The BSI 10 uses an attention/notify scheme to manage service events (interrupts). The BSI 10 provides attention/ notify events going in both directions, i.e. host to BSI and vice versa.

The BSI 10 generates an attention by setting the appropriate event's attention bit in an attention register. The host may have this attention generate an interrupt by setting the corresponding notify bit.

Certain attention bits are signals when both set and cleared. The BSI 10 sets the bit to Signal an attention to the host. The host clears the bit to signal completion/recognition to the BSI 10. This may cause the BSI 10 to take some processing action (for example, read a mailbox).

Figure 20:
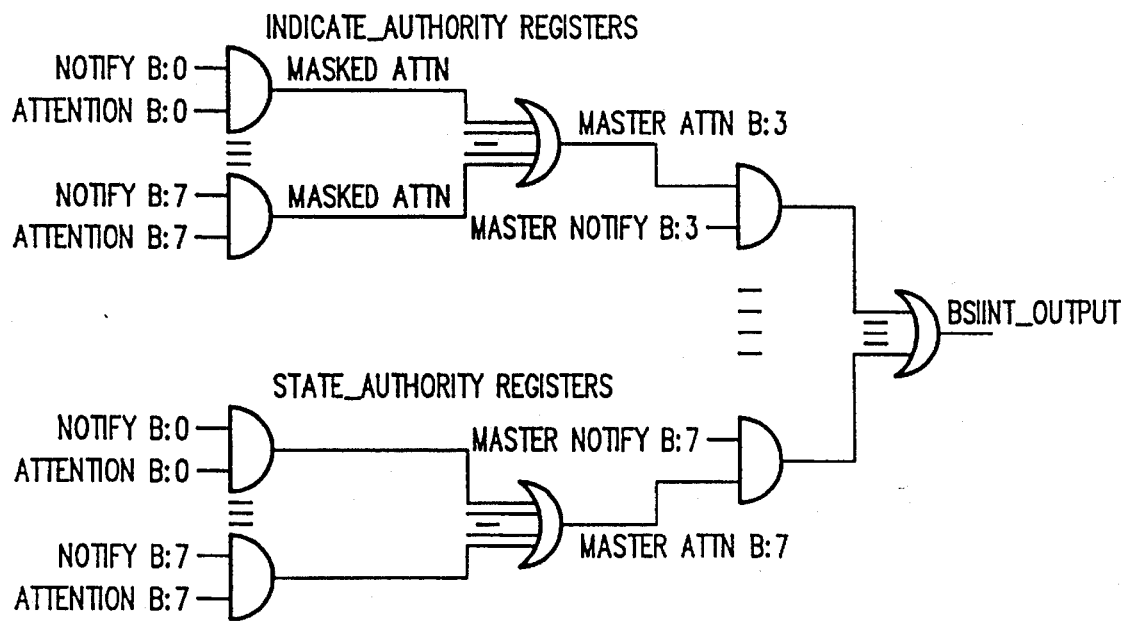
FIG. 20 is a logic schematic illustrating a two-level attention structure.

Since attentions are spread through multiple registers, the BSI 10 provides a two-level structure for the host. This is depicted in FIG. 20. In the first (lower) level, each attention register bit is masked (ANDed) with its corresponding notify. All masked attentions are then OR'd to produce a register-level attention. The Master_attn register is read to observe these register-level bits. Finally, each Master_attn bit is masked with its corresponding Master-notify, then all these are OR'd to produce the BSI INT_output pin.

In an interrupt service routine, the host should read the Master_attn register to determine which other attention registers need reading. The Master_attn register is a read-only register.

Attention Registers

The lower level attention registers are read/write by both host and BSI 10 and are initialized when a reset occurs. Each attention bit is settable by the BSI 10 and clearable by the host. All the lower level attention registers are conditional write registers. The Event section below provides a specification of the conditional write mechanism.

Notify Registers

All the notify registers are read/write by the host. They are all cleared to zero when a reset occurs.

Conditional Writes

The host and the BSI 10 independently write to the attention registers, but potentially at the same time. To ensure that no attentions are missed by the host, the attention registers incorporate a conditional-write mechanism.

The BSI 10 may write to an attention register at any time, and this overrides any host write (This ensures events are not lost if a clear coincides with a set.).

Whenever the host reads an attention register, the read value is stored in the Compare register at the same time. Whenever the host writes to an attention register, the current value of the register being written is compared to the Compare register. Any bits that miscompare are not written. If any bits are not written, the State_attn.CWI (Conditional Write Inhibit) bit is set. This bit is not a normal attention bit, but reflects the result of the last write to a conditional write register. Its corresponding notify bit is always cleared.

The Compare register may be written with any value by the host at any time. This facility allows bit clear operations on the attention registers.

One use of the attentions could be as follows. The host reads an attention register and remembers the value. When the attentions have been serviced, the host writes the saved value into the Compare register and writes the updated value into the attention register. Thus, only attentions serviced get cleared. In this case, the host ignores the CWI bit.

A simpler use is to utilize bit-clear operations. The host reads an attention register at any time and does not have to specifically remember the read value. When the host wishes to clear an attention, it writes all 1's to the Compare register, then writes 0's to the attentions it wishes to clear (1's in all other attention bits). Naturally, the CWI bit may be set, but it can be safely ignored.

REGISTERS, MAILBOX AND DMA

The tables provided in FIGS. 21, 22 and 23 show the BSI's registers (i.e., the Control and Configuration Register Set, the PTR RAM Register Set and the LIMIT RAM Register Set, respectively), grouped by page. The first column in each table shows the register address (in hex). The second column shows the register name. The third column describes its function. The fourth column shows the (initial) register value after a Reset. The last column shows whether it is a conditional write register.

There are two Resets for the BSI, a hardware Reset (via the RST input), and a software Reset (via the MRST bit in the Mode register). Both cause the same effects. The single term "Reset" will be used to denote either.

Register Detail

This section specifies the layout of each register, and the functionality of each bit.

Mode

The read/write Mode register establishes major system configuration options. Not altered upon reset. These bits should only be programmed upon reset, prior to operating the BSI.

| SMLB | SMLQ | VIRT | BIG-END | FLOW | MRST | FABCLK | TEST |
|------|------|------|---------|------|------|--------|------|

| | |
|---|---|
| SMLB | Small Bursts. SMLB = 0, the BSI uses 32 byte (8 word) bursts. SMLB = 1, the BSI only uses 16 byte (4 word) bursts on ABus. Note that since the BSI aligns indicate frames on burst-size boundaries, when SMLB = 0, a 4 word write will never occur to the 2nd half of a 8 word block. |
| SMLQ | Small Queue size. SMLQ = 0, the queue sizes are 4K bytes. |
| VIRT | VIRT = 0, physical address mode on ABus, VIRT = 1, virtual address mode. |
| BIGEND | BIGEND = 0, little-endian data format, BIGEND = 1, big-endian format. |
| FLOW | FLOW = 0, no parity is checked on CBus or ABus. Parity is always generated on each of the three interfaces. FLOW = 1, flow-through parity is used. When FLOW = 1 parity flows between ABus and BMAC, incoming data is not checked at the ABus interface, instead it is checked (by the BMAC) as it is passed to the BMAC. |
| MRST | Master Reset. Initializes registers to values shown in Table 7. This bit is cleared after the reset is complete. |
| FABCLK | Fast ABus Clock. This bit determines the metastability delay period for synchronizing between ABus clock and the Ring clock (LBC). At reset this bit is cleared to zero, which selected one whole ABus clock period as the delay. Then this bit is set to a one, only ½ an ABus clock delay is used. The BSI is designed to work optimally with AB_CLK = LBC (i.e. at 12.5 MHz and in phase), or with AB_CLK = 2 × LBC (i.e. at 25 MHz and in phase). Both these options are easily realized by choosing the available clocks from the CDD (clock distribution device) of the chipset. |
| TEST | Test Mode. Setting this bit to a one enables test logic. |

Ptr_int_adr

The read/write Ptr_int_adr register is used to program the parameters for the PTOP PTR RAM service function. Not altered upon reset.

| M1 | M0 | PTRW | A4 | A3 | A2 | A1 | A0 |
|----|----|------|----|----|----|----|----|

| | |
|---|---|
| M[1:0] | Writing these two bits programs the byte pointed for accesses to the Ptr_mem_adr |

-continued

| | |
|---|---|
| | register. It should normally be set to zero to initialize the byte pointer for four successive writes (MS byte first) when a memory address is loaded into Ptr_mem_adr. The BSI increments these bits internally after every write to Ptr_mem_adr. |
| PTRW | This bit determines whether a PTOP function will be a read or write. When PTRW = 0 it is write, when PTRW = 1 it is a read. |
| A[4:0] | Writing these five bits sets the PTR RAM address for a subsequent PTOP function. |

Ptr_mem_adr

The read/write Ptr_mem_adr register is used to establish the word-aligned (byte) memory address used in the data transfer of the PTOP PTR RAM service function.

| |
|---|
| memory_addr[27:24] |
| memory_addr[23:16] |
| memory_addr[15:8] |
| memory_addr[7:02] |

Bits [1:0] must be zero (they will be forced internally to zero]

This CBus address is a window into four internal byte registers that will be used as the memory address for transfers between PTR RAM and external memory utilizing the PTOP mechanism. The four byte registers are loaded by successive writes to this address after first setting the M[1:0] bits in the Ptr_int_adr register. The bytes should be loaded MS byte first after setting M1=M0=0. The BSI 10 increments the byte pointer internally after each write or read.

This register is initialized to a silicon revision code at Reset. The revision code remains until the host overwrites it.

Master_attn & Master_notify

The read-only Master_attn and read/write Master_notify registers present a first-level view of the BSI attentions. Each bit represents the state of a second-level attention/notify register pair. A bit is set in the Master_attn register when its corresponding attention register has a notifiable attention asserted. Writes to the Master_attn register do not change the contents, but are allowed. Master_attn is cleared to zero upon reset.

| STA | NSA | SVA | RQA | INA | Rsvd | Rsvd | Rsvd |
|---|---|---|---|---|---|---|---|

| | |
|---|---|
| STA | State_attn register has one of the attention bits set. |
| NSA | No_space_attn register has one of the attention bits set. |
| SVA | Service_attn register has one of the attention bits set. |
| RQA | Req_attn register has one of the attention bits set. |
| INA | Ind_attn register has one of the attention bits set. |

State_attn & State-notify

The read/write State_attn/notify registers present attentions for major states within the BSI. This includes state machine state and parity errors. Initialized upon reset.

| ERR | BPE | CPE | CWI | CMDE | SPSTOP | RQSTOP | INSTOP |
|---|---|---|---|---|---|---|---|

| | |
|---|---|
| ERR | Error. Cleared upon reset. Set by the BSI when a non-recoverable error occurs. Errors are: ABus transaction error writing confirmation status (ABus errors reading/writing data is reported in the descriptor), an internal logic error, or when a state machine enters an invalid state. |
| BPE | BMAC Parity Error. Cleared upon reset. BMAC parity is always checked during a frame. If there is an error this attention is set. |
| CPE | CBus Parity Error. Cleared upon reset. When FLOW parity is used, CBus parity is checked. If there is an error this attention is set. If there is a CBus parity error during a host write, the write will be suppressed. |
| CWI | Conditional Write Inhibit. Cleared upon reset. This bit reflects the result of the last write to any conditional write register (an attention register). It never causes an attention because its associated notify register bit is always cleared. CWI = 0 means all bits in the Compare register matched the current conditional write register value at the time of the last conditional write register write. CWI = 1 means one or more bits mismatched at the time of the last conditional write register write. |
| CMDE | Command Error. Cleared upon reset. Set by the BSI when an invalid operation is performed by the host. Currently this only occurs when an invalid value is loaded into the Ind_hdrlen register (which will also set the INSTOP attention). |
| SPSTOP | Set upon a reset, or by the BSI when the Space/Status state machine enters the reduced_functions_state because of an unrecoverable error. The state machine will only perform POP or LMOP requests while in the reduced_functions_state. |
| RQSTOP | Set under three conditions. First, upon a reset. Second, when the Request state machine detects an internal error, or enters an invalid state. Third, when an ABus error occurs while writing a CNF. |
| INSTOP | Set under three conditions. First, upon a reset. Second, when the Indicate state machine detects an internal error, or enters an invalid state. Third, when the host loads the Ind_hdrlen register with an illegal value. |

Service_attn & Service_Notify

The read/write Service attn/notify registers present the attentions for the service functions. The host may set any attention bit to cause an attention, but this does not affect any internal BSI states. Service_attn is set to 0x0f upon reset and Service notify is cleared to zero.

| Rsvd | Rsvd | Rsvd | Rsvd | ABR0 | ABR1 | LMOP | PTOP |

ABR?     Abort RSAP_? Request. Cleared by the host when it wants the BSI to abort a Request on this RSA. Set anytime RQABORT ends a Request on this RSA. The host may write a 1 to this bit, and this may prevent the Request being aborted, or not. It has no adverse affect on the BSI. When a Request is host-aborted the USR attention is set (in Req_attn_ and further processing on that RSAP is halted).

LMOP     Cleared by the host when it wants the BSI to transfer data between the LIMIT RAM and the Limit_data register. The direction of transfer (read or write) is determined by the LMRW bit in Limit_adr. The LIMIT RAM address is in Limit_adr. While LMOP = 0 the host must not alter either the Limit_adr or Limit_data registers.

PTOP     Cleared by the host when it wants the BSI to transfer data between the PTR RAM and a defined memory location. The direction of transfer (read or write) is determined by the PTRW bit in Ptr_int_adr. The PTR address in is Ptr_int_adr. The memory address is in Ptr_mem_adr. While PTOP = 0 the host must not alter either the Ptr_int_adr or the Ptr_mem_adr register.

No_space_attn & No_space_notify

The read/write No_space_attn/notify registers present the attentions generated when any of the queues runs out of space or valid entries. The host may set any attention bit to cause an attention for test purposes only. This should not be done during normal operation. The No_Data_Space attentions are both set and cleared by the BSI automatically. The No_Status_Space attentions are set by the BSI and must be cleared by the host. Upon reset, No_space_attn is set to 0xff and No_space_notify is cleared to zero.

| NROS | NRIS | LI0D | NI0S | LI1D | NI1S | LI2D | NI2S |

NR?S     No RSAP_? Status space. Set by the BSI upon a Reset, or when it has written a CNF into the RSAP_? status queue location one bare the host-defined LIMIT. Due to internal pipelining, the BSI may write up to two more CNFs to the queue. Thus the host must set its LIMIT one less than the available space in the queue. This bit must be cleared by the host to allow RSAP processing. i.e. the BSI will not service a Request unless it has space to write status.

LI?D     Low ISAP-? Data space. Set by the BSI upon a Reset, or when it prefetches a PSP from the last available ISAP_? PSP queue location. May be set or cleared by the host for test purposes. If PSP fetching was stopped due to no PSP entries, it will resume automatically when the appropriate LIMIT register is updated. This bit informs the host that the PSP queue is low. Note that the amount of warning is frame-length dependent. There will always be one more page (4K bytes) available for the BSI when this attention is generated. Another FDDI maximum-length frame (after the current one) will not fit in this space.

NI?S     No ISAP_? Status space. Set by the BSI upon a Reset, or when it has written an IDUD.Last into the last available entry in the ISAP_? status queue. When this occurs the BSI stops copying on that ISAP. This bit must be cleared by the host to enable ISAP copying, i.e. the BSI does not copy on an ISAP unless it has space to write the IDUDS.

Limit_adr

The read/write Limit_adr register is programmed with the LIMIT RAM location, MS data bit and type of LMOP service function to be performed. Not altered upon reset.

| A3 | A2 | A1 | A0 | LMRW | Rsvd | Rsvd | D8 |

A[3:0]     Writing these four bits sets the LIMIT RAM address for a subsequent LMOP service function.

LMRW     This bit determines whether a LMOP function will be a read or write. When LMRW = 0 it is write, when LMRW = 1 it is a read.

D8     This is the most significant data bit for exchange with the addressed LIMIT register.

Limit_data

The read/write Limit data register is loaded with the 8 least significant LIMIT RAM data bits to be transferred in a LMOP service function. The most significant data bit is exchanged with bit [0] of the Limit_adr register.

| limit_value[7:0] |

Not altered upon reset. For a write to the LIMIT RAM (LMOP with LMRW=0), this register is loaded with the new limit value to be written to the selected LIMIT register. For a read from the LIMIT RAM (LMOP with LMRW=1), this register will be loaded by the BSI with the current limit value in the selected LIMIT register. Note that all bits must be valid in the OMIT register, i.e. all bits are compared with the associated pointer, even if Small Queues are utilized.

Req_attn & Req_notify

The read/write Req_attn/notify registers present the attentions generated by both RSAPs. The host may set any attention bit to cause an attention, and except for the USR bits, this does not affect any internal BSI states. Upon reset, Req_attn and Req_notify are cleared to zero.

| USR_0 | RCM_0 | EXC_0 | BRX_0 | USR_1 | RCM_1 | EXC_1 | BRK_1 |

USR       RSAP_? Unserviceable Request. Set by the BSI when a Request cannot be processed. There are three causes: when the Rq_cls is inappropriate for the current ring state (e.g. Immediate when ring is operational); when there is no CNF status space; or as a result of a host abort (via Service_attn). While this bit is set Requests will not be processed on that RSAP. The host must clear the bit to resume processing.

RCM_?     RSA_? Request Complete. Set by the BSI when it has completed processing a Request object on this RSAP.

EXC_?      RSPA_? Exception. Set by the BSI whenever an RSAP_? exception occurs.

BRK_?      RSAP_? Breakpoint. Set by the BSI when it detects a RSAP_? breakpoint.

Req?_cfg

The read/write Req?_cfg registers are programmed with the operational parameters for each of the RSAPs. Note, a Reset does not affect this register. These registers may be altered between Requests, i.e. while the particular RSAP does not have a Request loaded. So the host must ensure that the BSI has fully processed all Requests in the REQ queue (as defined by the LIMIT), then it may change this register.

| TT1 | TT0 | PRE | HLD | FCT | SAT | VST | FCS |

TT[1:0]    Threshold on the output data FIFO before requesting transmission. 00 = 8 words, 01 = 16 words, 10 = 64 words (not applicable to Rev A), 11 = 128 words (not applicable to Rev A). Transmission begins when either the threshold is reached, or the entire frame is in FIFO.

PRE       Preempt/Prestage. In Req0_cfg this programs the Preempt option. In Req1_cfg this programs the Prestage option (along with the HLD bit). Preempt: PRE = 0, Requests on RSAP_0 will not preempt Requests on RSAP_1. PRE = 1, RSAP_0 may preempt RSAP_1. Prestage: PRE = 0, Requests will not be prestaged (if the HLD bit is a 1). PRE = 1, RSAP_1 Requests will prestage. If the HLD bit is 0, RSAP_1 will prestage anyway. Note RSAP_0 always prestages, except for immediate Requests.

HLD       Hold. HLD = 0, if there is a valid Request active on this RSAP, AND the service class is nonimmediate, AND there is no data in the FIFO, AND there is not a valid REQ fetched into the BSI; the BSI will end the service opportunity on this RSAP; HLD = 1, the BSI will not end a service opportunity until the Request is complete (if THT or TRT expires the BMAC ends the service opportunity). On RSAP_1, Prestaging is also affected by this bit. when HLD = 0, Prestaging is enabled, irrespective of the PRE bit (but not for immediate service classes). When HLD = 1, Prestaging is determined by the PRE bit. This option can potentially waste ring bandwidth so should be used with caution. However, when using preemption on RSAP_0, HLD may also be required to stop premature token issue in a host system with large bus or interrupt latency.

FCT       Frame Control Transparency. The FC will be sourced from the data (not the BEQ.F descriptor) when this bit is set. The FC field of each frame of a Request burst updates an internal copy of the transmitted FC and is used to compare against the FC of received frames when full confirming. If -continued FCT = 0, all bits of the FC in received frames must match the REQ<FC> for a confirmed frame to be "good". If FCT = 1, only the C,L and r bits must match.

SAT       Source Address Transparency. The SAT pin will be driven throughout the Request on this RSA. This may drive the BMAC SAT pin, or SAIGT, or both depending upon the application. (SAT, STRIP and FCST are general purpose frame-synchronized output pins). When SAT = 1, Full Confirmation requires the use of the EM input pin.

VST       Void Stripping. The STRIP pin will be driven throughout the Request on this RSAP. This may drive the BMAC STRIP pin, or also the SAT pin, depending upon the application. Void stripping operates as follows. At the end of the current service opportunity, two My_Void frames are sourced by the BMAC, which continues stripping until a My_Void frame returns, a token is received an Other_Void is received, a MAC frame other than My_Claim is received or a MAC reset occurs. All frames on this service opportunity are stripped using this method.

FCS       Frame Check Sequence disable. When set the BSI asset the FCST pin throughout the Request on this RSAP. This may drive the BMAC FCST pin, or also drive the SAT or SAIGT pins, depending upon the application. The Req_efs.FCS bit independently determines whether a frame needs a valid FCS to meet the matching frame confirmation criteria. This bit is normally used to program the BMAC not to concatenate its generated FCS to the transmitted frame.

Req?_efs HA 12–13

The read/write Req?_efs registers define the expected frame status for frames being confirmed on each RSAP. A frame must meet the programmed criteria to be counted as a matching frame. In addition to the frame parameters defined by this register, a frame must have a valid Ending Delimiter. This register is not altered upon reset. When a non-matching frame is received the BSI ends the Request, generates RCM, EXC and BRK attentions. Any remaining REQs in the Request are fetched until a REQ.L or REQ.Only is encountered. Processing will then resume on the next REQ.First or REQ.Only (any other type of REQ would be a consistency failure).

| VDL | VFCS | EE1 | EE0 | EA1 | EA0 | EC1 | EG0 |
|---|---|---|---|---|---|---|---|

VDL     Valid Data Length. When VDL = 1, received confirming frames must have a valid data length to meet the matching confirmation criteria. When VDL = 0, they do not.
VFCS     Valid FCS. When FCS = 1, received confirming frames must have a valid FCS to meet the matching frame confirmation criteria. When FCS = 1, they do not.
EE[1:0]     Expected E indicator selection: 00 = any, 01 = R, 10 = S, 11 = R|S.
EA[1:0]     Expected A indicator selection: 00 = any, 01 = R, 10 = S, 11 = R|S.
EC[1:0]     Expected C indicator selection: 00 = any, 01 = R, 10 = S, 11 = R|S.

Ind_attn & Ind_notify HA 14–15

The read/write Ind_attn/notify registers present the attentions generated by the ISAPs. The host may set any attention bit to cause an attention, but this does not affect any internal BSI states. Upon reset both registers are cleared to zero.

| Rsvd | Rsvd | ExC_0 | BRK_0 | EXC_1 | BRK 1 | EXC_2 | BRK_2 |
|---|---|---|---|---|---|---|---|

EXC_?     ISAP_? Exception. Cleared upon a reset. Set by the BSI when an exception occurs on this ISAP. May be set by the host to shut off copying on that ISAP (convenient when updating Ind_hdrlen/Ind_threshold registers). While set, copying is disabled on that ISAP.
BRK_?     ISAP_? Breakpoint. Cleared upon a reset. Set when an Indicate breakpoint is detected on this ISAP. No action is taken by the BSI if the host sets this bit.

Ind_threshold HA16

The Ind_threshold read/write register is programmed with the ISAP threshold counter load value. Not altered upon reset. This register may be loaded when INSTOP or the ISAP's Ind_attn.EXC bit is set.

| THR[7:0] |
|---|

THR     THR=00-FF. This value is loaded into a counter in the indicate module every time the SAP changes. Each valid frame copied on the SAP decrements the counter. When the counter reaches zero a status breakpoint attention is generated if the BOT bit is set on the ISAP, and the counter is reloaded.

Ind_mode HA 17

The read/write Ind_mode register defines the common ISAP configuration options. Not altered upon reset. This register should only be changed when INSTOP is set. It may be written with its (same) current value any time (used to enable one-shot sampling on RSAP_0).

| SM1 | SM0 | SKIP | Rsvd | BOT1 | BOT2 | BOB | BOS |
|---|---|---|---|---|---|---|---|

SM[1:0]     Sort Mode. These bits determine how the BSI sorts Indicate data onto the ISAPS. 00=Sync/Async, 01=Internal/External, 10=Header/Info, 11=Hi-priority/Lo-priority Async. See the Service Interface chapter for more details.
SKIP     SKIP enable. SKIP=0, disable skipping on ISAP_0; SKIP=1, enable skipping. Refer to the Service Interface chapter (Indicate) for more details. Note that a write to this register augments the SKIP feature.
BOT     Breakpoint on Threshold. Enables frame count threshold for generating an Indicate breakpoint attention on that ISAP.BOT1 is for ISAP_1 and BOT2 is for ISAP_2
BOB     Breakpoint on Burst end. Enables burst end detection for generating an Indicate breakpoint attention. See the Indicate Operation section for details.
BOS     Breakpoint on Service opportunity. Enables the end of a service opportunity to generate an Indicate breakpoint attention.

Ind_cfg HA 18

The read/write Ind_cfg register establishes the copy criteria for each of the ISAPs. For a detailed explanation of this, refer to the Indicate Operation (ISAP Copying and Sorting) section of the Service Interface discussion provided below. Not altered upon reset.

| CC7 | CC6 | Rsvd | CC4 | CC3 | Rsvd | CC1 | CC0 |
|---|---|---|---|---|---|---|---|

CC[7:6]     Copy Control on ISAP_0. 00=Do Not Copy, 01=Copy if address is recognized and ~MFLAG, 10=Copy if address recognized OR MFLAG, 11=copy promiscuously.
CC[4:3]     Copy Control on ISAP_1. As per ISAP_0.
CC[1:0]     Copy Control on ISAP_2. As per ISAP_0.

Ind_hdrlen HA 19

This read/write register defines the length of the frame header when using Header/Info sort mode. The 8-bit register is loaded with the number of 32-bit words in the header. Since the frame FC is written into a separate word, it counts as 1. For example, to split after 4 bytes of header data in a frame with long addresses: program this register with 05 (1 word FC, 1.5 DA, 1.5 SA, 1 HDR_DATA). The register must not be loaded with a value less than 4. If it is, the BSI sets the CMDE and INSTOP attentions. Setting INSTOP will halt all Indicate processing. This register must be initialized before setting the Sort Mode to header/info. Note that the header is always written as a whole burst. Not altered upon reset. This register may be changed while INSTOP or Ind_attn.EXC is set.

| Header length in words [7:0] |
|---|

Compare HA IF

The read/write Compare register is used as part of the conditional write mechanism. Zeroed upon reset.

```
|compare value[7:0]|
```

The value in the compare register is used in a comparison with a write access of a conditional write register. The compare register is loaded on a read of any of the conditional event registers or by directly writing to it. When a conditional write occurs, only bits that have the same current value as the corresponding bit in the Compare register will be updated with the new value.

DMA

There are five DMA "channels": two for transmit SAPs and three for receive SAPs. The software must load some of the BSI registers initially (basically the queue pointers), but once running, the BSI loads most registers itself.

Table IV below summarizes the working registers each DMA channel utilizes.

TABLE IV

| Ch | Reg Name | Transfer Use |
| --- | --- | --- |
| 0 | Req1_odu_ptr | Fetching output request ODUs |
| 0 | Req1_dud_ptr | Fetching output request ODUDs |
| 0 | Req1_sts_ptr | Storing confirmation status |
| 0 | Req1_req_ptr | Fetching output Requests |
| 1 | Req0_odu_ptr | Fetching output request ODUs |
| 1 | Req0_dud_ptr | Fetching output request ODUDs |
| 1 | Req0_sts_ptr | Storing confirmation status |
| 1 | Req0_req_ptr | Fetching output Requests |
| 2 | Ind2_idu_ptr | Storing indicate IDUs |
| 2 | Ind2_sts_ptr | Storing indicate IDUDs |
| 2 | Ind2_psp_ptr | Fetching PSPs |
| 3 | Ind1_idu_ptr | Storing indicate IDUs |
| 3 | Ind1_sts_ptr | Storing indicate DUDs |
| 3 | Ind1_psp_ptr | Fetching PSPs |
| 4 | Ind0_idu_ptr | Storing indicate IDUs |
| 4 | Ind0_sts_ptr | Storing indicate DUDs |
| 4 | Ind0_psp_ptr | Fetching PSPs Table 3-4. DMA |

All DMA activity for ABus is prioritized. The priority of bus requests generally is as follows, highest to lowest.

1. Request data reads
2. Indicate data writes
3. Indicate status writes
4. Request status writes
5. PSP queue reads
6. Mailbox accesses
7. PTR RAM operations However, to optimize performance the BSI dynamically changes priorities.

SERVICE INTERFACE

The following discussion describes the MAC User data services provided by the BSI 10. The first section defines the Request Services, i.e., the range of options defined by the host-programmed registers and the RSAP's descriptors. The second section describes how the host configures and operates the RSAPs. The third and fourth sections provide similar treatment for the ISAPs, i.e. define the options and the configuration/operation. The final section defines the configuration and operation of the status generation/space management module 16.

As stated above, the BSI 10 provides five simplex SAPs. There are two RSAPs (Request) and three ISAPs (Indicate). Each SAP has its own copy of certain registers, e.g. configuration. In the following descriptions, when a reference is made to a SAP register, a generic name is used. For example: each RSAP has a configuration register. The two registers are called Req0_cfg (RSAP_0) and Req1_cfg (RSAP1). For simplicity, the discussion below refers to the register by its generic name, i.e. Req?_cfg. Substitute a 0 or 1 within the name to identify the appropriate SAP.

The Request services are provided by the Request machine 14C (see FIG. 13A), implemented as a number of cooperating state machines (see FIGS. 13B–F). Similarly the Indicate services are provided by the Indicate machine 12C, again implemented as a number of cooperating state machines, as shown in FIG. 12.

REQUEST SERVICES

There are two request SAPs: RSAP_0 and RSAP1, high and low priority, respectively. The RSAPs may be mapped in many ways. One example is mapping synchronous traffic to RSAP_0 and asynchronous traffic to RSAP_1, although the BSI 10 does not restrict either RSAP to only these uses. Both RSAPs have almost exactly the same facilities; therefore, the following description applies to either. The main difference is the interaction between the RSAPs due to their relative priorities.

As stated above, the host programs the RSAP's operational characteristics via four registers. There are two configuration registers: the (main) Req?_cfg register and the (secondary) Req?_desc register; and an attention/notify register pair: the Req_attn register and the Req_notify register. A queue is used to convey REQ descriptors, which are loaded into the internal Req?_desc registers.

The host configures the RSAP for major operational parameters by programming the Req?_cfg register via the CBus interface.

Referring to FIG. 13A, to invoke an output request, a stream of REQ descriptors is conveyed to the Request State machine 14C via the REQ queue. As long as the queue contains descriptors, the Request State machine 14C will keep fetching and processing them.

Each REQ descriptor contains a command field with output request parameters (which are loaded into the internal Req?_desc register), a location field which is loaded into pointer registers and a frame count field which is loaded into a counter. A confirmation status object may optionally be generated for each Request object.

The attention and notify registers define the operation of request events.

The semantics of the output request is as follows:

```
Output Request {
    8:Req_cfg;        /*loaded into BSI Req?_cfg register*/
    8:Req_efs;        /*Exited frame status on Req*/
    3:Req_attn;       /*Attentions*/
    3:Req_notify;     /*Attentions which will notify*/
```

```
    REQ descriptor.F;      /*REQ - First*/
    REQ descriptor.M;      /*REQ - Middle*/
    ~
    ~
    REQ descriptor.L:      /*REQ - Last;*/
}
 where:
Req_cfg,efs,attn,notify {
    8:rqopt;               */request configuration options, per
                           RSAP*/
    8:Req_efs;             /*Expected frame status on Req, per
                           RSAP*/
    4:Req_attn;            /*Attentions on this RSAP, shared
                           attn register*/
    4:Req_notify;          /*Attentions which will notify*/
REQ {
    6:UID;                 /*User ID (copied to CNF)*/
    8:size;                /*number of frames in REQ part*/
    4:Cnf_cls;             /*Confrrm class*/
    4:Rq_cls;              /*Request class*/
    8:fc;                  /*Frame Control*/
    32:loc;                /*location of ODUD stream (and F/L
                           flag)*/
    and:
ODUD {
    16:size;               /*number of ODU bytes at loc (13 bits
                           used)*/
    32:loc;                /*location of ODU and F/L flag*/
Req?_cfg
```

| TT1 | TT0 | PRE | HLD | FCT | SAT | VST | FCS |

Req?_efs

| VDL | VFCS | EE1 | EE0 | EA1 | EA0 | EC1 | EC0 |

Req_attn & Req_notify

| USR_0 | RCM_0 | EXC_0 | BRK_0 | USR 1 | RCM 1 | EXC_I | BRK_1 |

REQ

| Rsvd | UID | size | Cnf_cis | Rq_cls | fc |
| loc | | | | | |

Rsvd                Bits [31:30] are reserved, must be
                    programmed zeroes.
UID[5:0]            A host (user) defined ID field. Each
                    CNF written will copy the UID field
                    from the current REQ.F into the
                    CNF.UID field.
size[7:0]           Count of number of frames represented
                    by the ODUD stream pointed to by loc.
Cnf_cls[3:0]        Confirm_class [RFIE]. Confirmation
                    service class values are shown below.
                    This field is only sampled on a
                    REQ.First, or REQ.Only. The class
                    has four bits: Repeat: R=0, fetch
                    all frames of a REQ; R=1, repeat
                    transmission of the first frame of
                    the REQ. Full/Txr: F=0, transmitter
                    confirm; F=1, full confirm.
                    Intermediate: I=0, intermediate CNFs
                    disabled; I=1, intermediate CNFs
                    enabled. End: E=0, ending CNFs
                    disabled, E=1, ending CNFs enabled.

TABLE V

Confirmation Classes

| Cnf_cls | Confirm Class Requested |
|---|---|
| x000 | Invalid (consistency failure) |
| xx10 | Invalid (consistency failure) |
| 0x00 | None (no confirm, except on exc) |
| 0001 | Tend (tx confirm, CNF on exc \| complete) |
| 0011 | Tint (tx confirm, CNF on exc \| complete \| intermediate) |
| 0101 | Fend (full confirm, CNF on exc \| complete) |
| 0111 | Tint (full confirm, CNF on exc \| complete \| intermediate) |
| 1100 | NoneR (no confirm, except on exc, repeat frame) |
| 1001 | TendR (tx confirm, CNF on exc \| complete, repeat frame) |
| 1011 | TintR (tx confirm, CNF on exc \| complete \| int, repeat frame) |
| 1101 | FendR (full confirm, CNF on exc \| complete, repeat frame) |
| 1111 | TintR (full confirm, CNF on exc \| complete \| int, repeat frame) |

| | |
|---|---|
| Rq_cls[3:0] | Request/Release_class. Request/Release class values are shown below. This field is only sampled on a REQ_First, or REQ.Only. See the confirmation description for details on the Confirm Class actions. |

TABLE VI

Request/Release Classes

| Rq_cls value | Rq_cls Name | Class Type | THT E/D | Token Capture | Token Issue |
|---|---|---|---|---|---|
| 0000 | None | None | | none | none |
| 0001 | Apr1 | Async pri1 | E | non-r | non-r |
| 0010 | Apr2 | Async pri2 | E | non-r | non-r |
| 0011 | Apr3 | Async pri3 | E | non-r | non-r |
| 0100 | Syn | Sync | D | any | capt |
| 0101 | Imm | Immed | D | none | none |
| 0110 | ImrnN | Immed | D | none | non-r |
| 0111 | ImmR | Immed | D | none | restr |
| 1000 | Asyn | Async | E | non-r | non-r |
| 1001 | Rbeg | Restricted | E | non-r | restr |
| 1010 | Rend | Restricted | E | restr | non-r |
| 1011 | Rcnt | Restricted | E | restr | restr |
| 1100 | AIynD | Async | D | non-r | non-r |
| 1101 | RbegD | Restricted | D | non-r | restr |
| 1110 | RendD | Restricted | D | restr | non-r |
| 1111 | RcntD | Restricted | D | restr | restr |

-enabled, D=disabled, non-r=non-restricted, restr=restricted, capt=captured

| | |
|---|---|
| fc[7:0] | Frame Control field to be used unless FC transparency is enabled. Note, this field is decoded to determine whether to assert ROCLM or RQBCN. This decoding is active always, i.e. irrespective of frame control transparency. This field is also used for comparing received frames when confirming (without FC transparency). |
| loc | Location. Bit[31] = First tag, Bit[30] = Last tag. Bits[29:28] = Reserved. Bits[27:2] = memory word address of ODUD stream. Bits[1:0] expected 00, not checked. |
| ODUD | rsvd \| size / loc |
| rsvd | Reserved, not checked. |
| size[12:0] | Count of number of bytes in the ODU (within a page_size). Note, the size may be zero. |
| loc | location = Bits[31:30] = F-L flags. Bits[29:28] = Reserved. Bits[27:0] = memory byte address of ODU. |
| CNF | rs \| fra \| frs \| tfc \| cfc / f-l \| UID \| fc \| cs \| Rsvd |
| rs[3:0] | Request Status, [4:Code] Intermediate<br>[0000] - None<br>[0001] - Preempted<br>[0010] - Part_done<br>Breakpoints<br>[0011] - Service_loss (brkpt)<br>[0100] - Reserved<br>Completion<br>[0101] - Completed_BC<br>[0110] - Completed_ok<br>Exception Completion<br>[0111] - Bad_conf<br>[1000] - Underrun<br>[1001] - Host_abort<br>[1010] - Bad_Ringop<br>[1011] - MAC_abort<br>[1100] - Timeout<br>[1101] - MAC_reset<br>[1110] - Con_fail<br>Error<br>[1111] - Internal or Fatal ABus Error |
| fra[3:0] | Frame Attributes = [MFLAG AFLAG TC]. MFLAG from BMAC (0=~mine, 1=mine); AFLAG from BMAC (0=~DA match, 1=DA match); TC=terminating condition (11=frame stripped, 10=format error, 01=ED, 00=Other (e.g. MAC reset or token). This field is only valid for Full confirmation. |
| frs[7:0] | Frame Status = [VDL VFCS E A C]. VDL=valid data length, VFCS=valid FCS,E,A,C=control indicators, 00=none, 01=R, 10=S, 11=T. This is valid only for Full confirmation, and if the frame ended with an ED. |
| tfc[7:0] | Transmitted Frames Count. Contains the number of frames successfully transmitted by the BSI and BMAC. This field is valid for all confirmation classes. |
| cfc[7:0] | Confirmed Frames Count. This field is valid only if Full confirmation was requested. |
| f-l | First and Last tags in Bits[31:30] of 2nd word. |
| UID[5:0] | Bits [29:24] are copied from the UID field of the current REQ.F/O. |
| fc[7:0] | The Frame Control field of the last frame of the confirmed burst. Valid only for Full confirmation. |
| cs[5:0] | Confirm Status [T R E P U F Ft]. [1:TxClass 1:Bad_Ringop 1:Exception 1:Parity_Error 1:Unexpected Frame Status 1:Full_Confirm 2:Frame_Type]. TxClass=0 for Restricted, or 1 for Non-Restricted, as returned by the BMAC. The Bad_Ringop bit is set when the ring goes into a bad operational state after transmission, but before all returning frames have been confirmed. If an exception occurs the |

Exception bit will be set in the
resulting CNF.cs[ ](note, the EXC
attention is set also). Parity
Error=0 for good frames, or 1 for a
frame received with a parity error.
Parity is checked from FC to ED
inclusive if Mode. FLOW is set. The
Unexpected Frame Status bit is set
when the frame status does not match
the programmed expected frame status
(see Req?_efs). Only applies to Full
Confirmation. The Full_Confirm bit is
set when the Request was for Full
Confirmation. The Frame_Type bits
reflect the type of frame that ended
Full Confirmation: 11=My_Void,
10=Other_Void 01=Token, 00=Any Other.

REQUEST OPERATION

Configuration

Before the Request machine 14C can operate, its space subchannels must have been initialized. The Request machine 14C can then be enabled by resetting the RQSTOP bit in the State_attn register and resetting the No_Status_Space bit(s) in the Space_attn register. Then, once the REQ queue LIMIT is updated, the Request machine 14C will service a RSAP.

A RSAP is configured by loading its Req?_cfg register. This register affects all subsequent Requests on this RASP. Each REQ.F descriptor loads the Req?_desc register on-the-fly and, thus, affects the current Request object only.

The following actions will initiate Request services:

1. allocate memory space for CNF and REQ queue(s)
2. program configuration register(s) via CBus
3. write the initial REQ(s) into the REQ queue(s)
4. reset the RQSTOP bit in State_attn
5. reset the NR?S bit(s) in Space_attn
6. write the REQ queue LIMIT register(s)

The BSI 10 will then fetch and process REQ descriptors until it reaches the REQ queue limit, or runs out of status space. As each Request object is completed, a RCM_? attention is generated and a CNF object written (if programmed).

OPERATION

Active, Valid Requests

The Request machine 14C processes active, valid Requests. A Request is active while:

1. The REQ queue pointer has not passed the LIMIT
2. The CNF queue pointer has not reached the LIMIT
3. The Req_attn.USR bit for the RASP is zero A Request is valid if:

1. The REQ parameters are allowable
2. The Rq_cls is compatible with the current ring state As each REQ is fetched, the Req?_req_ptr is updated to the next REQ. Simultaneously, the current (non-updated) value is compared with the Req?_req_limit. If they equal, then the last queued REQ has just been fetched. Therefore, further REQ prefetching is inhibited until the host writes to the Req?_req_limit.

When an exception occurs, the Request machine 14C generates a CNF and ends the Request. There must be space in the CNF queue to write status or the Request machine cannot complete a Request. To avoid this problem, a REQ will not be processed unless there is space to write at least two CNFs in the queue.

The USR attention is set to block subsequent Requests once one becomes unserviceable.

(i) Whenever the first REQ of a Request object is loaded, the UID, Cnf_cls, Rq_cls and FC are loaded into an internal Req?_desc holding register, thus establishing these parameters for the whole of the Request object. The second word of every REQ (part) is loaded into the Req?_dud_ptr register. If any of the parameters are not allowable, then the request is aborted.

(ii) The Request's Rq_cls is checked against the current ring state and the Request is aborted if the class and ring state are incompatible. For example, an Immediate Rq_cls must be presented when the ring is nonoperational, whereas for a Non-immediate Rq_cls the ring must be operational.

Request processing

The Request machine 14C reads a Request object and optionally generates a Confirmation object. To maximize performance, REQs (and their associated ODUDs) are prefetched by the Request machine 14C, filling in otherwise-idle bus cycles.

When the first REQ of a Request is loaded, the Request machine 14C presents the desired RQRCLS to the BMAC, which commands it to capture the appropriate token. Meanwhile, the first ODUD is prefetched and loaded into the Req?_odu_ptr (PTR RAM) and Req?_frm_cnt internal register. If prestaging is enabled, or if the service opportunity has arrived on this RSAP, data from the first ODU is fetched into the Request burst FIFO and the Request machine 14C requests transmission from the BMAC. When transmission is started (the frame is committed), the ODUD is marked invalid/used and the next ODUD fetched. This continues until either all frames on that Request object have been transmitted, or an exception occurs—which prematurely ends the Request. A CNF object will be written if it was programmed in the Cnf_cls or if an exception occurs. A Request may be serviced over one or more service opportunities, depending upon whether the THT expires or not.

The Request machine processes Requests on both RSAPs simultaneously. Their interaction is determined by the HLD and PRE configuration bits.

Null Objects

Some objects with a zero size field are supported by the Request machine 14C. Requests may have a zero in the frame count. This is typically used to end a Request without having to send data. For example, to end a restricted dialogue, a REQ.L with frame count of zero may be queued. This will cause the Request machine 14C to command the BMAC to capture and release the specified classes of token. This is summarized below.

1. a REQ.First with size=0: the BSI 10 latches the REQ descriptor fields, then fetches the next REQ. The RQRCLS will be driven to the BMAC, but RQRDY remains negated.
2. a REQ.Middle with size=0: the BSI 10 fetches the next REQ.
3. a REQ.Only with size=0: the BSI 10 requests the capture of the appropriate token; when it is captured asserts RQFINAL and ends the Request.

4. a REQ.Last with size=0: the BSI 10 captures the token, asserts RQFINAL, then marks the Request complete. (A request object may have zero frames.)

ODUDs may also have a zero byte count. This is useful for fixed protocol stacks. One layer may be called and, if it has no data to add to the frame, it may add an ODUD with a zero byte count to the list. Unlike Requests, ODUD objects must have at least 4 bytes (for short addresses).

Request Exceptions

Exceptions end a Request. Exceptions can occur as a result of external errors (BMAC, ring, ABus), from host errors in the Request object (consistency failures), from a lack of status space, or from a bad ring state (operational/non-operational).

One type of host error is an inconsistency within the Request object. The Request machine 14C checks for some inconsistencies within both the REQ and ODUD streams. The following events are detected as consistency failures:

1. a REQ.F with invalid Cnf_cls (as shown in the Confirm Classes table)
2. a REQ.F with Rq_cls=0
3. a REQ.F when the previous REQ was not a (REQ.L|REQ.O)
4. a REQ which is not a REQ.F, when the previous REQ was a (REQ.L|REQ.O)
5. a ODUD.F when the previous ODUD was not a (ODUD.L|ODUD.O)
6. a ODUD which is not a ODUD.F, when the previous ODUD was a (ODUD.L|ODUD.O)
7. an ODUD with zero byte count, and with its Last flag set When a consistency failure occurs, the Request is terminated with appropriate status. Following a consistency failure, the Request machine 14C looks for the end of the current object (REQ or ODUD). If the current descriptor is not the end (Last bit not set), the Request machine 14C will fetch subsequent descriptors until it detects the end. The next descriptor must then be the first of an object (i.e., obey the consistency rules as set forth above).

Confirmation

The host may request confirmation on a Request object. The Request machine 14C reports confirmation status in two ways: via attentions and via CNF descriptors. The attentions are always used by the Request machine 14C; therefore, the host should utilize the Notify register as required.

CNF descriptors will be written when: an exception occurs (independent of Cnf_cls), a Request completes (for end or int Cnf_cls), or when a breakpoint occurs (int Cnf_cls only). CNF writing is controlled via bits [1:0] of the REQ.Cnf_cls. Bit 0 (End) enables CNF writing upon exception/completion and Bit 1 enables CNF writing at breakpoints (Int).

The type of confirmation performed is selected via Bit 2 of the REQ.Cnf_cls. When set to 0, transmitter confirmation is performed, while full confirmation is performed when the bit is set to 1. Transmitter confirmation merely counts the number of frames transmitted successfully. Full confirmation counts the number of correctly transmitted frames and the number of correctly confirmed frames. A correctly confirmed frame is one which meets the matching criteria:

match=~void & ED & FC_Match & Our_SA & EFS_of & VDL & parity_ok where:

void=void frame (ignored by the BSI)

ED=the frame has an ending delimiter

FC_match=the selected bits in the transmitted and received frames' FCs are equal Our_=SA MFLAG|SAT&EM EF5_ok=FCS_ok & EE_ok & EC_ok & EA_ok FCS_ok=Req_EFS.FCS|(~Req_EFS.FCS & frame has valid FCS)

VDL=frame has a valid data length parity_ok=all bytes from FC to ED have good parity (if Mode. FLOW)

The confirmed frame count starts after the first Request burst frame has been committed by the BMAC and when a frame with Our_SA is received. It ends when: all the frames have been transmitted and the transmitted and confirmed frame counts are equal; or there is a MACRESET; or the ring has gone from operational to non-operational; or a Bad Frame is received (see below); or a non-matching frame is received (does not meet the above criteria); or a token is received. Note that Void and My_void frames are ignored.

When Req?_cfg.SAT is selected and Full confirmation is requested, confirmation begins when a frame end is detected with MFLAG|EM asserted. EM is the SA_match input from the external address matching circuitry.

A Bad Frame is a stripped frame, or a frame with format error, or a frame with a parity error (when Mode.FLOW is set). The parity check on information from the BMAC covers the frame from FC to ED inclusive.

The MS bit of the REQ.Cnf_cls enables refetching of the first frame of a REQ. This should be cleared for normal operation. When refetching is enabled, the BSI fetches and transmits the first frame continually until the Request is aborted.

Request Status Codes

The rs[] field returned in the CNF is a four-bit status code. It represents a priority encoded status value. These values signify:

| | |
|---|---|
| None | No status. The BSI 10 does not write this status. This encoding may be used by software to identify a NULL or invalid CNF. |
| Preempted | RASP_1 was being serviced, but a higher priority Request became active on RSAP_0. RSAP_1 will be serviced following R5A0. Only occurs if writing intermediate CNFs is commanded (REQ.Cnf_cls[1] is set). |
| Part_done | If the BSI 10 is servicing a Request, but it cannot hold onto a token (see the HLD option), and the last frame of a Request.part has been transmitted, the BSI 10 will write a CNF with Part_done status (if CNF generation is enabled). |
| Service_loss | The THT expired during a Request with THT enabled. bnly occurs if writing intermediate CNFs is commanded (REQ.cmd[1] is set). A breakpoint will be generated. |
| Completed_bc | When transmitting from the beacon state, this status is returned when the BMAC receives a My_Beacon. When transmitting from the claim state, this status is returned when the BMAC wins the claim process. |
| Completed_ok | Normal completion with good status. |
| Bad_conf | There was an error during the confirmation of transmitted frames. This caused the Request to complete with this status, or one of higher priority (i.e. those below). The |

| | |
|---|---|
| | types of confirm error are: MACRST, ring-operational change, receiving a Other_Void/My_Void/token receiving a bad frame, or receiving a frame that did not match the programmed expected frame status. |
| Underrun | There was no data in the request data when it was required to be presented to the BMAC. |
| Host_abort | The host aborted the Request on this RSAP, either directly by clearing the ABR? bit in the Service_attn register, or indirectly by having insufficient entries in the CNF queue. |
| Bad_Ringop | A Request was loaded with a Rq_cls that was inappropriate for the current ring operational state. |
| MAC_abort | The BMAC aborted the Request and asserted TXABORT. This could be from an interface parity error, or the transmitted frame failed the FC check, or it received a MAC frame while transmitting in the BEACON state. An exact explanation of the causes must be gained from the BMAC functional spec. This status is also returned when the BMAC receives an Other_Beacon while the BSI is transmitting in the beacon state, or when the claim process is lost while the BSI is transmitting in-the claim state. |
| Timeout | The TRT expired during a Request with THT disabled. The Request is aborted. |
| MAC_reset | The BMAC asserted MACRST. |
| Con_fail | Consistency Failure. There was a consistency failure within the REQ or ODUD stream. |
| Error | There was an internal logic error or a fatal ABus error (i.e. while writing a CNF). |

RSAP Interaction

There is interaction between RSAPs, determined by the prestaging and preemption configuration options.

The Request machine 14C sits in a start state looking for a REQ on either RSAP. As soon as a valid REQ is loaded, it issues a token capture request to the BMAC. If prestaging is enabled, the machine will move into the staging state immediately. This brings the first ODU into the Request burst FIFO. If prestaging is not enabled, the Request machine 14C waits until an appropriate token is captured before staging the first frame into the burst FIFO. Once the token is captured., the Request machine 14C begins transmitting frames on that RSAP.

In one alternative scenario, the Request machine 14C may have prestaged a RSAP_1 frame and identified a RSAP_0 REQ before the token is captured. In this case, the Request machine 14C ignores the staged data in the FIFO and (pre)stages the RSAP_0 REQ. When the RASP_0 REQ is complete, the Request machine 14C resumes processing the RSAP_1 Request where it left it, i.e. no data is lost.

In another alternative scenario, the Request machine 14C may be currently servicing a RSAP_1 REQ when a RSAP_0 REQ becomes active. If preemption is not enabled, the Request machine 14C continues uninterrupted. If preemption is enabled on RASP_0 however, the Request machine 14C will finish transmitting the current frame on RSAP_1 then release the token, moving back to the start state. This has the effect of reprioritizing the RSAPs, thus ensuring RSAP_0 goes out first at the next service opportunity. When RASP_0 has been serviced, RSAP_1 will pick up where it left off, again, not losing any data.

Prestaging only applies to Requests without an Immediate Request/Release class. Prestaging is always enabled for RSAP_0 and is a programmable option on RSAP_1. Preemption is not applicable to RSAP_1 and is a programmable option on RSAP_0. The BSI always stages the next available frame on the current RSAP into the FIFO once the current one is committed.

Errors and Exceptions

The use of the Request event logic is complicated by the Req_cfg options. The equations and text below attempt to explain each function independently (but there are obvious interactions).

There are five "outputs" from the Request machine 14C: State_attn.ERR, Req_attn.RCM, Req_attn.BRK, Req_attn.EXC, and CNFs.

Errors

State_attn.ERR is set when the BSI has an ABus error while attempting to write a CNF. An error also causes a request_complete condition, with the resultant actions as explained below. The RQRSTOP bit is also set and the Request machine halts.

Exceptions

Exceptions always cause a Req_attn.EXC and write confirmation status. Exceptions also cause the E bit to be set in the CNF.cs[]. Exceptions cause a request_complete condition with the resultant actions as explained next.

Completions

Completions occur when: a request object completes normally; or an error occurs; or a completion exception occurs. Completions cause a Req_attn.RCM. They also mark the REQ object fully completed within the BSI.

Breakpoints

Breakpoints are generated whenever a CNF is written.

CNFs

CNFs may be multi-part, for example a CNF.Middle may be written when a Service_loss CNF is written. Due to pipelining, the BSI may write up to two CNFs after it detects a write to the 2nd-last CNF entry. For this reason, the host must always define the CNF queue LIMIT to be one descriptor less than available space.

All the above is summarized in the following equations:

ERR=internal_error|ABus_error

EXC=exception

RCM=normal_complete|EXC|ERR

BRK=CNFwritten

CNF=CNF_enabled & normal-complete|EXC

Figure 24:
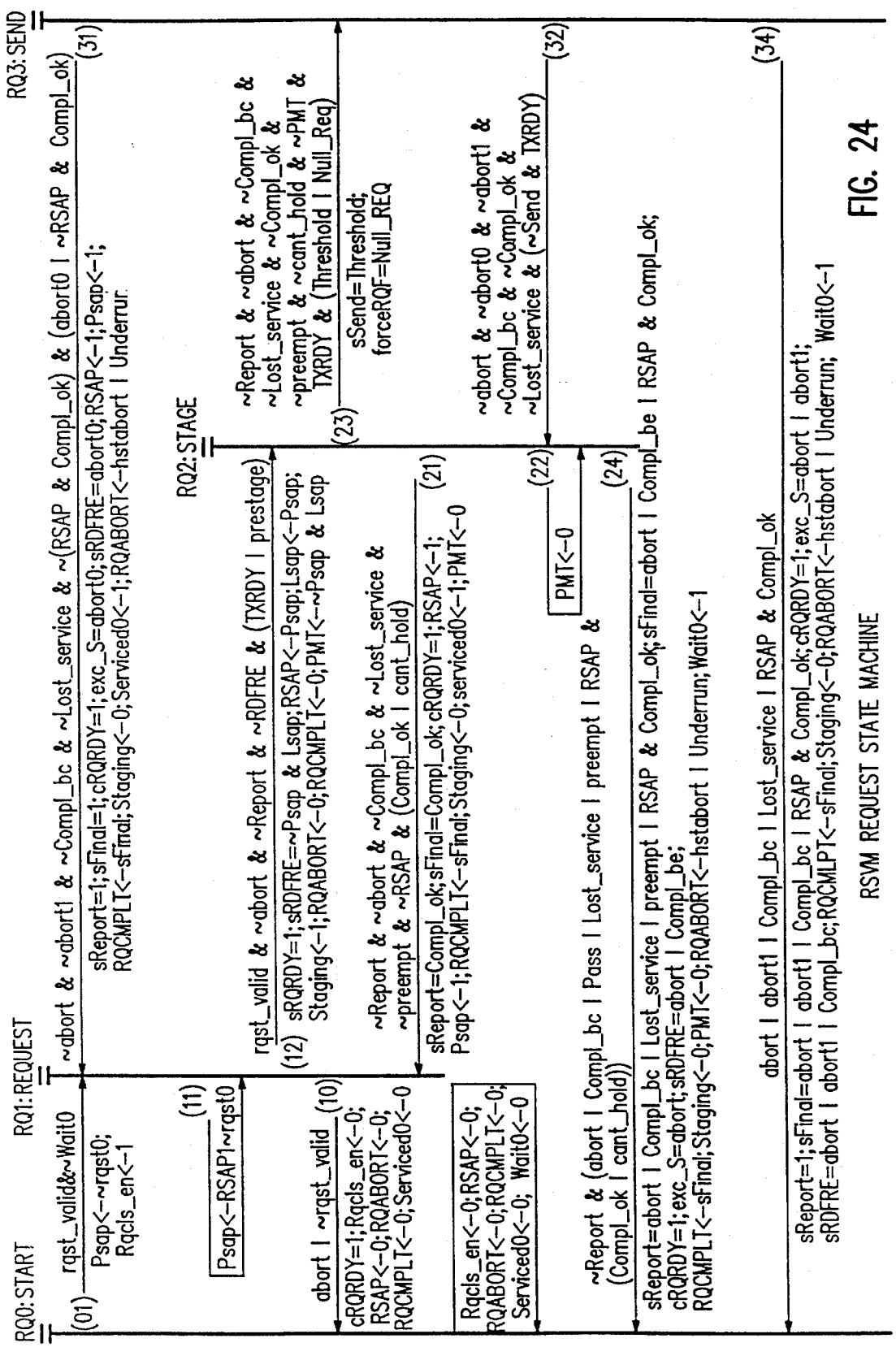
FIG. 24 provides a state diagram for the Request machine.

A detailed state diagram for the Request machine 14C is provided in FIG. 24.

INDICATE SERVICES

There are three indicate ISAPs: ISAP_0, ISAP_1, ISAP_2, all of equal priority. Unlike RSAPs, each ISAP has slightly different functionality. The ISAPs share a configuration register for copy criteria and also share a mode register which determines breakpoints for all ISAPs.

The user programs two shared ISAP mode/configuration registers to configure the ISAPs. Ind_mode establishes common operating modes for the ISAPs. The Ind_cfg register establishes the copying criteria for each ISAP. Ind_threshold sets the maximum number of frames that can be received on ISAP_1 or ISAP_2 before an attention will be generated. Ind_attn and Ind_notify define the operation of the indicate event logic. If header/info sort mode is selected, the Ind_hdrlen register defines the length of the header in words (counting the FC as one word).

The semantics of ISAP operation is as follows:

```
Indicate {
7:Ind_mode;      /*Indicate configuration
                   options*/
6:Ind_cfg;       /*ISAP copy controls*/
8:Ind_threshold; /*Breakpoint counter threshold*/
8:Ind_hdrlen;    /*Length of header portion*/
```

-continued

```
6:Ind_attn;      /*Attentions*/
6:Ind_notify;    /*Attentions which will notify*/
}
```

The BSI 10 produces IDUDs (with status) as follows:

```
IDUDI
4:is;       /*Indicate Status*/
4:fra;      /*Frame Attributes*/
8:frs;      /*Frame Status*/
1:vcopy;    /*VCOPY sent to BMAC*/
2:Rsvd;     /*Reserved-set to zero */
13:size;    /*count of IDU bytes pointed to
              by loc*/
32:loc;     /*F–L flag and location of IDU*/
Ind_mode
```

| SM1 | SM0 | SKIP | Rsvd | BOT1 | BOT2 | BOB | BOS |
|---|---|---|---|---|---|---|---|

Ind_cfg

| CC7 | CC6 | Rsvd | CC4 | CC3 | Rsvd | CC1 | CC0 |
|---|---|---|---|---|---|---|---|

Ind_threshold

| THR[7:9] |
|---|

Ind_hdrlen

| Length[7:0] |
|---|

Ind_attn & Ind_notify

| Rsvd | Rsvd | EXC_0 | BRK_0 | EXC_1 | BRK_1 | EXC_2 | BRK_2 |
|---|---|---|---|---|---|---|---|

IDUD

| is | fra | frs | vc | Rsvd | cnt |
|---|---|---|---|---|---|
| loc |||||| is[3:0]  Indicate Status, [1:Burst Boundary 3:Code]
    Non-end Frame Status
      [0000] - Last IDUD of queue, with a
        page-cross
      [0001] - Page-cross
      [0010] - Header-end
      [0011] - Page-cross with header-end
    Normal-end Frame Status
      [0100] - Intermediate (no breakpoints)
      [0101] - Burst boundary
      [0110] - Threshold
      [0111] - Service opportunity
    Copy Abort due to No Space
      [1000] - No data space (not
        header/info mode)
      [1001] - No header space
      (1010) - Good header, info not copied
      [1011] - Not enough info space
    Error
      [1100] - IFF Overrun
      [1101] - Bad frame (no VDL or no VFCS)
      [1110] - Parity error
      [1111] - Internal error
fra[3:0]  Frame Attributes = [MFLAG AFLAG TC].
    MFLAG=My Address (0=frame sent by another
    station, 1=frame sent by this station).
    AFLAG=DA match (0=Internal, 1=internal).
    TC=terminating condition (11=frame -continued

| | |
|---|---|
| | stripped, 10=format error, 01=ED, 00=Other (e.g. MAC Resct/token)). MFLAG and AFLAG are sampled by the BSI at INFORCVD. |
| frs[7:0] | Frame Status = [VDL VFC5 E A C]. VDl=valid data length, VFCS=valid FCS, E,A,C=control indicators (00=none, 01=R, 10=S, 11=T). This field is valid only if the frame ended with an ED. |
| vc | VCOPY. Reflects the state of the VCOPY bit sent to the BMAC for this frame. 0=VCOPY was negated, 1=VCOPY was asserted. |
| cnt[12:0] | Count of number of bytes in the ODU (within a page_size). |
| loc | Bits[31:30]=F-L tags. Bits[27:0]=28-bit memory address of start of ODU. For the first ODU of a frame, the address is of the 4th FC byte of the burst-aligned frame (i.e. bits[1:0] = 11). For subsequent ODUs it is the first byte of the ODU (i.e. bits[1:0] = 00). |

INDICATE OPERATION

Configuration

The indicate SAPs are configured by loading the Ind_mode, Ind_cfg, Ind_threshold, and Ind_hdrlen registers.

The steps required to initiate input are:

1. set up the ISAP's status queue spaces
2. set up the ISAP's configuration/mode registers via CBus
3. reset the INSTOP bit in State attn
4. program the IDUD queue LIMIT registers.

ISAP Sorting & Copying

Indicate data processing may be viewed as being performed by the Indicate machine 12C in a two-stage process: sorting, then copying. First, frames are sorted onto one of the three ISAPs. Second, a decision is made whether to copy the frame to memory or not.

Frames are sorted onto the ISAPs according to: the FC of the frame, the AFLAG, and the host-defined sorting mode. The sorting mode is determined by bits [SMI.SMO] in the Ind_mode register. Table VII below shows which ISAP frames will be sorted onto.

TABLE VII

| | Frame to ISAP Mapping | | |
|---|---|---|---|
| Sort Mode SM[1:0] | Frame Type FC etc. | ISAP # | Ind_Cfg (CC) |
| xx | MAC I SMT | 0 | [7:6] |
| 00 | Sync | 1 | [4:3] |
| 00 | Async | 2 | [1:0] |
| 01 | Internal | 1 | [4:3] |
| 01 | External | 2 | [1:0] |
| 10 | Header | 1 | [4:3] |
| 10 | Info | 2 | [1:0] |
| 11 | Hi-P Async | 1 | [4:3] |
| 11 | Lo-P Async | 2 | [1:0] |

The BSI 10 recognizes its own station being addressed as follows:

Addr_recognized=AFLAGI(~ECIP & EA)

Table VIII below shows that each ISAP has copy control bits. The Indicate machine 12C uses the selected copy control bits and various flags to make the copy decision. The basic decision type programmed by the copy control bits is the same on all ISAPs.

TABLE VIII

| | ISAP Copy Decisions |
|---|---|
| Copy Control | Copy Decision |
| 00 | Do Not Copy |
| 01 | Copy If Addr_recognized & ~MFLAG |
| 10 | Copy If Addr_recognized I MFLAG |
| 11 | Copy Promiscuously |

The copy control bits are programmed in the Ind_cfg register.

Skip on 15A 0

For ISAP_0, there is one extra feature. when the Copy Control is 01 or 10 and the SKIP bit in Ind_mode is asserted, only new/different MAC frames are copied. This is accomplished via a MSKIP state bit. MSKIP is set when any frame is copied on ISAP_0. As long as MSKIP is set, no further MAC frames will be copied. MSKIP is cleared under three conditions: when a MAC frame with not SAMEINFO is received, or a frame with a different FC is received, or a CBus write to the Ind_mode register is performed. The last of these may be used to sample (oneshot) an otherwise "identical" stream of MAC frames.

Sync/Async Sorting Mode

This mode is intended for end stations or for applications using synchronous transmission. MAC-SMT frames are sorted onto ISAP_0, synchronous frames are sorted onto ISAP_1, and asynchronous onto ISAP_2.

Internal/External Sorting Mode

This mode is intended for bridging or monitoring applications. MAC-SMT frames matching the internal (BMAC) address are sorted onto ISAP_0. All other frames matching the BMAC's internal address (short or long) are sorted onto ISAP_1. All frames matching the external address (frames requiring bridging) are sorted onto ISAP_2 (even MAC-SMT). Note that internal matches have precedence over external matches. This sorting mode utilizes the EM/EA/ECIP pins. Their use is as follows.

1. External address circuitry must assert ECIP somewhere from the assertion of FCRCVD up to the clock before the assertion of INFORCVD, otherwise the BSI assumes no external address comparison is taking place.

2. ECIP must be negated before EDRCVD. If not, the frame is not copied.
3. EA and EM are sampled on the clock after ECIP is negated.
4. ECIP is ignored after it is negated, until FCRCVD is asserted again.

This design allows ECIP to be a positive or negative pulse.

To confirm transmitted frames in this mode (typically with SAT utilized), EM must be asserted within the same timeframe as EA.

Header/Info Sorting Mode

This mode is intended for high performance protocol processing. MAC-SMT frames are sorted onto ISAP_0. All other frames are sorted onto ISAP_1 and ISAP_2. Frame bytes from the FC up to the programmed header length are copied onto ISAP_1. The remaining bytes (info) are copied onto ISAP_2. Only one stream of IDUDs is produced (on ISAP_1), but both ISAP's PSP queues are used for space (i.e. PSPs from ISAP_1 for header space, PSPs from ISAP_2 for info space). Frames may comprise a header only, or a header plus info. For frames with info, multi-part IDUD objects are produced. (An IDUD. Only may be produced if the frame length is <= header length.) Note that only the ISAP_1 Copy Control bits are used to determine whether a frame will be copied. In this mode, two address spaces (ISAP_1 data and ISAP_2 data) have IDUDs in one status stream (ISAP_1). This will result in different space-reclamation software to the other sorting modes.

Hi/Lo Priority Async Sorting Mode

This mode is intended for end stations using two priority levels of asynchronous transmission. MAC-SMT frames are sorted onto ISAP_0, high-priority async frames are sorted onto ISAP_1 and low-priority async onto ISAP_2. The priority is determined by the MS r-bit of the FC.r=0xx=low-priority; r=1xx= high-priority.

Channel Cutoffs

The Indicate machine 12C copies onto ISAPs as long as there is data and status space. When a lack of either space is detected on a particular ISAP, the Indicate machine 12C stops copying new frames for that ISAP from the ring. This is referred to as channel cutoff. There may still be data for that ISAP in the Indicate data FIFO 12A, but due to lack of space, it will (cannot) be written to memory.

When the last PSP for an ISAP is prefetched, an internal no_data_space flip-flop is set and all further frames on that ISAP are not copied (if currently copying one that continues). The Low_data_space attention is also generated. When the host updates the PSP queue LIMIT, the flop-flop is cleared and copying continues.

When the penultimate IDUD for an ISAP queue is written, further frame copying is stopped and the last IDUD written with special status. When the host updates the IDUD queue, LIMIT copying continues.

Indicate Status Codes

The is[] field returned in the IDUD is a four-bit status code. The values are priority encoded, with the highest priority having the highest number. Some of the codes are mutually exclusive (so their relative priority is inapplicable).

The first four values below are written when writing status before the normal end of frame. The second four values are written when a frame ends normally (no errors). The third four values are written when a frame copy is aborted due to a lack of data and/or status space. The last four values are written when there has been an exception or error. The values signify:

| | |
|---|---|
| [0000] | Last IDUD of queue, with a page cross. The last available location of the ISAP's IDUD queue was written. We also required a page cross, which meant there was more data to write.. Since there is no more IDUD space the remaining data was not written. This code will not be written in a IDUD.Middle, so a zero is[ ] with zero F-L tags can be utilized by software as a null descriptor. |
| [0001] | Page cross. Must be a First or Middle IDUD. This is part of a frame, that filled up the remainder of the current page so we crossed to a new page for the remainder of the data. |
| [0010] | Header end. This refers to the last IDU of the header portion of a frame. (Obviously applicable to Header/Info Sort Mode only). |
| [0011] | Page cross and header end. The occurrence of both of the above conditions. |
| [0100] | Intermediate. A frame ended normally, there was no breakpoint. |
| [0101] | Burst boundary. A frame ended normally, there was a breakpoint because a burst boundary was detected. |
| [0110] | Threshold. The copied frame threshold counter was reached when this frame was copied and ended normally. |
| [0111] | Service Opportunity. This (normal end) frame was preceded by a token, or MACRST, or a MAC frame was received, or there was a rings change. Any of these events marks a burst boundary. |
| [1000] | No data space. This code can be written when we are NOT in header/info sort mode. Not all the frame was copied because there was insufficient data space. |
| [1001] | Insufficient header space. The frame copy was aborted because we ran out of header space (in header/info sort mode). |
| [1010] | Successful header copy, frame info not copied. We had sufficient space to copy the header. When we wanted to copy the info there was insufficient data space, IDUD space (on ISAP_2), or both. No info was copied. |
| [1011] | No info space. We copied the header, and while copying the info we ran out of data and/or IDUD space. |
| [1100] | FIFO overrun. The indicate FIFO had an overrun while copying this frame. |
| [1101] | Bad frame. This frame did not have a valid data length, or had invalid FCS, or both. |
| [1110] | Parity error. There was a parity error during this frame. |
| [1111] | Internal error. There was an internal logic error during this frame. |

Indicate Breakpoints

The Indicate machine 12C generates Indicate status with every IDUD. The Indicate machine 12C also identifies bursts of related data. Burst boundaries generate a breakpoint attention. The host programs the Ind_mode, Ind_attn and Ind_notify registers to establish indicate breakpoints common to all ISAPs.

Sometimes it is impossible to detect the end of a burst of data. Since the host would wait too long for an attention, a copied frame counter is provided. Each time a frame is copied on an ISAP, this counter is decremented. Whenever it reaches zero, a breakpoint may be generated. The counter is reloaded from the Ind_threshold register every time the ISAP changes. Loading the Ind_threshold register with zero generates a breakpoint after 256 consecutive frames are received on one ISAP. Breakpoint generation may be enabled individually for ISAP_1 and ISAP_2 via the BOT bits in Ind_cfg.

The following list describes each status breakpoint condition.

| | |
|---|---|
| BOB | Breakpoint on Burst. If Ind_cfg.BOB is set, an end of burst will cause an Ind_attn.BRK. End of burst is an ISAP change, or DA change or SA change. An ISAP change is detected from the FC of valid, copied frames. A DA change is detected when a frame's DA changes from our address to any other. A SA change is detected when a frame's SA is not the same as the previous one. |
| BOT | Breakpoint on Threshold. The BSI 10 loads a copied-frame counter from the Ind_threshold register whenever a breakpoint occurs. This counter is decremented for each valid copied frame on the current ISAP. If it reaches zero and the ISAP's Ind_cfg.BOT is set, an Ind_attn.BRK occurs. BOT1 is for ISAP_1, BOT2 for ISAP_2. |
| BOS | Breakpoint on service opportunity. If Ind_cfg.BOS is set a service opportunity (token/MAC frame/ring operational change) following some copied frames will cause an Ind_attn.BRK. |
| MACInfo | A MACInfo breakpoint always generates an Ind_attn.BRK (i.e. this breakpoint is always enabled). A MACInfo breakpoint occurs when a MAC frame does not have identical first four bytes of info as the previous frame. The SAMEINFO detection is also used to suppress copying further MAC frames with the SAMEINFO asserted. |

Errors & Exceptions

There are two attentions associated with the error/exception handling: State_attn.ERR and Ind_attn.EXC.

Errors on Indicate generate the State_attn.ERR attention. The host must reset the INSTOP attention to restart processing on that ISAP.

If an exception occurs, then the current frame is marked complete, status is written into an IDUD.L, and an Ind_attn.EXC is generated.

Indicate SDU Format

Tables IX and X below show the Indicate SDU format. Note that the BSI 10 aligns each SDU onto a 16 or 32-byte burst-size boundary. On Request however there are no alignment restrictions, i.e. each ODU may be any number of bytes (ODU's may have a zero size), starting at any byte address in memory.

TABLE IX

Big-endian Indicate SDU (short addresses)

| Byte 0 Bit 31 | | | Byte 3 Bit 0 |
|---|---|---|---|
| FC | FC | FC | FC |
| DA0 | DA1 | SA0 | SA1 |

TABLE X

Little-endian Indicate SDU

| Byte 3 Bit 31 | | | Byte 0 Bit 0 |
|---|---|---|---|
| FC | FC | FC | FC |
| SA1 | SA0 | DA1 | DA0 |

QUEUE MANAGEMENT

The management of queue entries/free space for all queues is handled by the Status/Space machine 16 (FIG. 14).

This section describes how the Status/Space Machine 16 is configured and operated.

Configuration

Both the status queues and the PSP queue must be initialized before resetting the SPSTOP bit in State_attn. Initialization comprises setting up the PRT and LIMIT RAMs, setting up the PSP queue and setting up the status queues.

The host and BSI 10 communicate via a memory-based mailbox for RAM accesses. The mailbox address is normally loaded into Ptr_mem_adr once at power-up. Once this has been performed, to set up the PTR RAM, the host must:

1. check the PTOP bit is set (wait if not)
2. load Ptr int adr with the start location of PTR RAM (zero)
3. clear the PTOP bit
4. repeat these steps for all locations of PTR to be loaded.

To set up the LIMIT RAM, the host must:

1. check the LMOP bit is set (if not wait)
1. load Limit_adr with the LIMIT RAM location to be loaded (and the MS data bit)
2. load Limit_data with the limit value (LS 8 bits)
3. clear the LMOP bit
4. repeat these steps for all locations of LIMIT.

To initialize the BSI 10 for a PSP queue, the host must:

1. allocate memory to the PSP Queue
2. write valid PSPs to the queue
3. load Ind?_psp_ptr register with the start address of the queue
4. reset the SPSTOP bit in the State_attn register
5. load the LIMIT register with the queue's limit To initialize the status queues, the host must have:

1. allocated status space
2. loaded the queue pointer into the Ind?_sts_ptr registers
2. loaded the limits into the LIMIT RAM.

To initialize the REQ queues, the host must;

1. allocate memory to the REQ Queue
2. load Req?_req_ptr with the queue start address
3. reset the RQSTOP bit in the State_attn register
4. write one or more REQs to the queue
5. load the REQ queue LIMIT register

OPERATION

PSP Queue

Each ISAP has a DMA subchannel that operates its PSP queue. Each subchannel utilizes two registers for managing the queue:

1. The Ind?_psp_ptr references the next available PSP
2. The Ind?_next_psp register holds the next (prefetched) PSP.

The Status/Space Machine 16 prefetches the next PSP from the location referenced by the Ind?_psp_ptr and stores it temporarily in the Ind?_next_psp holding register so that it may be passed to the Indicate machine 12C immediately. When the Indicate machine 12C requests space, the Status/Space Machine 16 moves the descriptor from the holding register to the appropriate ISAP PSP pointer register, then prefetches the next PSP from the list, putting it into the holding register. This process is repeated until a PSP is prefetched from the queue's limit location. This generates a low_Data Space attention on that ISAP and stops further copying when there is no more data space. The host should place more PSPs in the queue reset the attention, then update the queue's LIMIT register. If copying was stopped, then it will resume on that ISAP when the PSP queue LIMIT is updated. (Any write to this limit register will do, the host is assumed to be moving the limit onward.)

The host builds up new PSP descriptors (from reclaimed space) in the tail of the (unfilled) PSP queue. With a 4 KByte queue and each descriptor being 8 bytes, the queue contains 512 descriptors, addressing 2 Mbytes of pool space memory per ISAP. If the total managed space area is greater than this amount, then the host may easily maintain a larger queue externally by reading the Ind?_psp_ptr as required. New PSPs are written to the tail of the queue and the queue's LIMIT used.

Status Queues

The BSI 10 writes two-word descriptors or messages to a status queue. Each word is written to the address in the queue pointer register, which is then incremented. When a descriptor or message is written, the write address is compared with the (post-incremented) queue's limit register. If the two addresses are equal, then the descriptor or message write is therefore to the penultimate queue entry. The result of this action is very similar for both Indicate and Request status queues.

For both queues, this action results in a No_status_space attention.

For ISAPs: the BSI 10 stops copying any further SDUs on that ISAP and the IDUD written is changed into an IDUD_Last, which may have status indicating there was no status space. If another IDUD was required to complete the capture of this frame then the is[] will be [0000]. If only this IDUD was necessary to complete copying the SDU then the is[] will contain some normal ending status, so only the No_Status_Space attention will alert the host to the lack of status space in the queue. No more SDUs will be copied to host memory until the No_space_attention is cleared and more status space is added to the queue by the host updating the limit register. The BSI will continue copying SDUs on the other ISAPs (for which there is space).

For RSAPs, the penultimate write also sets the Req_atnn.USR. While the USR attention is set RSAP, no further Requests will be serviced. Service may be continued by clearing the No_status_space and USR attentions.

Unlike the PSP queues, updating the status queue LIMIT does not resume service; only clearing the attention(s) will.

REQ Queues

The BSI 10 fetches two-word descriptors from each REQ queue. To control access, each RSAP maintains an internal Request_Queue_Empty (RQE) bit. As long as the RQE? bit is cleared, REQ processing continues. If the BSI 10 fetches a REQ from the queue's LIMIT location, then it sets the RQE bit. Each time the host writes to the queue's LIMIT register, the bit is reset. The host writes each new limit to the LIMIT register, and, as long as there is a difference between the BSI's REQ pointer and the LIMIT register, the BSI 10 will fetch and process REQs.

Indicate Throttling

The host may provide flow control on an ISAP by limiting either its data or status space, although data space flow control is more accurate.

Since each ISAP has its own PSP queue, relative ISAP priorities are host-defined.

ABUS INTERFACE

This section describes the BSI-memory bus (ABus) interface.

The ABus interface is handled by the Bus Interface Unit (BIU) 18 (FIG. 15). The ABus interface links the BSI 10 and 32-bit external memory.

The ABus interface is designed to interface to multi-master busses, support virtual or physical addressing systems, deliver very high bandwidth, support big-endian or little-endian systems, easily adapt to other standard busses, and provide synchronization between ring & bus timing domains.

A bus-request/bus-grant mechanism supports multi-master busses. The BSI 10 tri-states all bus outputs when not bus master. The mechanism also supports preempting the bus master.

The normal mode of operation of BIU 18 is to emit a physical address. To assist virtual memory systems the BSI 10 can insert MMU translation states in bus transactions.

To deliver maximum bandwidth, BIU 18 ABus uses aligned burst mode transfers. This allows the use of DRAM or SRAM external memory. 16-byte or 32-byte bursts are supported.

A programmable option for big/little-endian supports either system.

A simple protocol allows reasonably easy adaptation to other bus protocols.

OVERVIEW

The BIU 18 (FIG. 15) is a 32-bit synchronous multiplexed address/data, multi-master bus with bursting capability. All bus signals are synchronized to the master bus clock. Maximum burst speed is one 32-bit word per clock, but slower speeds may be accommodated by inserting wait-states.

Multiple Masters

The BIU 18 is a multi-master bus. A simple bus-request/Bus-grant protocol allows an external arbiter to support any number of bus masters, using any arbitration scheme (e.g. rotating or fixed priority). It also supports bus master preemption.

There are two main applications environments: the BSI 10 connected directly to the host memory (FIG. 8) and host-BSI shared memory (FIG. 9). The exact configuration is transparent to the BSI 10 and, in both cases, the bus may be multi-master. Normally, when connected directly to the host's system bus, the BSI 10 is one of a number of bus masters; in a shared memory environment, the BSI 10 is the default bus master (for latency/bandwidth reasons).

The bus is effectively shared between BSI internal DMA channels and any external masters. Within the BSI 10, channels are serviced in a priority order.

Addressing Modes

The ABus interface has a programmable bus mode, selecting virtual or physical addressing. With physical addressing, the BIU 18 emits the memory address and immediately starts to transfer data. With virtual addressing, the BIU 18 inserts two clocks between emitting the virtual address and starting to transfer data. This allows address translation by an external mmu.

Bandwidth

The BIU 18 supports single reads and writes and burst reads and writes. Back-to-back single reads/writes can take place every four clock cycles with physical addressing. Burst transactions can transfer 8 32-bit words every 12 clock cycles. With a 36 MHz clock, yields a peak bandwidth of 96 Mbytes/sec.

To allow the bus to operate at high frequency, the protocol defines all signals to be both asserted and deasserted by the bus master and slaves. Having a bus device actively deassert a signal guarantees the inactive transition is high speed. If this were not defined, then external pullup resistors would not be able to deassert signals fast enough. The protocol also reduces contention by avoiding cases where two bus devices simultaneously drive a line.

The BSI 10 operates synchronously with the ABus clock. In general, operations will be asynchronous to the ring since most applications will have a system bus clock that is asynchronous to the ring. The BSI 10 is designed to work directly on the host's main system bus or into local memory. When working directly on the host's bus, there are two parameters of critical interest: latency and bandwidth.

As stated above, the BSI 10 utilizes two FIFOs in each of the transmit and receive paths. One FIFO is 64-bytes deep and the other contains two banks of 32 bytes each to provide bursting capability. The amount of latency covered by the main data FIFO (plus one of the burst banks) must meet the average and maximum bus latency of the external memory. With a new byte every 80 ns from the ring, a 64 byte FIFO provides 6×80=5.12 us maximum latency. Of course, the bus must provide an average bus latency less than the time it takes the BSI to assemble a burst from the ring. For a 32-byte burst, this is 2560 ns.

To assist latency issues, the BSI 10 can completely empty or fill the FIFO in one bus tenure. To achieve this, the BSI 10 keeps bus-request asserted for multiple transactions if the FIFO is not full/empty. If the bus arbiter grants the bus to the BSI 10 for the multiple transactions, without releasing it to anyone else, then maximum latency can be tolerated. The BSI 10 may be preempted at any time by removing the bus-grant. When the bus-grant is negated, the BSI completes the current transaction and then releases the bus. There will be a maximum of 11 clocks from preemption to bus release (plus any memory wait-states).

Byte Ordering

ABus is a byte-addressable bus with some performance optimizations.

Descriptors are always aligned to a 32-bit address boundary. Input IDUs are always aligned to a burst_size boundary (default burst_size is determined by the Mode register setting). Output ODUs may be any number of bytes (even zero bytes if this is not the Last ODU of a frame), aligned to any byte address boundary, but operate most efficiently aligned to a burst_size boundary also.

Bursts are always aligned to a 32-bit word, 16 or 32 byte (burst-size) address boundary. Bursts will never cross a burst-size boundary. If large bursts are permitted, then the BSI will perform both 16-byte and 32-byte bursts, whichever is the most efficient (least number of clocks to load/store all required data).

All descriptor fetches occur as two single word accesses to/from a 32-bit aligned boundary.

The BSI 10 will not perform dynamic bus sizing; memory accessed must be 32 bits. The bus interface can operate in either big-endian or little-endian mode. The bit/byte alignments for both modes are shown in Tables XI and XII, respectively. Byte 0 is the first byte received from the ring, or transmitted to the ring.

TABLE XI

| D[31] | | | D[0] |
|---|---|---|---|
| Word | | | |
| Half0 | | Half1 | |
| Byte0 | Byte1 | Byte2 | Byte3 |

TABLE XII

| D[31] | | | D[0] |
|---|---|---|---|
| Word | | | |
| Half1 | | Half0 | |
| Byte3 | Byte2 | Byte1 | Byte0 |

Note that descriptors are word quantities and, thus, line up the same in either mode, only the data stream order changes.

BUS STATES

The BIU 18 utilizes single and burst read and write cycles. When programmed in virtual address mode the BSI is a "DMA master" and supplies a virtual address, with the physical address generated by the host CPU/MMU. The BSI 10 inserts two extra cycles after emitting the physical address to allow the MMU to translate the address and drive it onto the bus. In physical address mode, the BSI emits only a physical address and does not insert any extra cycles.

Figure 25:
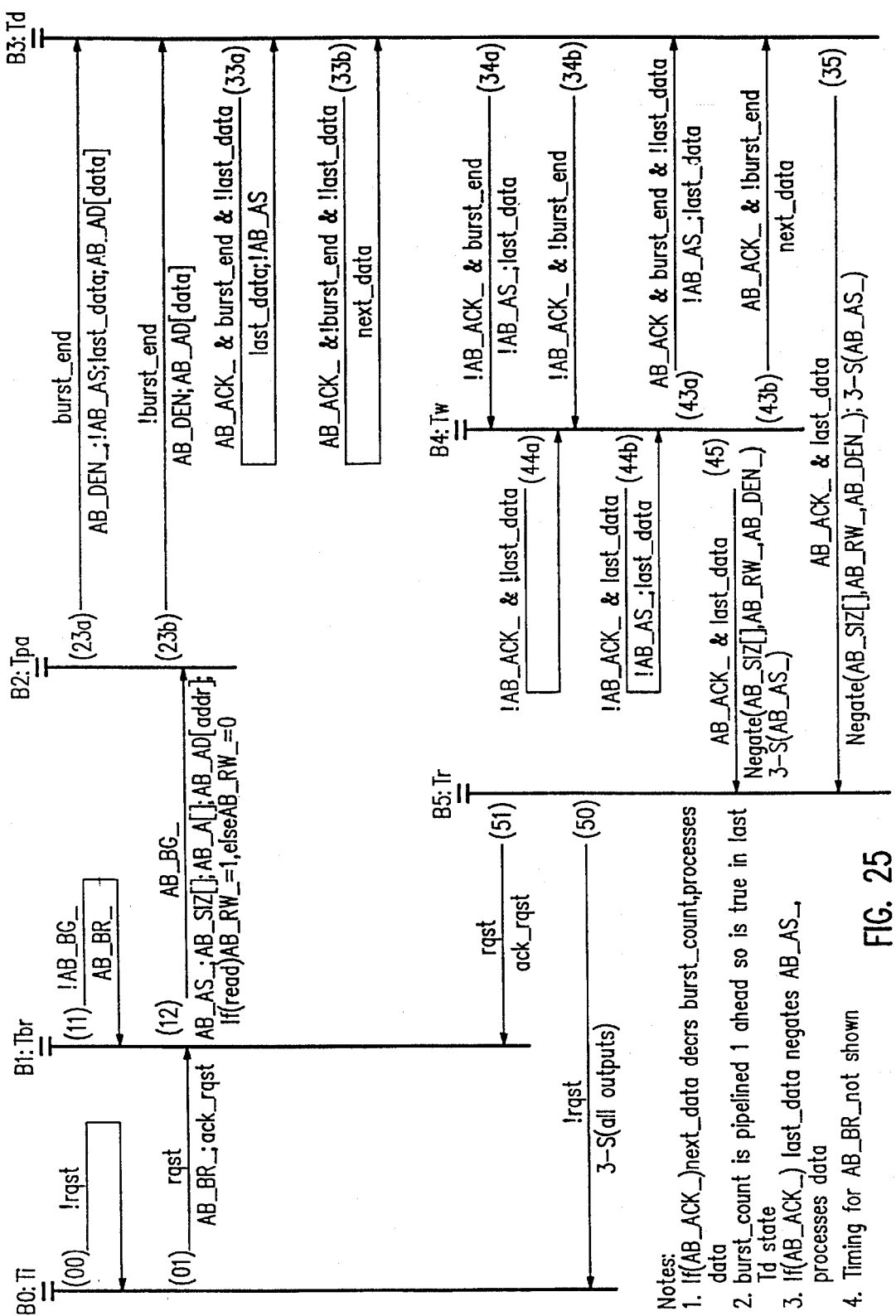
FIG. 25 provides a stable diagram for the BTU state machine.

The BIU master state diagram is shown in FIG. 25.

Master States

The Ti state exists when no bus activity is required. The BIU 18 does not drive any of the bus signals when it is in this state (all released). However, if the BIU 18 requires bus service, then it may assert its bus-request.

When a transaction is run, the BIU 18 enters the Tbr state and asserts bus-request, then waits for bus-grant.

The state following Tbr is either Tva or Tpa. In virtual address mode, the BIU 18 enters Tva and drives the virtual address and size lines onto the bus. In physical address mode, Tpa occurs next.

Following a Tva state is a Tmmu state. During this cycle, the external MMU is performing a translation of the BIU virtual address emitted during Tva.

Following a Tmmu state (virtual addressing), or a Tbr state (physical addressing), is the Tpa state. The bus master (virtual address host CPU/MMU, physical address BSI) drives the physical address and the BSI 10 drives address, read/write strobes and size signals.

Following the Tpa state, the BIU 18 enters the Td state to transfer data words. Each data transfer may be extended infinitely by inserting Tw states: A slave acknowledges by asserting its acknowledge and transferring data in a Td e (cycle). If the slave can drive data at the rate of one word per clock (in a burst), then it keeps its acknowledge asserted.

Following the final Td/Tw state, the BIU 18 enters a Tr state to allow time to turn off or turn around bus transceivers.

A bus retry request is recognized in any Td/Tw state. The BIU 18 will go to a Tr state and then rerun the transaction when it obtains a new bus-grant. The whole transaction is retried, i.e. all words of a burst. Additionally, other transaction will be attempted before the interrupted one is retried. The BIU 18 retries indefinitely until either transaction completes successfully or a bus error is signalled.

Bus errors are recognized in Td/Tw states.

BUS ARBITRATION

The BIU 18.uses a bus-request/bus-grant pair for arbitration. External logic must provide the arbiter function. The protocol provides for multiple transactions per tenure and bus master preemption.

The BSI 18 asserts a bus-request and assumes mastership when bus-grant is asserted. If the BIU 18 has another transaction pending, then it will keep bus-request asserted or reassert it before the completion of the current transaction. If bus-grant is (re)asserted before the end of the current transaction, then the BIU 18 retains mastership and runs the next transaction. This process may be repeated indefinitely.

If the arbiter wishes to preempt the BIU, then it deasserts bus-grant. The BIU will complete the current bus transaction, then release the bus. From preemption to bus release is a maximum of (11+8×memory_wait_states) bus clocks. For example, in a 1 wait-state system, the BSI will release the bus within 19 bus clocks maximum.

SIGNALS (FIGS. 15A–15D)
Address and Data

As stated above, Abus uses a 32-bit multiplexed address/data bus. To assist the user with the burst transfer capability the three bits of the address which cycle during a burst are output demultiplexed. The bus carries different information depending upon the current state.

| | |
|---|---|
| AB_AD[31:0] | The 32-bit multiplexed address data bus. Three-state input/outputs. During Tva AB_AD[27:0] carries the virtual address of the memory location to be accessed (28 bits), and AB_AD[31:28] carries the cycle identifier/function code (4 bits). In virtual address mode the host master will source the translated address during Tpa, but in physical address inode the BSI will drive the physical address and function code during Tpa. During Td and Tw states the AB_AD bus carries the data. The alignment of the data may be programmed to be big-endian or little endian. The table below shows the function code encoding for bus accesses. |
| AB_BP[3:0] | These are byte parity lines for AB_AD. AB_BP[3] is the byte parity for AB_AD[32:24], AB_BP[2] for AB_AD[23:16], AB_BP[1] for AB_AD[15:8], and AB_BP[0] for AB_AD[7:0]. the BSI generates parity on address output to ABus. To maximize speed the parity is precomputed (calculated as the address is stored). |

TABLE XIII

Transaction Function Codes

| AD[31:28] | Transaction Type |
|---|---|
| 0 | RSAP_1 ODU load |
| 1 | RSAP_1 ODUD load/CNF store |
| 2 | RSAP_1 REQ load |
| 3 | RSAC_0 ODU load |
| 4 | RSAP_0 ODUD load/CNF store |
| 5 | RSAC_0 REQ load |
| 6 | ISAP_2 IDU store |
| 7 | ISAP_2 IDUD store |
| 8 | ISAC_2 PSP load |
| 9 | ISAP_1 IDU store |
| A | ISAP_1 IDUD store |
| B | ISAC_1 PSP load |
| C | ISAP_0 IDU store |
| D | ISAP_0 IDUD store |
| E | ISAP_0 PSP load |
| F | PTR RAM load/store |

TABLE XIII-continued

| | |
|---|---|
| AB_A[4:2] | The three bits of demultiplexed address that cycle during a burst. Three-state outputs only. They are driven from Tpa to the last Td state, negated in the following Tr state, then released. Note that the address presented allows external pipelining for optimum memory timing (see timing diagrams for details). |

Command

| | |
|---|---|
| AB_AS_ | The Address Strobe signal is a three-signal output, asserted by the BSI from Tpa up to the last Td state where it is negated, then released in the Tr state. It is intended to be used for two purposes. The cycle it becomes asserted the address is being driven on AB_AD, so AB_AS_ is an address strobe. When AB_AS_ is inactive and AB_ACK_ is active, the next cycle is a Tr state, and an external arbiter can sample all its bus_requests, and issue a bus_grant in the following cycle. |
| AB_RW_ | The Read_Write_ signal is a three-state output, asserted from Tpa to the last Td state, negated in the following Tr state, then released. It is driven high for a read, and low for a write. |
| AB_DEN_ | The Data_Enable signal is a three-state output, asserted from the first Td state to the last Td state, negated in the following Tr state, the released. |
| AB_SIZ[2:0] | The Size signals are three-state outputs asserted from Tpa up to the last Td state, negated in the following Tr state, then released. They indicate the transfer size of the transaction. See the table below for encodings. (Note that AB_SIZ[2] is a burst indicator.) |

TABLE XIV

Size Encoding

| AB_SIZ2 | AB_SIZ1 | _AB_SIZ0 | Transfer Size |
|---|---|---|---|
| N | N | N | 4 Bytes |
| N | N | A | 1 Byte |
| N | A | N | 2 Bytes |
| N | A | A | Reserved |
| A | N | N | 16 Bytes |
| A | N | A | 32 Bytes |
| A | A | N | Reserved |
| A | A | A | Reserved |

| | |
|---|---|
| AB_ACK_ | The Transfer Acknowledge input is used to indicate a slave's response to the bus master. The slave has four choices, insert wait states, cause a retry for the transaction, terminate |

|         |         | with an error, or terminate normally. The BSI only performs transfers of 32-bits. See Table I below. |
|---------|---------|---|
| AB_ERR_ |         | The Bus Error input is asserted by a slave to cause a transaction retry or transaction abort. The status encoding is shown in the table below. |

TABLE XV

Slave Transaction Response

| AB_ACK_ | AB_ERR_ | Definition |
|---------|---------|------------|
| N | N | Insert Wait States |
| N | A | Bus Error |
| A | A | Transaction Retry |
| A | N | Acknowledge |

The BIU 18 arbitrates between the internal DMA channels and issues a bus request when any channel requests service.

| AB_BR_ | The Bus Request output is asserted by the BIU to gain access to ABus. |
|--------|---|
| AB_BG_ | The Bus Grant input is asserted by external logic to grant the bus to the BSI. If AB_BG_ is asserted at the start of a transaction (Tbr) the BSI will run a transaction. .LE.UH "Miscellaneous" .VL 150 |
| AB_CLK | All ABus operations are synchronized to the rising edge of the AB_CLK. |

PHYSICAL ADDRESSING BUS TRANSACTIONS

Figure 26:
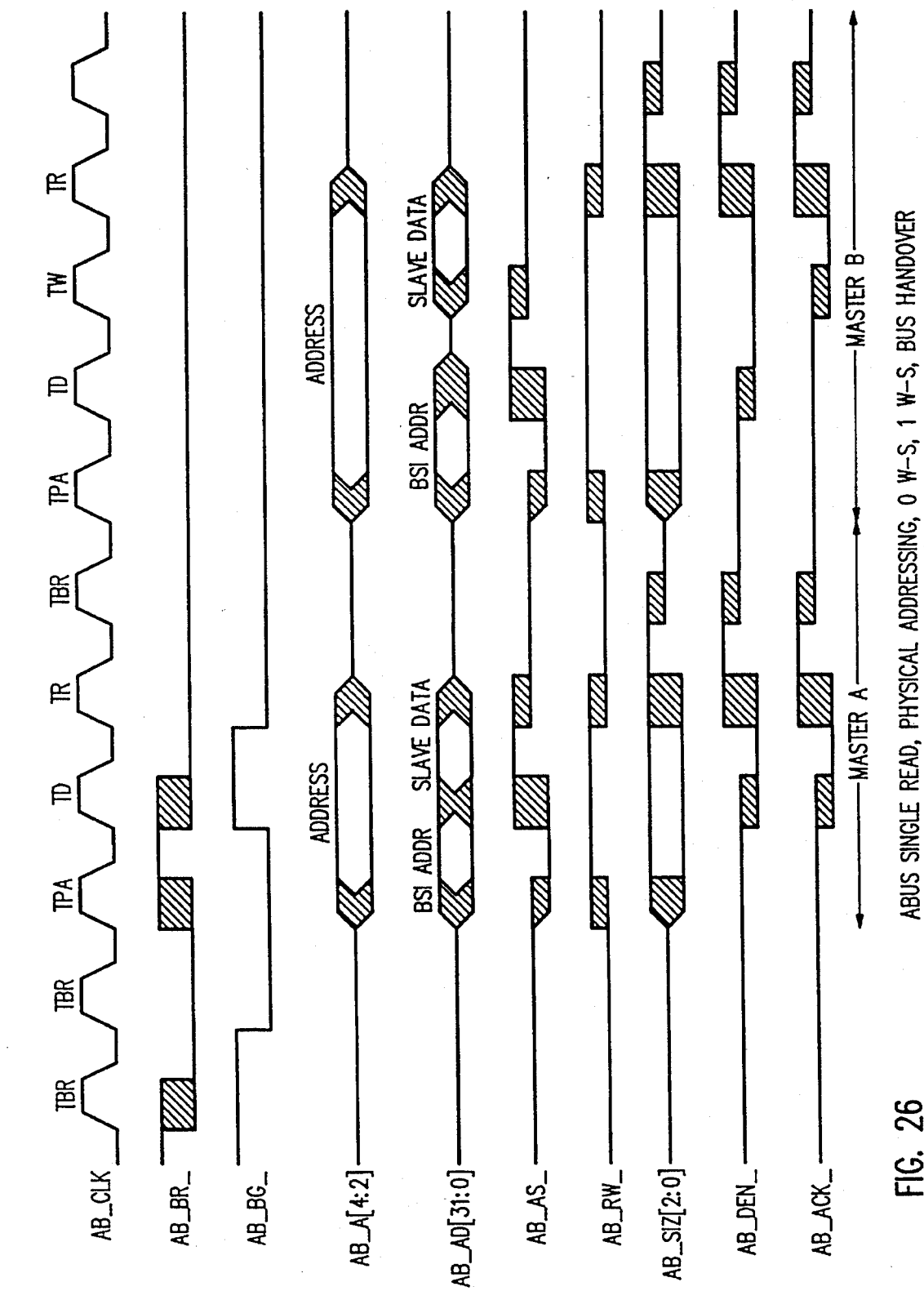
FIG. 26 is a timing diagram illustrating the waveforms for a DBus single read.
Figure 27:
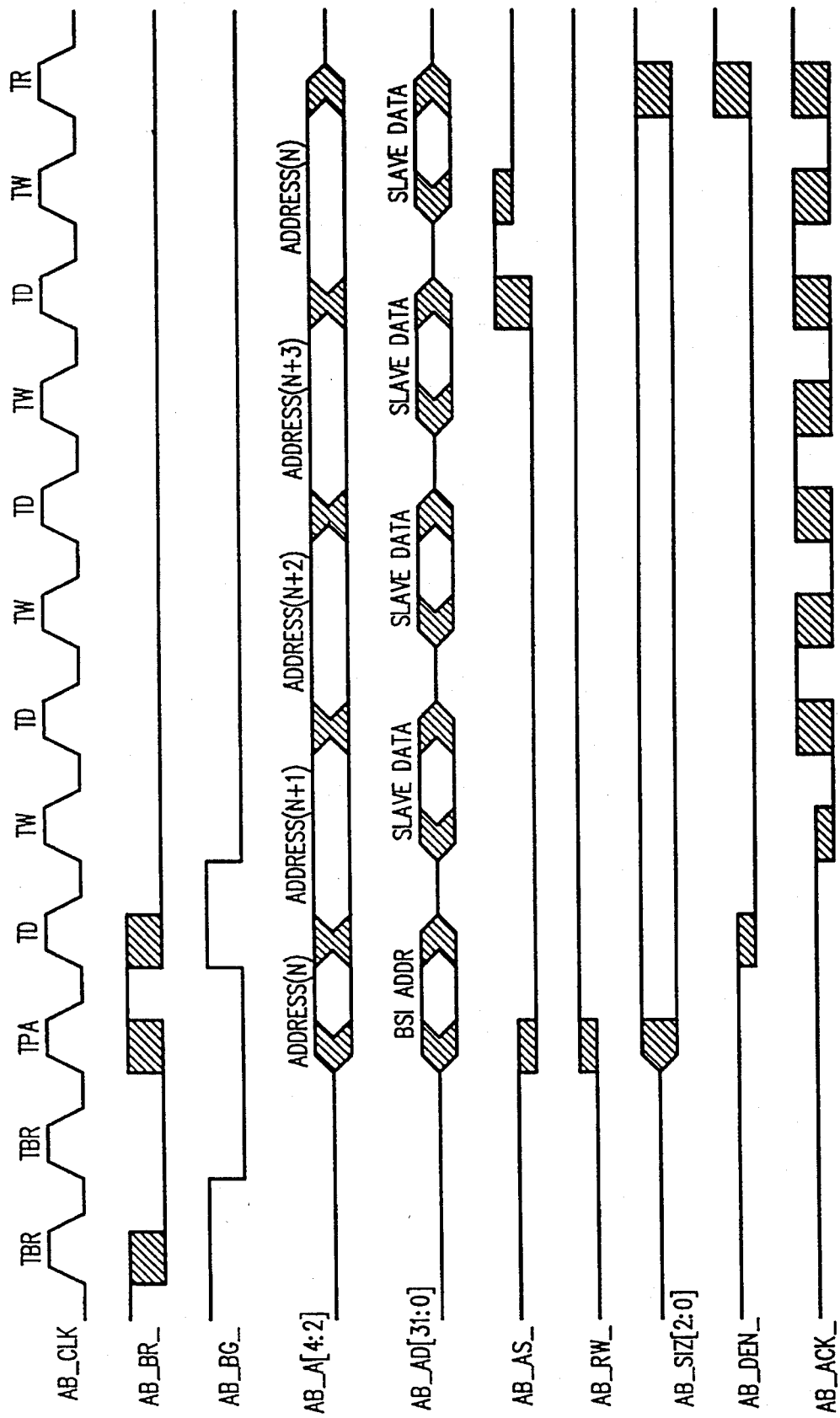
FIG. 27 is a timing diagram illustrating the waveforms for a ABus burst read.
Figure 28:
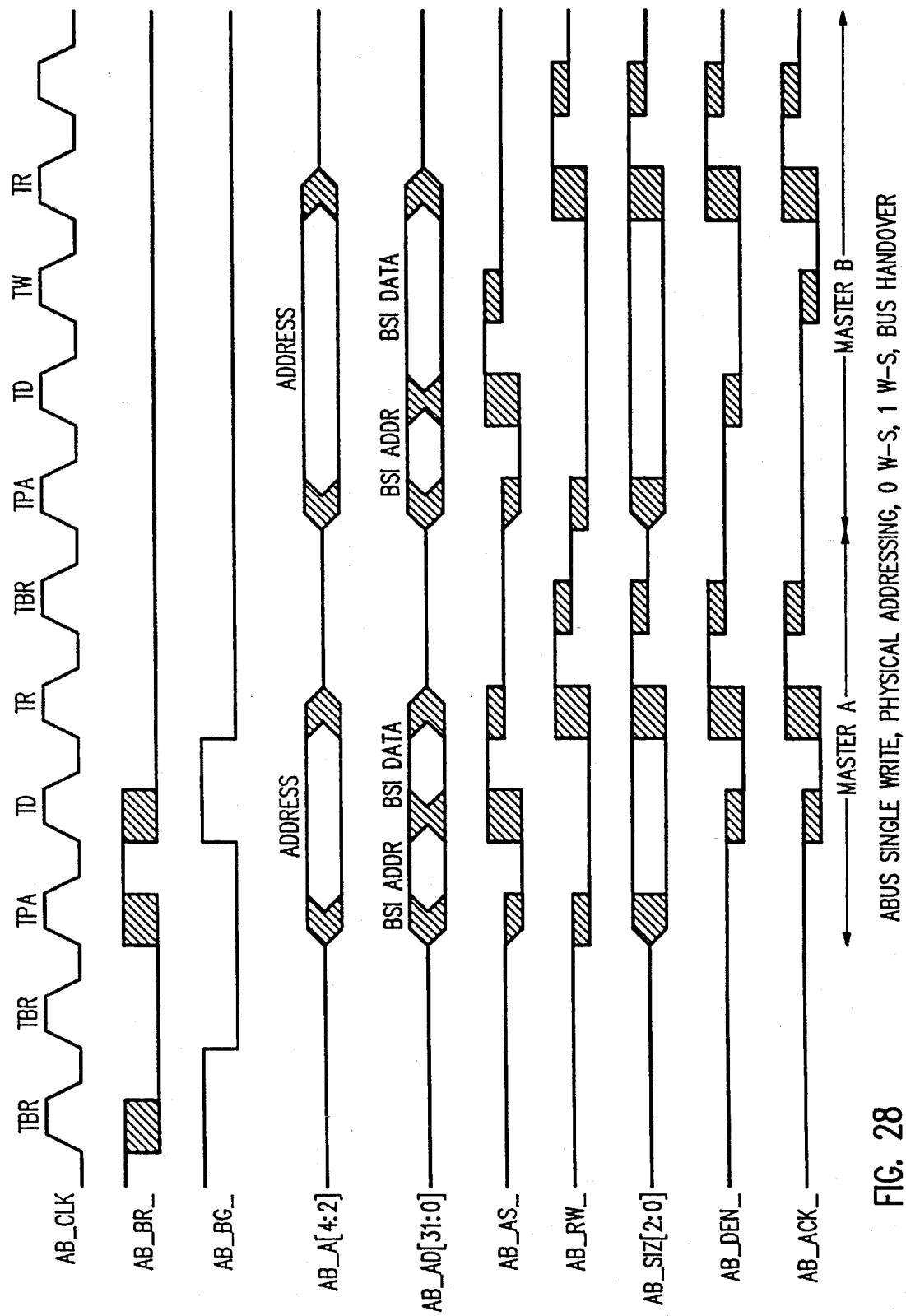
FIG. 28 is a timing diagram illustrating waveforms for a ABus single write.

This section presents details of all bus transactions in physical addressing mode. (FIGS. 26–24). The next section will detail virtual addressing.

Single Read

| Tbr. | BSI asserts AB_BR_to indicate it wishes to perform a transfer. Host asserts AB_BG_, BSI drives AB_A, and AB_AD when AB_BG is asserted. Moves to Tpa next clock. |
|------|---|
| Tpa. | BSI drives AB_A and AB_AD with the address, asserts AB _AS, drives AB_RW and AB_SIZ[2:0], negates AB_BR_ if another transaction is not required. |
| Td. | BSI negates.AB_AS_, asserts AB_DEN_, samples AB_ACK_and AB_ERR_. Slave asserts AB_ACK_, drives AB_ERR_, drives AB_AD (with data) when ready. BSI samples a valid AB_ACK_, capturing the read data. Tw states may occur after Td. |
| Tr. | BSI negates AB_RW_, AB_DEN_, AB_SIZ[2:0], releases AB_A, AB_AS_. Slave deasserts AB_ACK_ and AB_ERR_, releases AB_AD. |

Single Write

| Tbr. | BSI asserts AB_BR_ to indicate it wishes to perform a transfer. Host asserts AB_BG_, BSI drives AB_A, and AB_AD when AB_BG is asserted. Moves to Tpa next clock. |
|------|---|
| Tpa. | BSI drives AB_A and AB_AD with the address, asserts AB_AS, drives AB_RW and AB_SIZ[2:0], negates AB_BR_ if another transaction is not required. |
| Td. | BSI negates AB_AS_, asserts AB_DEN_, drives AB_AD with the write data and starts sampling AB_ACK_and AB_ERR_. Slave captures AB_AD data, asserts AB_ACK_, drives AB_ERR. BSI samples a valid AB_ACK_. Tw states may occur after Td. |
| Tr. | BSI negates AB_RW_, AB_DEN_, AB_SIZ[2:0], releases AB_A, AB_AD, AB_AS_. Slave deasserts AB_ACK_and AB_ERR_, stops driving AB_AD with data. |

Burst Read

| Tbr. | BSI asserts AB_BR_ to indicate it wishes to perform a transfer. Host asserts AB_BG_, BSI drives AB_A, and AB_AD when AB_BG_ is asserted. Moves to Tpa next clock. |
|------|---|
| Tpa. | BSI drives AB_A and AB_AD with the address, asserts AB_AS_, drives AB_RW_and AB_SIZ[2:0], negates AB_BR_ if another transaction is not required. |
| Td. | BSI asserts AB_DEN_, samples AB_ACK_ and AB_ERR_, increments the address on AB_A. Slave asserts AB_ACK_, drives AB_ERR_, drives ab_AD (with data) when ready. BSI samples a valid AB_ACK_, capturing the read data. Tw states may occur after Td. This state is repeated four or eight times (according to the burst size). On the last Td state the BSI negates AB_AS_. |
| Tr. | BSI negates AB_RW_, AB_DEN_, AE_SIZ[2:0], releases AB_A, AB_AS_. Slave deasserts AB_ACK_and AB_ERR_, releases AB_AD. |

Burst Write

| Tbr. | BSI asserts AB_BR_ to indicate it wishes to perform a transfer. Host asserts AB_BE_, BSI drives AB_A, and AB_AD when AB_BG_is asserted. Moves to Tpa next clock. |
|------|---|
| Tpa. | BSI drives AB_A and AB_AD with the address, asserts AB_AS_, drives AB_RW_ and AB_SIZ[2:0], negates AB_BR_ if another transaction is not required. |
| Td. | BSI asserts AB_DEN_, drives AB_AD with the write data samples AB_ACK_and AB_ERR_, increments the address on AB_A. Slave captures AB_AD data, asserts AB_ACK_, drives AB_ERR_. BSI samples a valid AB_ACK. Tw states may occur after Td. This state is repeated as required for the complete burst. On the last Td state the BSI negates AB_AS_. |
| Tr. | BSI negates AB_RW_, AB_DEN_, AB_SIZ[2:0], releases AB_A, AB_AD, AB_AS_. Slave deasserts AB_ACK_and AB_ERR, stops driving AB_AD with data. |

VIRTUAL ADDRESSING BUS TRANSACTIONS

This section presents details of all bus transactions in virtual addressing mode.

Single Read

| Tbr. | BSI asserts AB_BR_ to indicate it wishes to perform a transfer. Host asserts AB_BG_, BSI drives AB_A, and AB_AD when AB_BG_ is asserted. Moves to Tva next clock. |
|------|---|
| Tva. | BSI drives AB_A and AB_AD with the virtual address for one clock, negates AB_AS_, asserts AB_RD_, drives AB_SIZ[2:0], negates AB_BR_ if another transaction is not required. |
| Tmmu. | Host MMU performs and address translation during this clock. |
| Tpa. | Host MMU drives AB_AD with the translated (physical) address, BSI drives AB_A, asserts AB_AS_. |
| Td. | BSI negates AB_AS_, asserts AB_DEN_, samples AB_ACK_and AB_ERR_. Slave asserts AB_ACK_, drives AB_ERR_, drives |

|   |   |
|---|---|
|  | AB_AD (with data) when ready. BSI samples a valid AB_ACK_, capturing the read data. Tw states may occur after Td. |
| Tr. | BSI negates AB_RW_, AB_DEN_, AB_SIZ[2:0], releases AB_A, AB_AS_. Slave deasserts AB_ACK_ and AB_ERR_, releases AB_AD. |

Single Write

|   |   |
|---|---|
| Tbr. | BSI asserts AB_BR_ to indicate it wishes to perform a transfer. HOst asserts AB_BG_, BSI drives AB_A, and AB_AD when AB_BG_ is asserted. Moves to Tva next clock. |
| Tva. | BSI drives AB_A and AB_AD with the virtual address for one clock, negates AB_AS_, negates AB_RW_, drives AB_SIZ[2:0]. |
| Tmmu. | Host MMU performs an address translation during this clock. |
| Tpa. | Host MMU drives AB_AD with the address, BSI drives AB_A asserts AB_AS_, and negates AB_BR_ if another transaction is not required. |
| Td. | BSI negates AB_AS_, asserts AB_DEN_, drives AB_AD with the write data and starts sampling AB_ACK_ and AB_ERR_. Slave captures AB_AD data, asserts AB_ACK_, drives AB_ERR_. BSI samples a valid AB_ACK_. Tw states nay occur after Td. |
| Tr. | BSI negates AB_RW_, AB_Den_, AB_SIZ[2:0], releases AB_A, AB_AD, AB_AS. Slave deasserts AB_ACK_ and AB_ERR , stops driving AB_AD with data. |

Burst Read

|   |   |
|---|---|
| Tbr. | BSI asserts AB_BR_ to indicate it wishes to perform a transfer. Host asserts AB_BG_, BSI drives AB_A, and AB_AD when AB_BG_ is asserted. Moves to Tva next clock. |
| Tva. | BSI drives AB_A and AB_AD with the virtual address for one clock, negates AB_AS_, asserts AB_RD_, drives AB_SIZ[2:0], negates AB_BR_ if another transaction is not required. |
| Tmmu. | Hose MMU performs an address translation during this clock. |
| Tpa. | Host MMU drives AB_AD with the translated (physical) address, BSI drives AB_A, asserts AB_AS_. |
| Td. | BSI asserts AB_DEN_, samples AB_ACK_ and AB_ERR_. Slave asserts AB_ACK_, drives AB_ERR, drives AB_AD (with data) when ready. BSI samples a valid AB_ACK_, capturing the read data. Tw states may occur after Td. This state is repeated four or eight times (according to burst size). on the last Td state the BSI negates AB_AS_. |

Burst Write

|   |   |
|---|---|
| Tbr. | BSI asserts AB_BR_ to indicate it wishes to perform a transfer. Host asserts AB_BG_, BSI drives AB_A, and AB_AD when AB_BG_ is asserted. Moves to Tva next clock. |
| Tva. | BSI drives AB_A and AB_AD with the virtual address for one clock, negates AB_AS_ negates AB_RW_, drives AB_SIZE[2:0]. |
| Tmmu. | Host MMU performs an address translation during this clock. |
| Tpa. | Host MMU drives AB_AD with the address, BSI drives AB_A asserts AB_AS_, and negates AB_BR_ if another transaction is not required. |
| Td. | BSI asserts AB_DEn_, drives AB_AD with the write data and starts sampling AB_ACK_ and AB_ERR_. Slave captures AB_AD data, asserts AB_ACK_, drives AB_ERR_. BSI samples a valid AB_ACK. Tw states may occur after Td. This state is repeated as required for the complete burst. One the last Td state the BSI negates AB_AS_. |
| Tr. | BSI negates AB_RW_, AB_DEN_, AB_SIZ[2:0], releases AB_A, AB_AD, AB_AS_. Slave deasserts AB_ACK_ and AB_ERR_, stops driving AB_AD with data. |

BMAC INTERFACE

This section describes the interface between the BMAC and BSI. As shown in FIGS. 30A–30C, the interface is in two parts: the MAC Indicate interface and the MAC Request interface.

REQUEST INTERFACE

Data
|   |   |
|---|---|
| MRD[7:0] | This is the 8-bit output data from the BSI. |
| MRP | This is the parity on MRD. |

Requested Service
|   |   |
|---|---|
| RQRCLS[3:0] | Selects the type of request/release class. |
| RQBCN | Requests frames to be sent from the beacon state. |
| RQCLM | Request frames be sent from the claim state. |

Options
|   |   |
|---|---|
| STRIP | Void strip option |
| SAT | Selects SA from the data stream, not MAC parameter ram. (This is usually connected to both SAT & SAIGT on the BMAC.) |
| FCST | Disables BMAC-generated FCS, uses data stream instead. |

Transmit Handshake
|   |   |
|---|---|
| RQRDY | Indicates a token of the requested class will be used if captures. |
| TXRDY | Indicates a usable token has been captured. |
| RQSEND | Indicates data is ready to be transmitted. |
| MRDS | Strobes the MRD transmit data. Connect to TXACK on BMAC. |
| RQEOF | Indicates the last byte of data is at the transmit interface. |
| RQFINAL | Indicates the final frame of the request. |
| RQABORT | Asserted by the BSI to abort the current frame. |
| TXED | Indicates the ED is being transmitted. |
| TXPASS | Indicates the absence of a service opportunity. |
| TXABORT | Indicates the MAC transmitted DID abort this frame. |

Transmit Status
|   |   |
|---|---|
| TXRINGOP | Indicates the state of the local MAC transmitter ring operational flag. |
| TXCLASS | Indicates the class of the current token. |

INDICATE INTERFACE

Data
|   |   |
|---|---|
| MID[7:0] | This is the 8-bit input data to the BSI. |
| MIP | This is the parity on MID. |

Frame Sequencing & Handshake
|   |   |
|---|---|
| FCRCVD | Indicates a frame control was received. |
| INFORCVD | Indicates the first four bytes of the INFO field have been received. |
| EDRCVD | Indicates that the end of frame sequence (EDFS) is being received. |
| MIDS | MAC Indicate Data Strobe, asserted for valid data. |

Frame Information
|   |   |
|---|---|
| AFLAG | Indicates an internal address match occurred on the DA field. |
| MFLAG | Indicates the received SA matches the MLA or MSA (BMAC) registers. |
| SAMESA | Indicates the SA of the current frame is |

| | |
|---|---|
| | the same as the previous frame and the frames were not MAC frames, and the size of the two are the same. |
| SAMEINFO | Indicates the first four bytes of the info field of the current frame is the same as the first four info bytes of the last frame, and they are MAC frames, and their address lengths are the same. |
| Frame Status | |
| VDL | Indicates a valid data length for the received frame. |
| VFCS | Indicates a valid FCS for the received frame. |
| TKRCVD | Indicates a complete token was received. |
| FRSTRP | Indicates the frame was stripped. |
| FOERROR | Indicates a standard-defined format error. |
| MACRST | Indicates an internal error, mac frame, mac reset, or software or hardware reset. |
| Status Indicators | |
| VCOPY | Used to set the COPY indicator. |
| EA | External A_Flag. Asserted when an external DA match is detected. Sampled when ECIP goes from asserted to negated. The sample window is from JK−> ED. |
| ECIP | External Compare In Progress. Used to strobe the EA input. |
| EM | External M_Flat. Asserted when an external SA match is detected. Sampled by the BSI on the last byte of the frame (normally when EDRCVD is asserted) or on −ECIP. |
| Miscellaneous | |
| LBC[5,3,1] | Various phases of local byte clock from CDD. |
| SSER | Scanpath Enable for Ring Clock scan chain. |
| SSEB | Scanpath Enable for Bus Clock scan chain. |
| SIR[1:0] | Scan chain inputs for the Ring Clock scan chains. |
| SIB[1:0] | Scan chain input for the Bus Clock scan chain. |

CBUS INTERFACE

The BSI 10 provides an 8-bit asynchronous interface to internal registers and logic. Access to internal registers is possible. This interface is compatible with similar interfaces on the other NSC FDDI chip set members and is called CBus.

Access to the attention/notify flags must be via CBus. Operational commands are loaded into the BSI via CBus. The protocol for CBus is described in this section. The command register usage and internal register map is described in the Programming Interface section above.

| CBUS SIGNALS | |
|---|---|
| CB[4:0] | The Control Bus Address inputs select the BSI location to be accessed. |
| CBD[7:0] | The bidirectional Control Bus Data signals convey 8-bit data to/from the BSI. |
| CBP | This is odd parity for the CBD bus. |
| CE_ | Chip Enable. |
| CB_RW_ | The Read/Write_input selects the data transfer direction. |
| CB_ACK_ | The Acknowledge open-drain output. |
| INT_ | Interrupt open-drain output from the BSI. |
| RST_ | Hard reset input to the BSI. |

CBUS PROTOCOL

The protocol is a simple asynchronous handshake. The host sets up the address and data (for a write) on CBA and CBD, drives CB_RW_, then asserts CE_. When the transfer is complete, the BSI asserts CB_ACK_. CE_ may be deasserted once CB_ACK_ is asserted and a new transaction may be started once CB_ACK_ is deasserted. Note that CB_ACK_ is an open-drain output and, thus, so is not drive high.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A method of processing information descriptors in an interface system connected between a local area network communications medium and a network station, wherein the interface system transfers information objects between the communications medium and a memory system associated with the network station, each information including one or more parts described by an information descriptor associated with said part, and wherein the interface system includes a bus interface unit that connects to the network station for transferring information objects between the interface system and the memory system, indicate circuitry connected to the bus interface unit for transferring data information objects and control information objects received by the interface system from the communications medium to the memory system via the bus interface unit, request circuitry connected to the bus interface unit for transferring data information objects and control information objects received by the interface system from the memory system to the communications medium via the bus interface unit, and a status management unit that interprets control information objects received from the memory system or the communications medium, each information descriptor including one or more fields having zero value or greater than zero value, information descriptors associated with data information objects including a byte count field, the method comprising:

scanning the byte count field of a received data information object information descriptor;

in the event that the byte count field of the received data information object information descriptor has greater than zero value,
(i) validating said information descriptor;
(ii) requesting a data fetch associated with said received data information object; and
(iii) processing said information descriptor; and in the event that the byte count field of the received data information object information descriptor has zero value,
(i) processing said information descriptor without validating said information descriptor and without requesting an associated data field.

2. A method as in claim 1, and wherein the information objects include request objects that convey operational parameters and commands to the interface system, request objects including a sequence of request information descriptors, and wherein a first request information descriptor in said sequence that has zero value is a token capture request.

3. A method as in claim 2 and wherein a last request information descriptor in said sequence that has zero value is a token release request.

* * * * *